United States Patent
Olson

(10) Patent No.: US 10,133,543 B2
(45) Date of Patent: Nov. 20, 2018

(54) DEVICES, METHODS, AND GRAPHICAL USER INTERFACES FOR MEDIA PLAYBACK CONTROL USING INTENSITY-BASED USER INPUTS

(71) Applicant: Apple Inc., Cupertino, CA (US)

(72) Inventor: Jason J. Olson, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/441,073

(22) Filed: Feb. 23, 2017

(65) Prior Publication Data

US 2018/0088896 A1 Mar. 29, 2018

Related U.S. Application Data

(60) Provisional application No. 62/399,185, filed on Sep. 23, 2016.

(51) Int. Cl.
*G06F 3/0481* (2013.01)
*G06F 3/0482* (2013.01)
(Continued)

(52) U.S. Cl.
CPC .......... *G06F 3/165* (2013.01); *G06F 3/04817* (2013.01); *G06F 3/04847* (2013.01); *G06F 3/04883* (2013.01)

(58) Field of Classification Search
CPC .... G06F 3/0481; G06F 3/0482; G06F 3/0483; G06F 9/4443; G06F 3/04817; H04N 5/44543

See application file for complete search history.

(56) References Cited

U.S. PATENT DOCUMENTS 6,396,523 B1  5/2002  Segal et al.
6,452,617 B1  9/2002  Bates et al.
(Continued)

OTHER PUBLICATIONS

Gardiner, "Apple Music: How to Use Your iPhone 6s Plus's New Music Player", http://www.idigitaltimes.com/apple-music-how-use-your-iphone-6s-pluss-new-music-player-478423", Sep. 28, 2015, 9 pages.

(Continued)

*Primary Examiner* — Kevin L Young
*Assistant Examiner* — Erik V Stitt
(74) *Attorney, Agent, or Firm* — Morgan, Lewis & Bockius LLP

(57) ABSTRACT

A method is performed at an electronic device. While media is playing, the device detects a contact at a touch-sensitive surface location associated with a first media playback control. If the device is operating in a first media playback mode, the device performs a media playback operation associated with the first media playback control when a characteristic intensity of the contact remains below a first intensity threshold. If the device is operating in a second media playback mode, and a characteristic intensity of the contact exceeds the first intensity threshold, the device performs the media playback operation associated with the first media playback control. If the device is operating in the second media playback mode and the characteristic intensity of the contact remains below the first intensity threshold, the device continues playing the media on the device without performing the media playback operation associated with the first media playback control.

21 Claims, 58 Drawing Sheets

(51) Int. Cl.
*G06F 3/0483* (2013.01)
*G06F 3/16* (2006.01)
*G06F 3/0488* (2013.01)
*G06F 3/0484* (2013.01)

(56) References Cited

U.S. PATENT DOCUMENTS

| | | | |
|---|---|---|---|
| 8,407,623 B2 | 3/2013 | Kerr et al. | |
| 9,152,309 B1* | 10/2015 | Arrehn | G06F 3/04845 |
| 9,436,385 B2* | 9/2016 | Koenig | G06F 3/04886 |
| 9,563,347 B2* | 2/2017 | Yano | G06F 3/0488 |
| 2005/0134578 A1 | 6/2005 | Chambers et al. | |
| 2007/0259716 A1 | 11/2007 | Mattice et al. | |
| 2009/0007017 A1* | 1/2009 | Anzures | G06F 3/04883 |
| | | | 715/835 |
| 2010/0026640 A1* | 2/2010 | Kim | G06F 3/0414 |
| | | | 345/173 |
| 2010/0058251 A1 | 3/2010 | Rottler et al. | |
| 2011/0105193 A1* | 5/2011 | Lee | G06F 3/0488 |
| | | | 455/566 |
| 2012/0098639 A1* | 4/2012 | Ijas | G06F 3/04883 |
| | | | 340/5.51 |
| 2012/0105358 A1* | 5/2012 | Momeyer | G06F 3/0414 |
| | | | 345/174 |
| 2013/0094659 A1* | 4/2013 | Liu | H04R 1/10 |
| | | | 381/74 |
| 2015/0022466 A1* | 1/2015 | Levesque | G06F 3/017 |
| | | | 345/173 |
| 2015/0062052 A1* | 3/2015 | Bernstein | G06F 3/0416 |
| | | | 345/173 |
| 2015/0067495 A1* | 3/2015 | Bernstein | G06F 3/016 |
| | | | 715/702 |
| 2015/0067559 A1* | 3/2015 | Missig | G06F 3/04845 |
| | | | 715/765 |
| 2015/0177933 A1* | 6/2015 | Cueto | G06F 3/0483 |
| | | | 715/776 |
| 2016/0259412 A1 | 9/2016 | Flint et al. | |

OTHER PUBLICATIONS

McGookin, et al., "Pressure Player: Combined Pressure and Audio Interaction", Dept. of Computing Science, University of Glasgow, Glasgow G12 8QQ, UK, Aug. 18, 2008, 2 pages.

Pasquero, et al., "A Haptic Wristwatch for Eyes-Free Interactions", CHI 2011, Tactile Interaction, Vancouver, BC, Canada, May 7-12, 2011, 10 pages.

Spelmezan, et al., "Controlling Widgets with One Power-up Button", https://hal.archives-ouvertes.fr/hal-00864209v2, Oct. 14, 2013, 5 pages.

Wilson, et al., "Pressure-Based Menu Selection for Mobile Devices", Dept. of Computing Science, University of Glasgow, Glasgow, G12, 8QQ, UK, Jun. 8, 2010, 10 pages.

Wilson, et al., "Augmenting Tactile Interaction with Pressure-Based Input", University of Glasgow, Glasgow G12 8QQ, UK, Aug. 22, 2011, 2 pages.

* cited by examiner

614 Detect a second input that includes detecting a second contact at a second location on the touch-sensitive surface; and in response to detecting the second input: in accordance with a determination that the second input meets first media playback mode selection criteria that include a criterion that is met when a characteristic intensity of the second contact remains below a second intensity threshold during the second input, operate the device in the first media playback mode of operation; and, in accordance with a determination that the second input meets second media playback mode selection criteria that include a criterion that is met when the characteristic intensity of the second contact exceeds the second intensity threshold during the second input, operate the device in the second media playback mode of operation 616 Display icons that correspond to media playback controls on the display when the electronic device is operating in the first media playback mode of operation; and forego display of icons that correspond to media playback controls on the display when the electronic device is operating in the second media playback mode of operation 620 In response to detecting the first input:
in accordance with a determination that the first input is detected while the device is operating in the first media playback mode of operation, visually distinguish an icon that corresponds to the first media playback control to indicate that the first media playback control has been activated; and,
in accordance with a determination that the first input is detected while the device is operate in the second media playback mode of operation, visually distinguish an area of the display that is proximate to a location on the display that corresponds to the location of the contact on touch-sensitive surface to indicate that the first media playback control has been activated

Figure 6B

622 In response to detecting the first input:
in accordance with a determination that the first input is detected while the device is operating in the second media playback mode of operation and that the first input meets the first control-activation criteria that include a criterion that is met when the characteristic intensity of the contact does not exceed a second intensity threshold, greater than the first intensity threshold, during the first input, perform a discrete media playback operation associated with the first media playback control; and,
in accordance with a determination that the first input is detected while the device is operating in the second media playback mode of operation and that the first input meets second control-activation criteria that include a criterion that is met when the characteristic intensity of the contact exceeds the second intensity threshold during at least part of the first input, perform a continuous media playback operation associated with the first media playback control 624 Display a scrubber bar when the characteristic intensity of the contact exceeds the second intensity threshold 626 While the electronic device is operating in the first media playback mode of operation, display a first media player user interface on the display, wherein:
the first media player user interface includes a first media player transport control icon that corresponds to the first media playback control, and
the first media player transport control icon corresponds to a first area of the touch-sensitive surface that, when activated, causes the electronics device to perform the media playback operation associated with the first media playback control; and
while the electronic device is operating in the second media playback mode of operation, display a second media player user interface on the display, distinct from the first media player user interface, wherein:
the second media player user interface includes a media player transport control zone associated with the first media playback control, and
the media player transport control zone corresponds to a second area of the touch-sensitive surface, larger than the first area of the touch-sensitive surface, that, when activated, causes the electronics device to perform the media playback operation associated with the first media playback control

Figure 6C

816 Detect, on the touch-sensitive surface, a third input by a third contact that corresponds to the focus selector at a first media player transport control zone in the second media player user interface; and, in response to detecting the third input by the third contact, and, in accordance with a determination that the third input meets one or more zone activation criteria, wherein the zone activation criteria include a criterion that is met when a characteristic intensity of the third contact exceeds an intensity threshold: activate a media navigation function that corresponds to the first media player transport control zone; and provide haptic feedback to indicate that the first media player transport control zone has been activated 818 Detect, on the touch-sensitive surface, a fourth input by a fourth contact that corresponds to the focus selector at a first media player transport control zone in the second media player user interface; and, in response to detecting the fourth input by the fourth contact, and, in accordance with a determination that the fourth input meets one or more zone activation criteria, wherein the zone activation criteria include a criterion that is met when a characteristic intensity of the fourth contact exceeds an intensity threshold: activate a media navigation function that corresponds to the first media player transport control zone; and provide visual feedback to indicate that the first media player transport control zone has been activated 820 While displaying the second media player user interface and presenting a first media content item, detect, on the touch-sensitive surface, a fifth input by a fifth contact that corresponds to the focus selector at a first media player transport control zone in the second media player user interface; and, in response to detecting the fifth input by the fifth contact: in accordance with a determination that the fifth input meets one or more next-item criteria, wherein the next-item criteria include a criterion that is met when a characteristic intensity of the contact remains below a second intensity threshold, transition from presenting the first media content item to presenting a second media content item; and, in accordance with a determination that the fifth input meets one or more scrubbing criteria, wherein the scrubbing criteria include a criterion that is met when a characteristic intensity of the contact exceeds the second intensity threshold, scrub through the first media content item

Figure 8B

822 While displaying the second media player user interface and presenting a first media content item, detect, on the touch-sensitive surface, a sixth input by a sixth contact that corresponds to the focus selector at a second media player transport control zone in the second media player user interface; and,
in response to detecting the sixth input by the sixth contact:
in accordance with a determination that the sixth input meets one or more play/pause criteria, wherein the play/pause criteria include a criterion that is met when a characteristic intensity of the contact remains below a second intensity threshold, toggle between playing and pausing the first media content item; and,
in accordance with a determination that the second input meets one or more scrubbing criteria, wherein the scrubbing criteria include a criterion that is met when a characteristic intensity of the contact exceeds the second intensity threshold, scrub through the first media content item 824 Lock the electronic device;
while the electronic device is locked:
display a lock-screen user interface on the display;
detect, on the touch-sensitive surface, a seventh input by a seventh contact while displaying the lock-screen user interface;
in response to detecting the seventh input by the seventh contact, display the second media player user interface;
while displaying the second media player user interface, detect an eighth input by an eighth contact that corresponds to the focus selector at a respective media player transport control zone in the second media player user interface; and,
in response to detecting the eighth input by the eighth contact, and, in accordance with a determination that the eighth input meets one or more zone activation criteria, wherein the zone activation criteria include a criterion that is met when a characteristic intensity of the contact exceeds an intensity threshold, activate a media navigation function that corresponds to the respective media player transport control zone 826 Lock the electronic device;
while the electronic device is locked:
display a lock-screen user interface on the display, the lock-screen user interface including the second media player user interface;
while displaying the second media player user interface, detect an ninth input by a ninth contact that corresponds to the focus selector at a respective media player transport control zone in the second media player user interface; and,
in response to detecting the ninth input by the eighth contact, and, in accordance with a determination that the ninth input meets one or more zone activation criteria, wherein the zone activation criteria include a criterion that is met when a characteristic intensity of the contact exceeds an intensity threshold, activate a media navigation function that corresponds to the respective media player transport control zone

Figure 8C

DEVICES, METHODS, AND GRAPHICAL USER INTERFACES FOR MEDIA PLAYBACK CONTROL USING INTENSITY-BASED USER INPUTS

RELATED APPLICATION

This application claims priority to U.S. Provisional Application Ser. No. 62/399,185, filed Sep. 23, 2016, which is incorporated by reference herein in its entirety.

TECHNICAL FIELD

This relates generally to electronic devices with touch-sensitive surfaces, including but not limited to electronic devices with touch-sensitive surfaces that control media playback.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interfaces on a display.

For example, some electronic devices use touchpads or touch-screen displays to manipulate media playback controls in a user interface. Conventional electronic devices, however, control media playback in limited, inefficient, and frustrating ways. Some devices only allow users to navigate media via a single user interface. In addition, some devices require a user to seek out and visually identify an icon representing a particular transport control (e.g., a play, pause, fast forward, or skip to next media item icon) on the screen, before tapping the icon to perform that transport control. If the user was performing another activity (such as walking, running, or having a conversation), the user needs to interrupt their activity and focus exclusively on the screen to control playback of the media, thereby breaking the user's concentration on their activity. This change is focus distracts the user from performing other activities.

SUMMARY

Accordingly, there is a need for electronic devices with faster, more efficient methods and interfaces for controlling media playback. Such methods and interfaces optionally complement or replace conventional methods for controlling media playback. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, in addition to playing back music and/or videos, the functions optionally include image editing, drawing, presenting, word processing, spreadsheet making, game playing, telephoning, video conferencing, e-mailing, instant messaging, workout support, digital photographing, digital videoing, web browsing, and/or note taking. Executable instructions for performing these functions are, optionally, included in a non-transitory computer readable storage medium or other computer program product configured for execution by one or more processors.

In accordance with some embodiments, a method is performed at an electronic device with a touch-sensitive surface, a display, and one or more sensors to detect intensities of contacts on the touch-sensitive surface. While media is playing on the device, the device detects a first input that includes detecting a contact at a location on the touch-sensitive surface that is associated with a first media playback control. In response to detecting the first input, in accordance with a determination that the first input is detected while the device is operating in a first media playback mode of operation, the device performs a media playback operation associated with the first media playback control when a characteristic intensity of the first contact remains below a first intensity threshold. In accordance with a determination that the first input is detected while the device is operating in a second media playback mode of operation, distinct from the first media playback mode of operation, and that the input meets first control-activation criteria that include a criterion that is met when a characteristic intensity of the contact exceeds the first intensity threshold during the first input, the device performs the media playback operation associated with the first media playback control. In accordance with a determination that the first input is detected while the device is operating in the second media playback mode of operation and that the input does not meet the first control-activation criteria that include the criterion that is met when the characteristic intensity of the contact exceeds the first intensity threshold during the first input, the device continues to play the media on the device without performing the media playback operation associated with the first media playback control.

In accordance with some embodiments, an electronic device includes a display unit configured to display one or more media playback user interfaces including one or more media playback controls, a touch-sensitive surface unit configured to receive user inputs, one or more sensor units configured to detect intensity of contacts with the touch-sensitive surface unit; and a processing unit coupled to the display unit and the touch-sensitive surface unit. While media is playing on the device, the processing unit is configured to detect a first input that includes detecting a contact at a location on the touch-sensitive surface unit that is associated with a first media playback control. In response to detecting the first input, in accordance with a determination that the first input is detected while the device is operating in a first media playback mode of operation, the processing unit is configured to perform a media playback operation associated with the first media playback control when a characteristic intensity of the first contact remains below a first intensity threshold. In accordance with a determination that the first input is detected while the device is operating in a second media playback mode of operation, distinct from the first media playback mode of operation, and that the input meets first control-activation criteria that include a criterion that is met when a characteristic intensity of the contact exceeds the first intensity threshold during the first input, the processing unit is configured to perform the media playback operation associated with the first media playback control. In accordance with a determination that the first input is detected while the device is operating in the second media playback mode of operation and that the input does not meet the first control-activation criteria that include the criterion that is met when the characteristic intensity of the contact exceeds the first intensity threshold during the first input, the processing unit is configured to continue to play the media on the device without performing the media playback operation associated with the first media playback control.

In accordance with some embodiments, a method is performed at an electronic device with a touch-sensitive surface, a display, and one or more sensors to detect intensities of contacts on the touch-sensitive surface. The device displays a first user interface on the display, wherein the first user interface includes a media player affordance. The device detects, on the touch-sensitive surface, a first input by a first contact that corresponds to a focus selector at the media player affordance. In response to detecting the first input by the first contact that corresponds to the focus selector at the media player affordance, in accordance with a determination that the first input meets one or more first media player selection criteria, wherein the first media player selection criteria include a criterion that is met when a characteristic intensity of the first contact remains below a first intensity threshold, the device displays a first media player user interface on the display, wherein the first media player user interface includes a plurality of media player transport control icons that, when activated, navigate media presented using the electronic device. In accordance with a determination that the first input meets one or more second media player selection criteria, wherein the second media player selection criteria include a criterion that is met when the characteristic intensity of the first contact exceeds the first intensity threshold, the device displays a second media player user interface on the display, distinct from the first media player user interface, wherein the second media player user interface includes a plurality of media player transport control zones that, when activated, navigate media presented using the electronic device.

In accordance with some embodiments, an electronic device includes a display unit configured to display one or more user interfaces including at least one of: one or more media player transport control icons and one or more media player affordances. The electronic device includes a touch-sensitive surface unit configured to receive user inputs. The electronic device includes one or more sensor units configured to detect intensity of contacts with the touch-sensitive surface unit. The electronic device includes a processing unit coupled to the display unit, the touch-sensitive surface unit and the one or more sensor units. The processing unit is configured to enable display of a first user interface on the display unit, wherein the first user interface includes a media player affordance. The processing unit is configured to detect, on the touch-sensitive surface unit, a first input by a first contact that corresponds to a focus selector at the media player affordance. In response to detecting the first input by the first contact that corresponds to the focus selector at the media player affordance, in accordance with a determination that the first input meets one or more first media player selection criteria, wherein the first media player selection criteria include a criterion that is met when a characteristic intensity of the first contact remains below a first intensity threshold, the processing unit is configured to enable display of a first media player user interface on the display unit, wherein the first media player user interface includes a plurality of media player transport control icons that, when activated, navigate media presented using the electronic device. In accordance with a determination that the first input meets one or more second media player selection criteria, wherein the second media player selection criteria include a criterion that is met when the characteristic intensity of the first contact exceeds the first intensity threshold, the processing unit is configured to enable display of a second media player user interface on the display unit, distinct from the first media player user interface, wherein the second media player user interface includes a plurality of media player transport control zones that, when activated, navigate media presented using the electronic device.

In accordance with some embodiments, an electronic device includes a display, a touch-sensitive surface, one or more sensors to detect intensities of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and one or more sensors to detect intensities of contacts with the touch-sensitive surface, cause the device to perform or cause performance of the operations of any of the methods described herein. In accordance with some embodiments, a graphical user interface on an electronic device with a display, a touch-sensitive surface, one or more sensors to detect intensities of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and one or more sensors to detect intensities of contacts with the touch-sensitive surface; and means for performing or causing performance of the operations of any of the methods described herein. In accordance with some embodiments, an information processing apparatus, for use in an electronic device with a display, a touch-sensitive surface, and one or more sensors to detect intensities of contacts with the touch-sensitive surface, includes means for performing or causing performance of the operations of any of the methods described herein.

Thus, electronic devices with displays, touch-sensitive surfaces, and one or more sensors to detect intensities of contacts with the touch-sensitive surface, are provided with improved methods and interfaces for controlling media playback, thereby increasing the effectiveness, efficiency, and user satisfaction with such devices. Such methods and interfaces may complement or replace conventional methods for controlling media playback.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6C are flow diagrams illustrating a method of media playback control using intensity-based inputs, in accordance with some embodiments.

FIGS. 8A-8C are flow diagrams illustrating a method of media playback control using intensity-based inputs, in accordance with some embodiments.

DESCRIPTION OF EMBODIMENTS

Figure 1A:
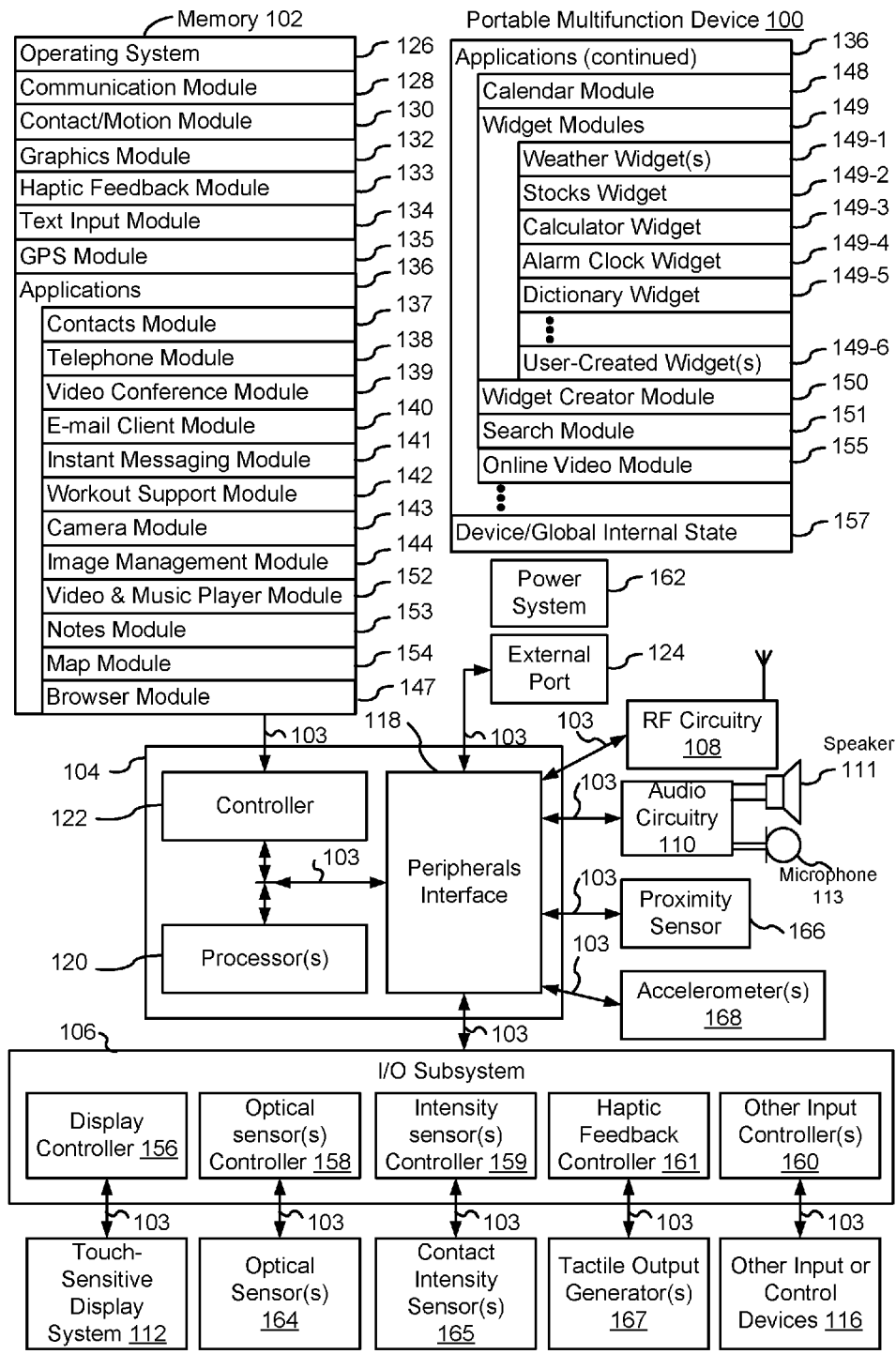
FIG. 1A is a block diagram illustrating a portable multifunction device with a touch-sensitive display in accordance with some embodiments.

In light of the deficiencies with conventional media player user interfaces, there is a need for electronic devices with more effective methods and interfaces for controlling media playback. Described herein are methods that enable a user to control music playback with force or pressure based inputs, without needing to look at the screen. Such methods and interfaces optionally complement or replace conventional methods for controlling media playback. Such methods and interfaces reduce the number, extent, and/or nature of the inputs from a user and produce a more efficient human-machine interface (e.g., by disassociating transport control icons from inputs). Further, such methods conserve power (thereby increasing the time between battery charges), reduce unnecessary/extraneous/repetitive inputs, and potentially reduce memory usage.

Below, FIGS. 1A-1B, 2, and 3 provide a description of example devices. FIGS. 4A-4B and 5A-5OO illustrate example user interfaces for media playback control using intensity-based screen inputs. FIGS. 6A-6C and 8A-8C are flow diagrams of methods for media playback control using intensity-based inputs, in accordance with some embodiments. The user interfaces in FIGS. 5A-5OO are used to illustrate the processes in FIGS. 6A-6C and 8A-8C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
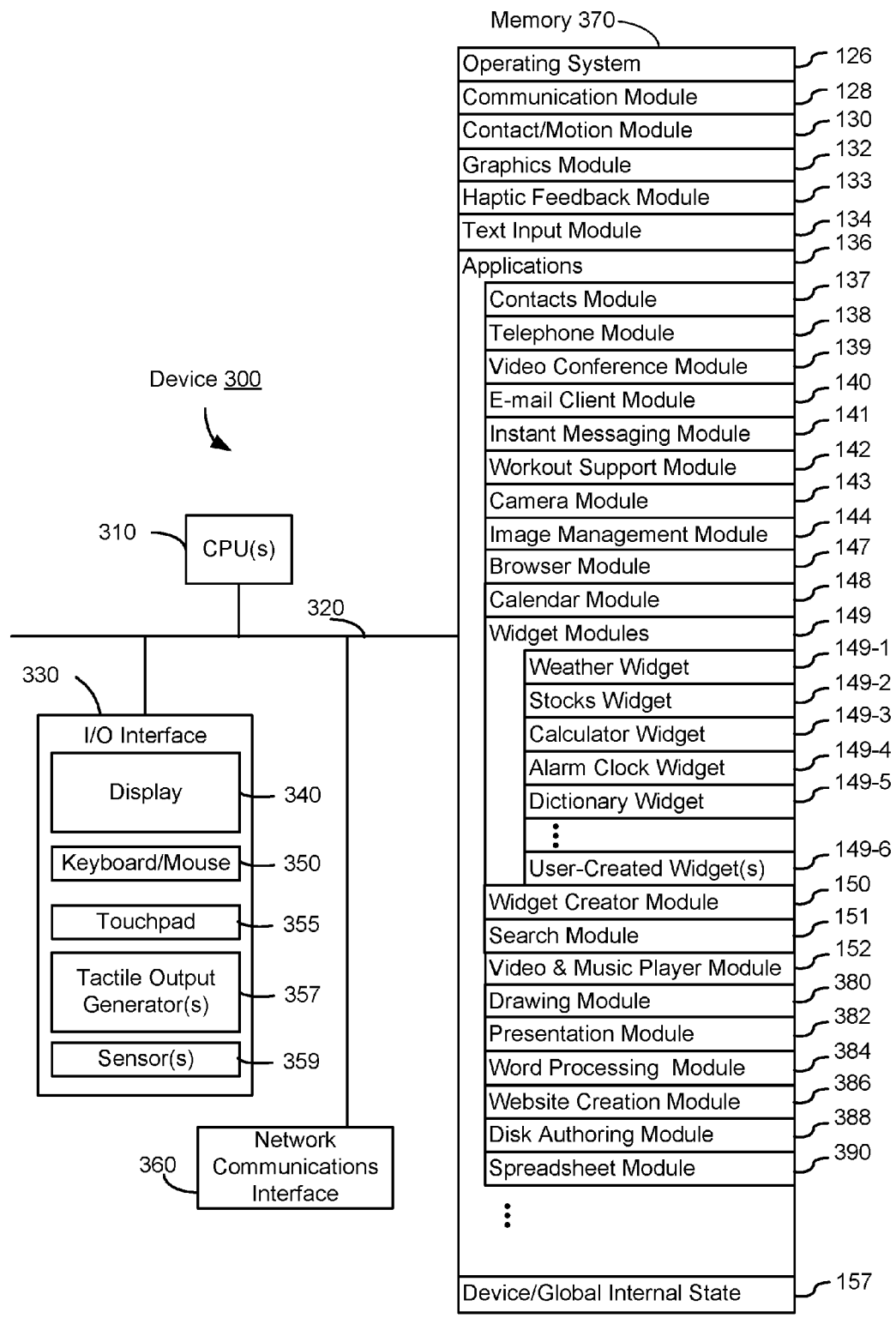
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, applications (or sets of instructions) 136, and audio-specific modules (including x, y, and z sub-modules). Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
news module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with touch-sensitive display system 112, display controller 156, contact/motion module 130, and graphics module 132, news module 142 includes executable instructions to display user-specific news articles (e.g., articles collected from a variety of publication sources based on user-specific preferences) and allow users to interact with the user-specific news articles (or to interact with portions of content included within the user-specific news articles).

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

As pictured in FIG. 1A, portable multifunction device 100 also includes a departure determining module 163 for coordinating departure determining operations on device 100 (e.g., retrieving data from previously-visited addresses 402 or calendar entry data structures 302 and using the retrieved data to create a time to leave reminder). Departure determining module 163 optionally includes the following modules (or sets of instructions), or a subset or superset thereof:

previously-visited addresses 402 for storing information about addresses (or GPS coordinates corresponding to addresses) that have been previously-visited by a user of the device 100;

calendar entry data structures 302 for storing information about calendar entries associated with a user of the device 100;

destination prediction module 163-1;

route determining module 163-2; and departure reminding module 163-3.

In conjunction with GPS module 135, operating system 126, I/O subsystem 106, previously-visited addresses 402, calendar entry data structures 302, map module 154, and calendar module 148, destination prediction module 163-1 includes executable instructions to scan calendar entries (e.g., one or more records stored in the calendar entry data structures 302) and predict a destination for a respective calendar entry based on a previously-visited address (e.g., a previously-visited address stored in the previously-visited addresses 402).

In conjunction with GPS module 135, operating system 126, I/O subsystem 106, previously-visited addresses 402, calendar entry data structures 302, map module 154, and calendar module 148, route determining module 163-2 includes executable instructions to determine one or more possible routes (e.g., walking, biking, driving, using public transportation, etc.) to a particular destination.

In conjunction with GPS module 135, operating system 126, I/O subsystem 106, previously-visited addresses 402, calendar entry data structures 302, map module 154, and calendar module 148, departure reminding module 163-3 includes executable instructions to provide a reminder to a user of the device 100 that it is time to leave for an upcoming event (e.g., an example user interface object 702 with an example reminder is shown in FIG. 7B).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
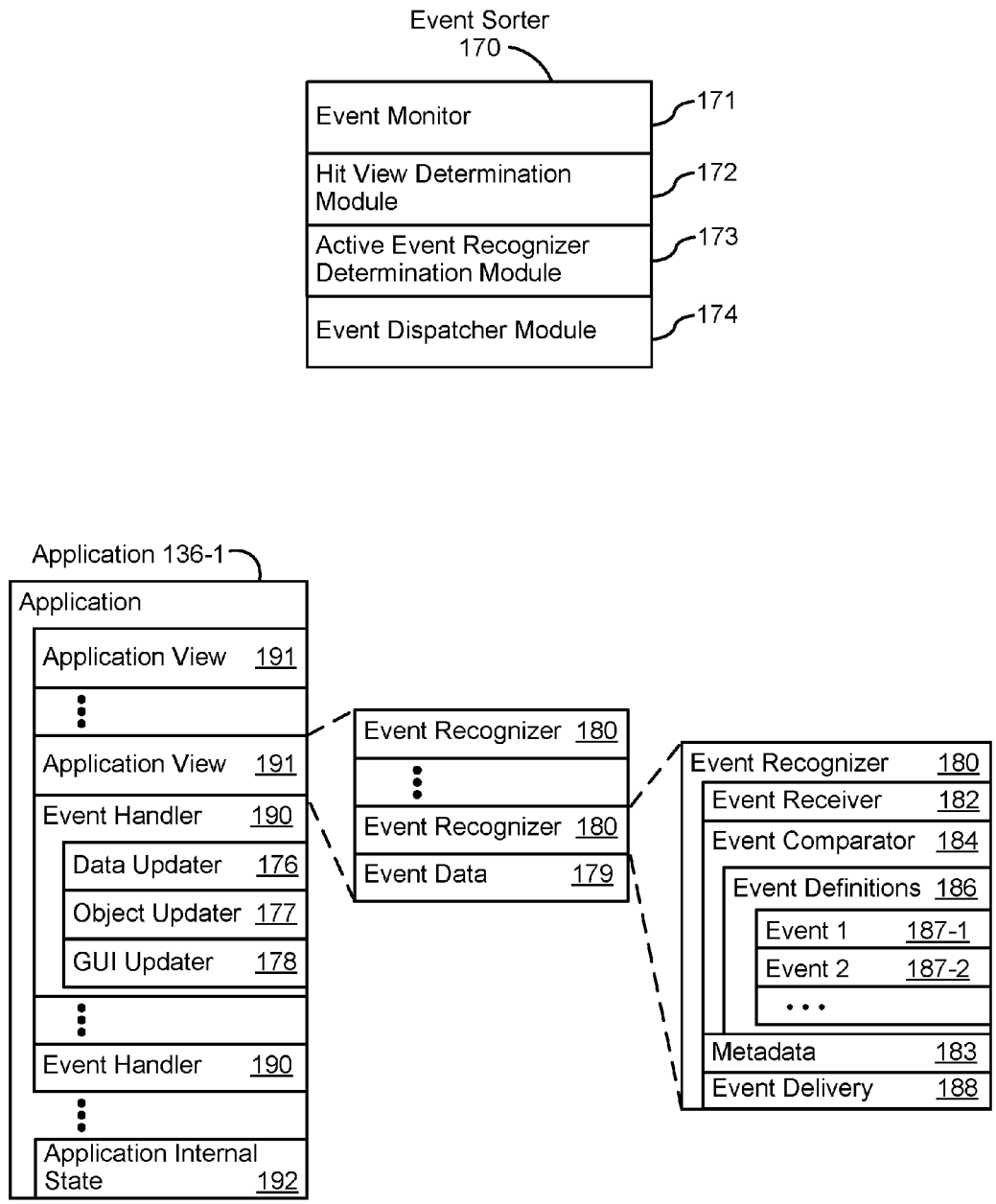
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally uses or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally used as inputs corresponding to sub-events which define an event to be recognized.

Figure 2:
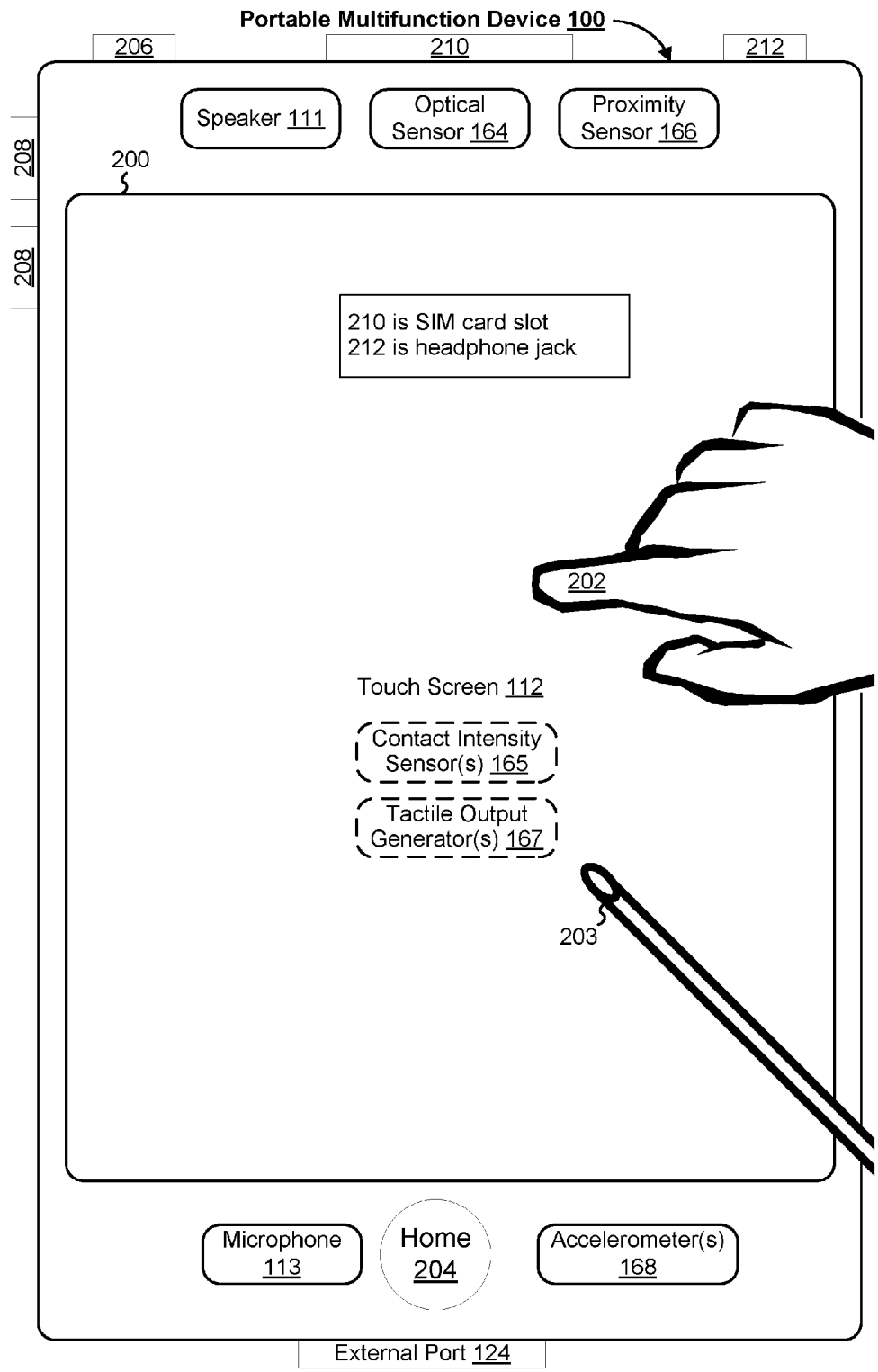
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an example of a multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
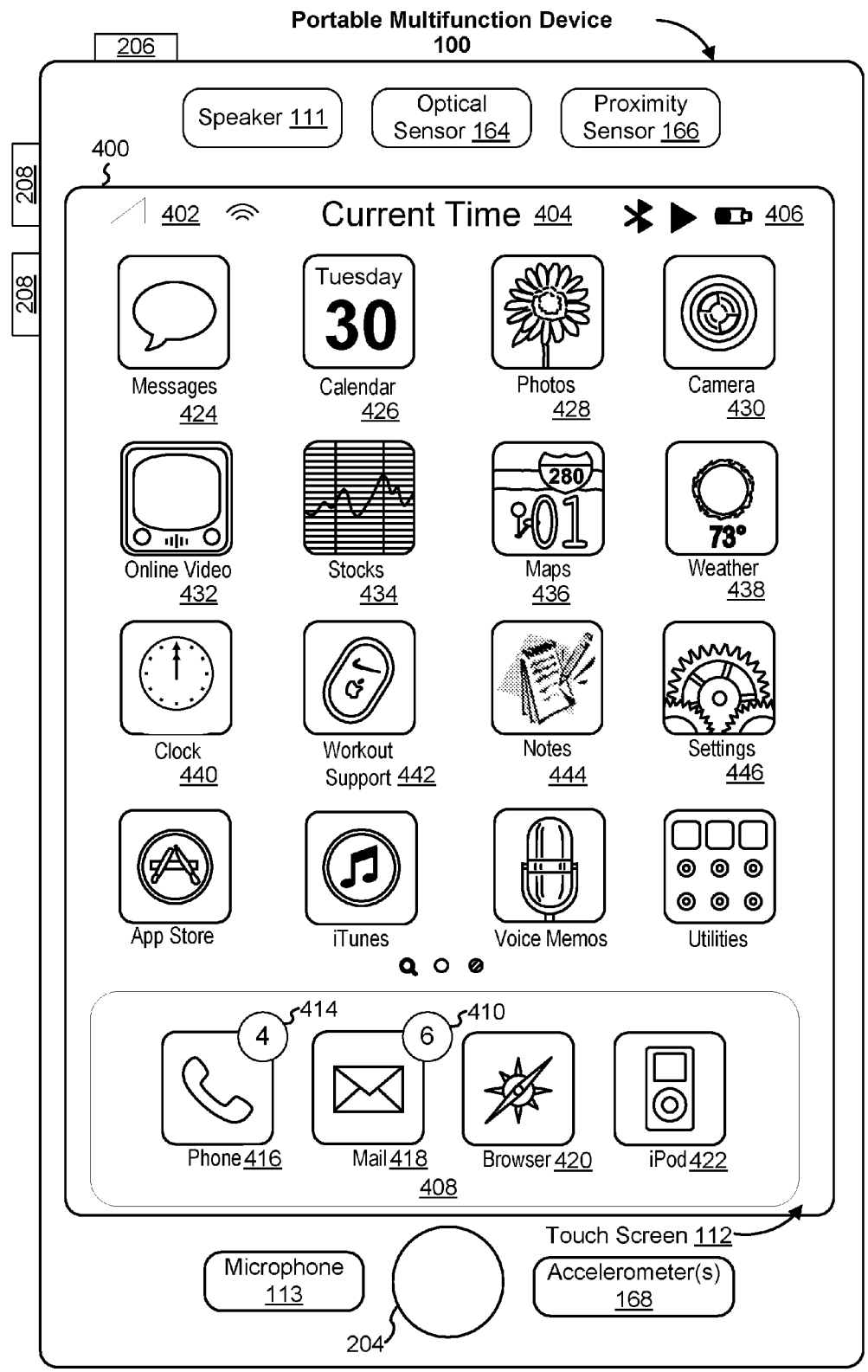
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:

Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Map;"
Icon 438 for weather widget 149-1, labeled "Weather;"
Icon 440 for alarm clock widget 149-4, labeled "Clock;"
Icon 442 for news module 142, labeled "News;"
Icon 444 for notes module 153, labeled "Notes;" and
Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
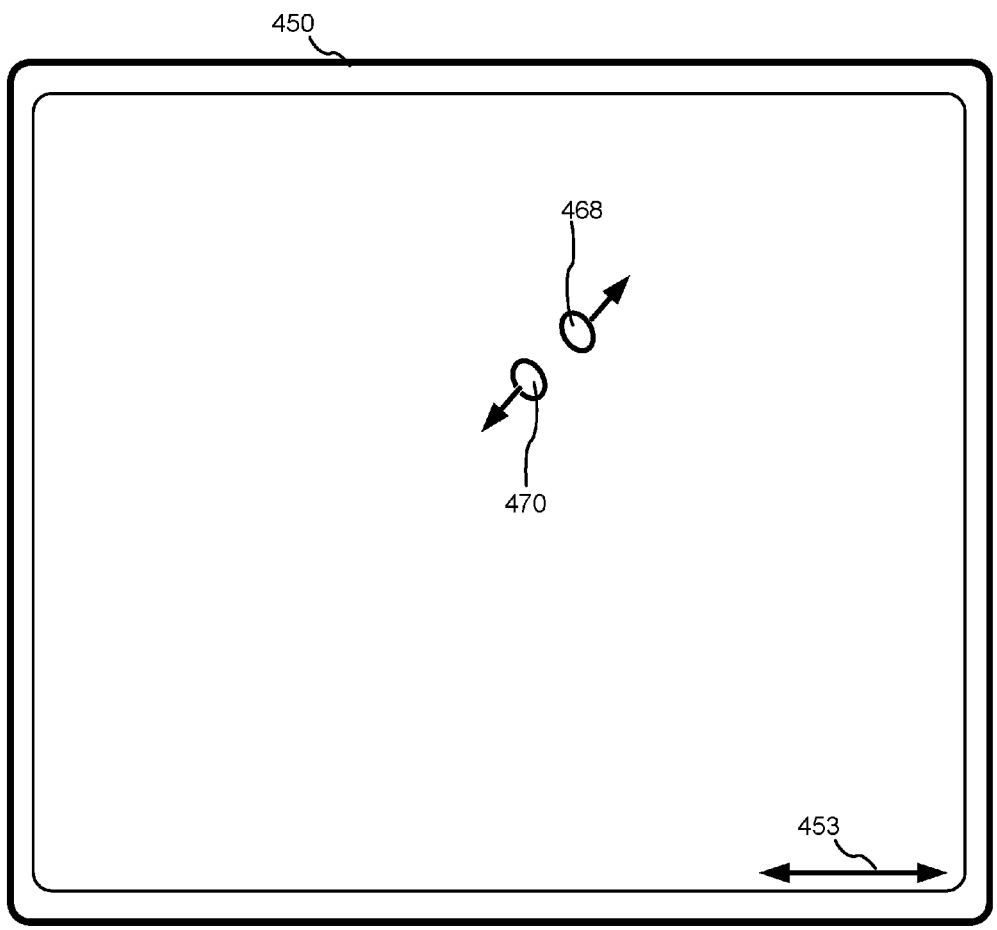
FIG. 4B illustrates an example user interface for a multifunction device with a touch-sensitive surface that is separate from the display in accordance with some embodiments.
Figure 4B:
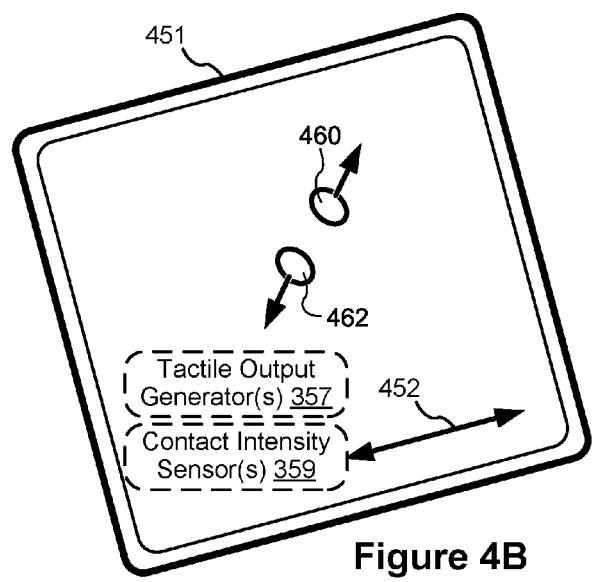

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300. Although many of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 5A-5OO) described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold ITS (e.g., that is at least initially higher than $I_L$), and/or one or more other intensity thresholds (e.g., an intensity threshold $I_H$ that is lower than $I_L$). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
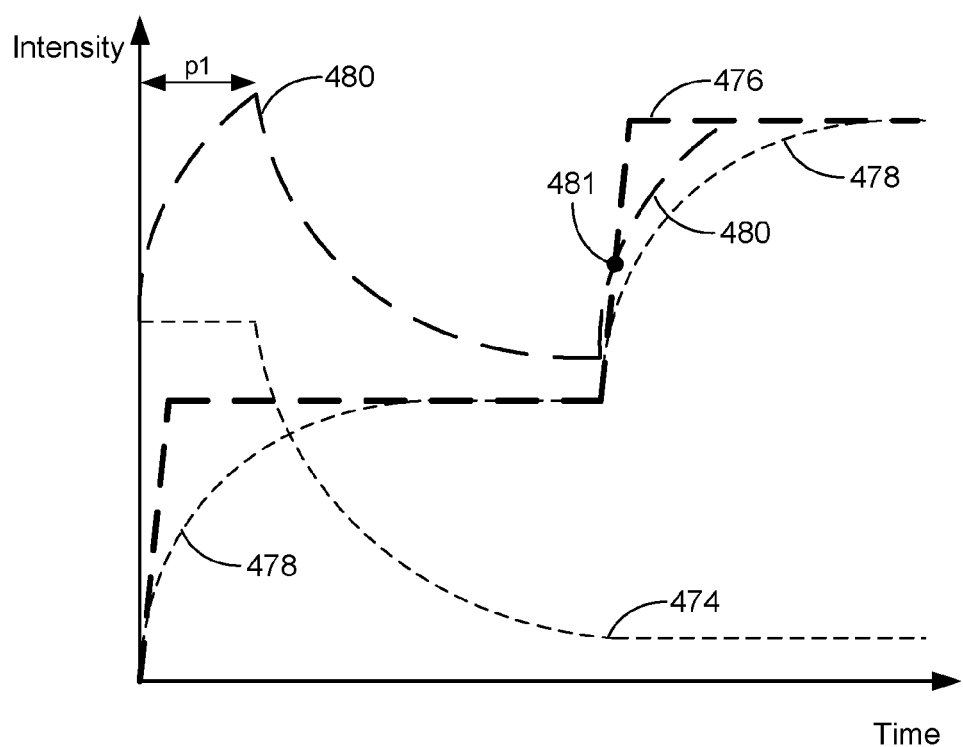
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
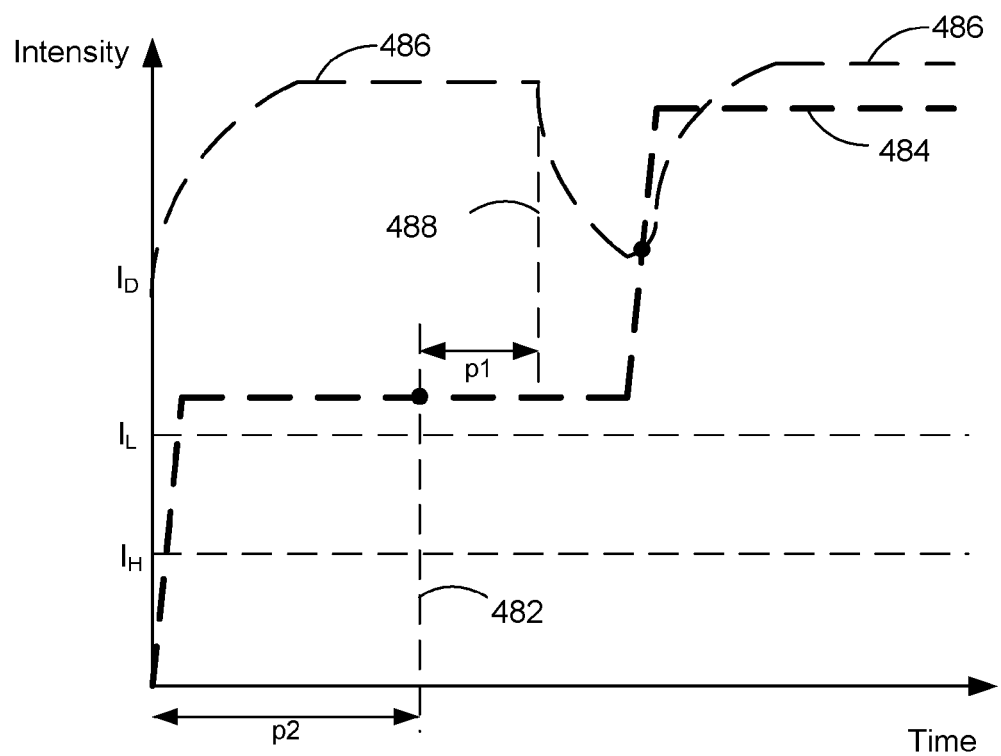

FIG. 4D illustrates another dynamic intensity threshold 486 (e.g., intensity threshold ID). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold ID immediately after, or concurrently with, triggering a response associated with a lower intensity threshold, such as the first intensity threshold $I_H$ or the second intensity threshold $I_L$.

Figure 4E:
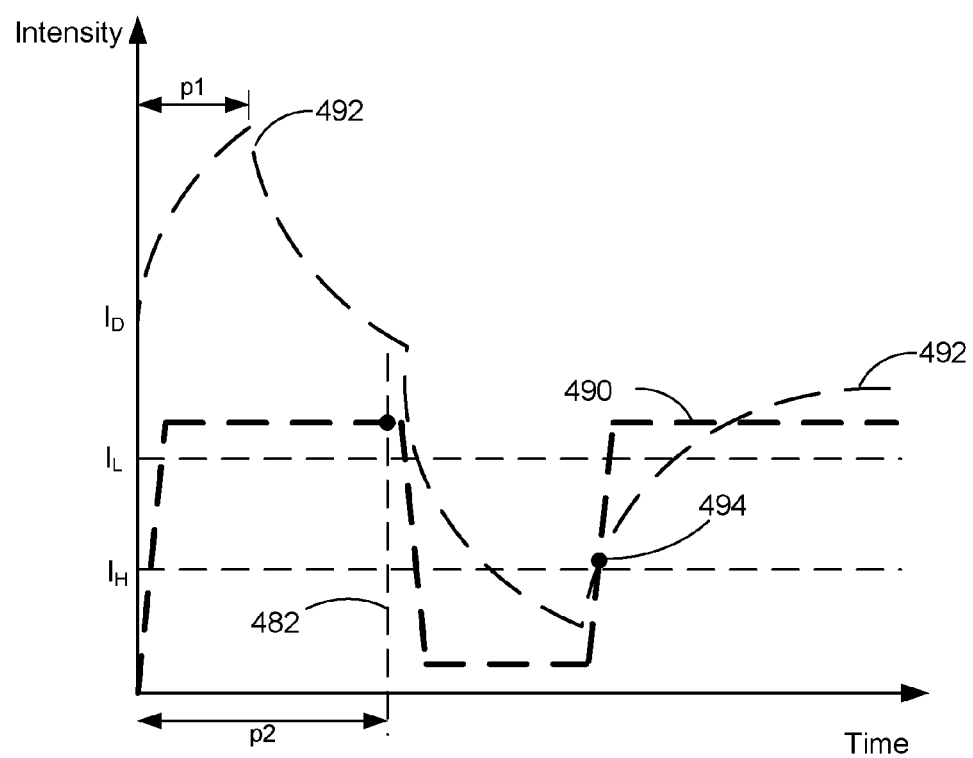

FIG. 4E illustrate yet another dynamic intensity threshold 492 (e.g., intensity threshold ID). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold ID (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold ITS is sometimes referred to as a "light press" input. An increase of characteristic intensity of the contact from an intensity below the deep press intensity threshold ITS to an intensity above the deep press intensity threshold ITS is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

USER INTERFACES AND ASSOCIATED
PROCESSES

Attention is now directed towards embodiments of user interfaces ("UI") and associated processes that may be implemented using an electronic device that communicates with and/or includes a display and a touch-sensitive surface, such as a computing device (e.g., device 100 of FIG. 4A). In some embodiments, the computing device includes one or more sensors to detect intensities of contacts with the touch-sensitive surface. In some embodiments, the computing device includes the display. In some embodiments, the computing device includes an audio system. In some embodiments, the computing device includes neither the display nor the audio system. In some embodiments, the display includes the audio system (e.g., the display and the audio system are components of a television). In some embodiments, certain components of the audio system and the display are separate (e.g., the display is a component of a television and the audio system includes a sound bar that is separate from the television). In some embodiments, the computing device is in communication with a separate remote control through which it receives user inputs (e.g., the remote control includes a touch-sensitive surface or a touch screen through which the user interacts with the computing device). In some embodiments, the remote control includes a motion sensor (e.g., an accelerometer and/or a gyroscope) to detect a motion of the remote control (e.g., a user picking up the remote control).

For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5A:
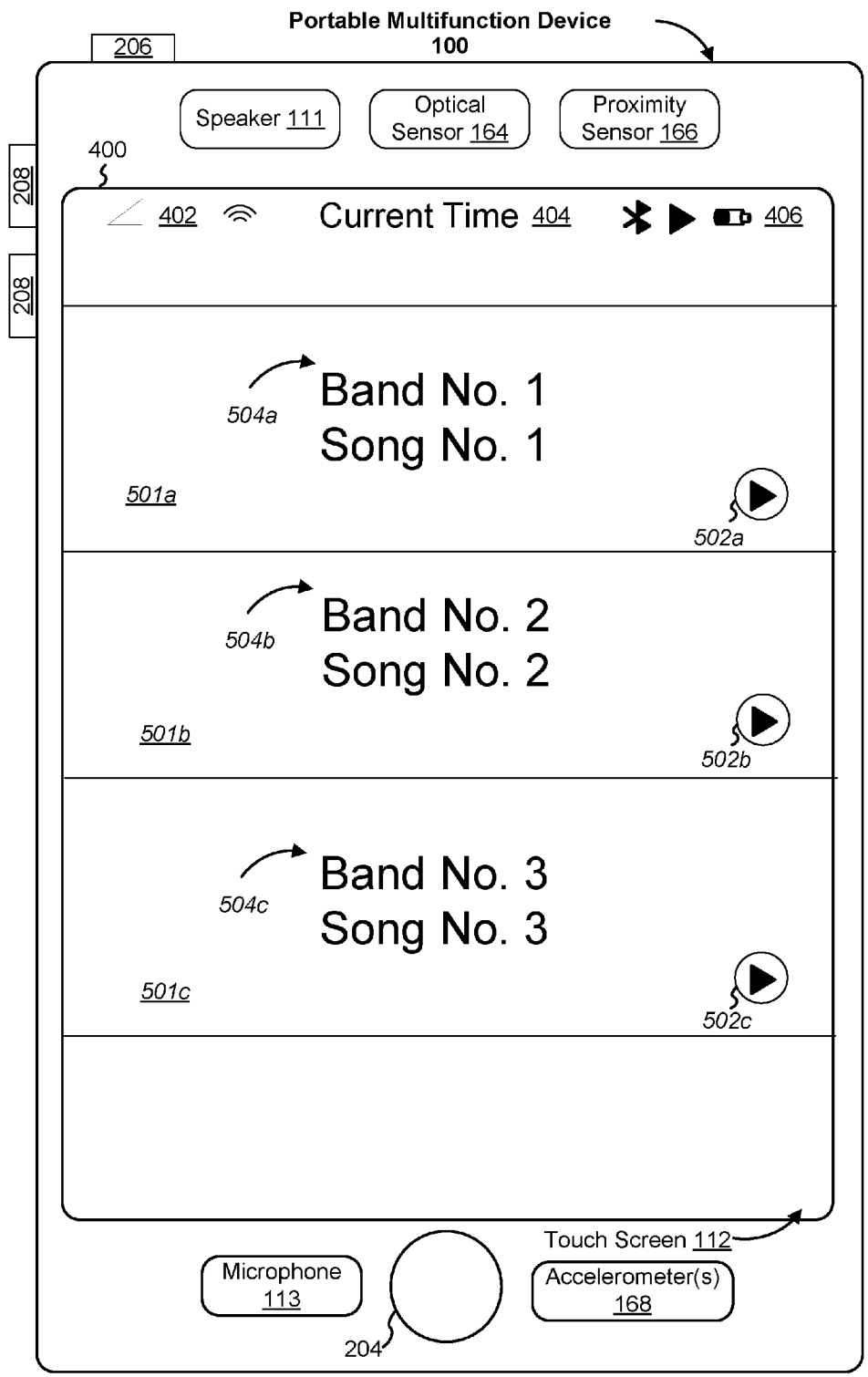
FIGS. 5A-5OO illustrate example user interfaces for media playback control using intensity-based user input, in accordance with some embodiments.
Figure 5B:
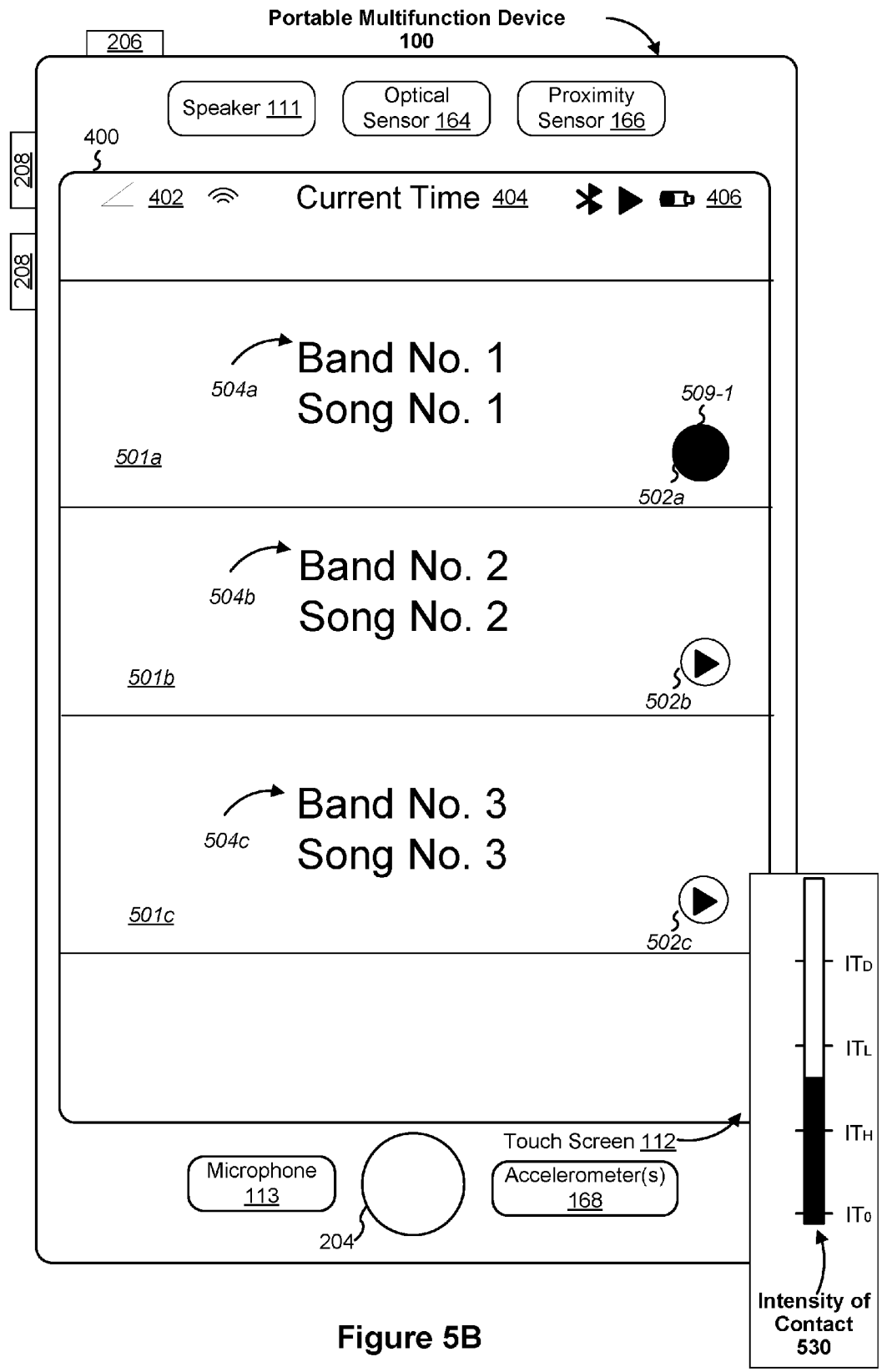
Figure 5C:
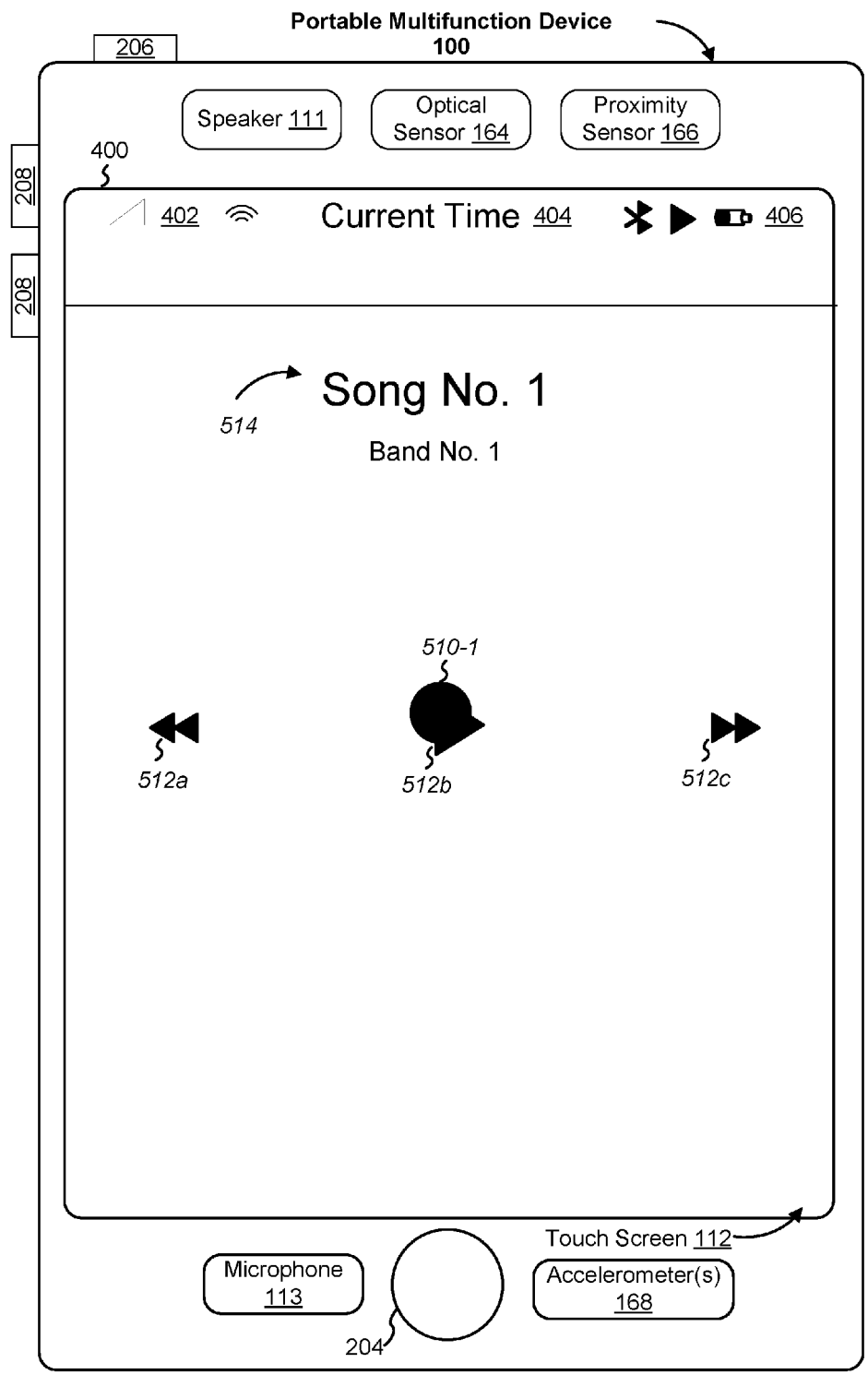
Figure 5D:
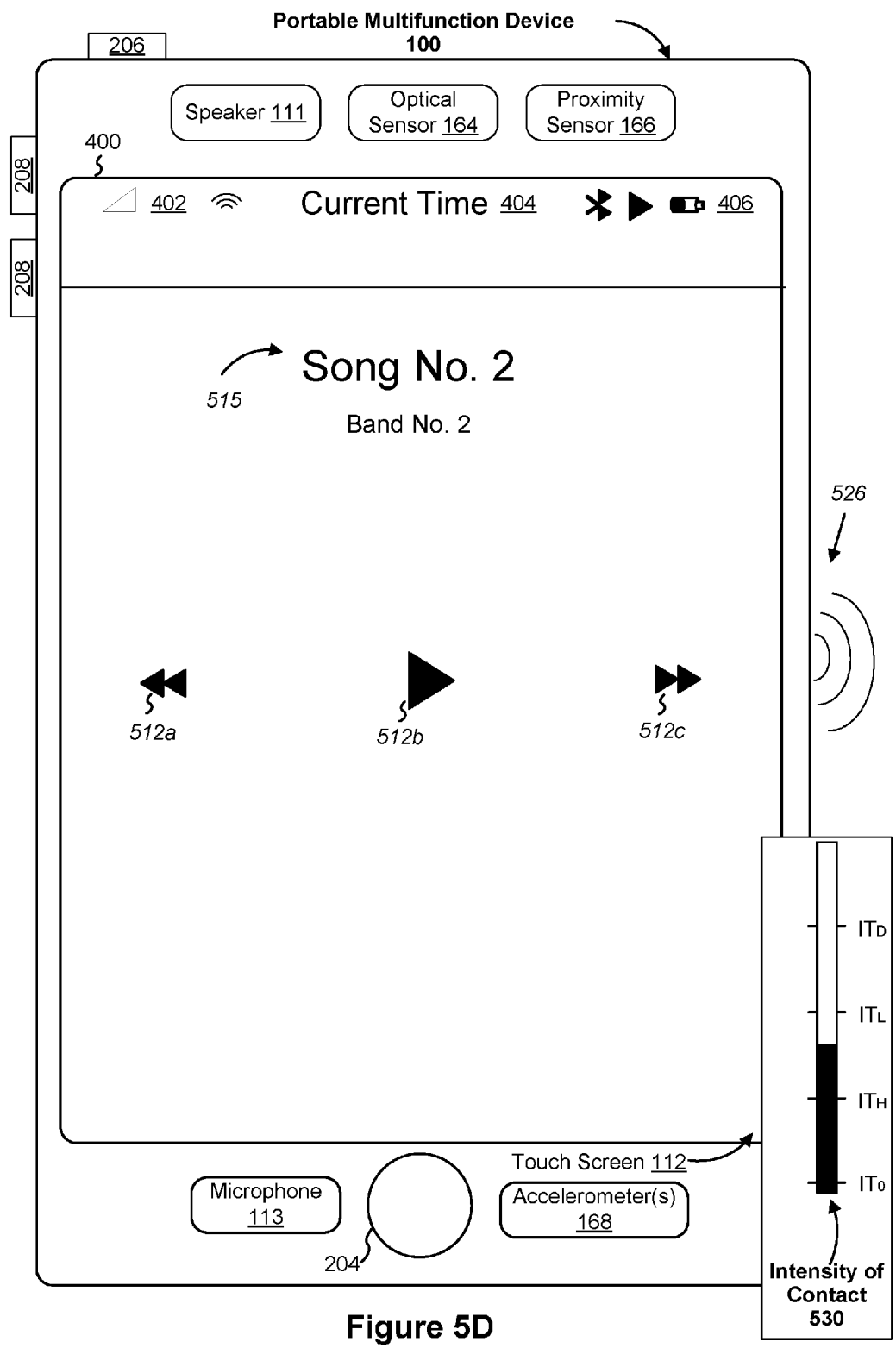
Figure 5E:
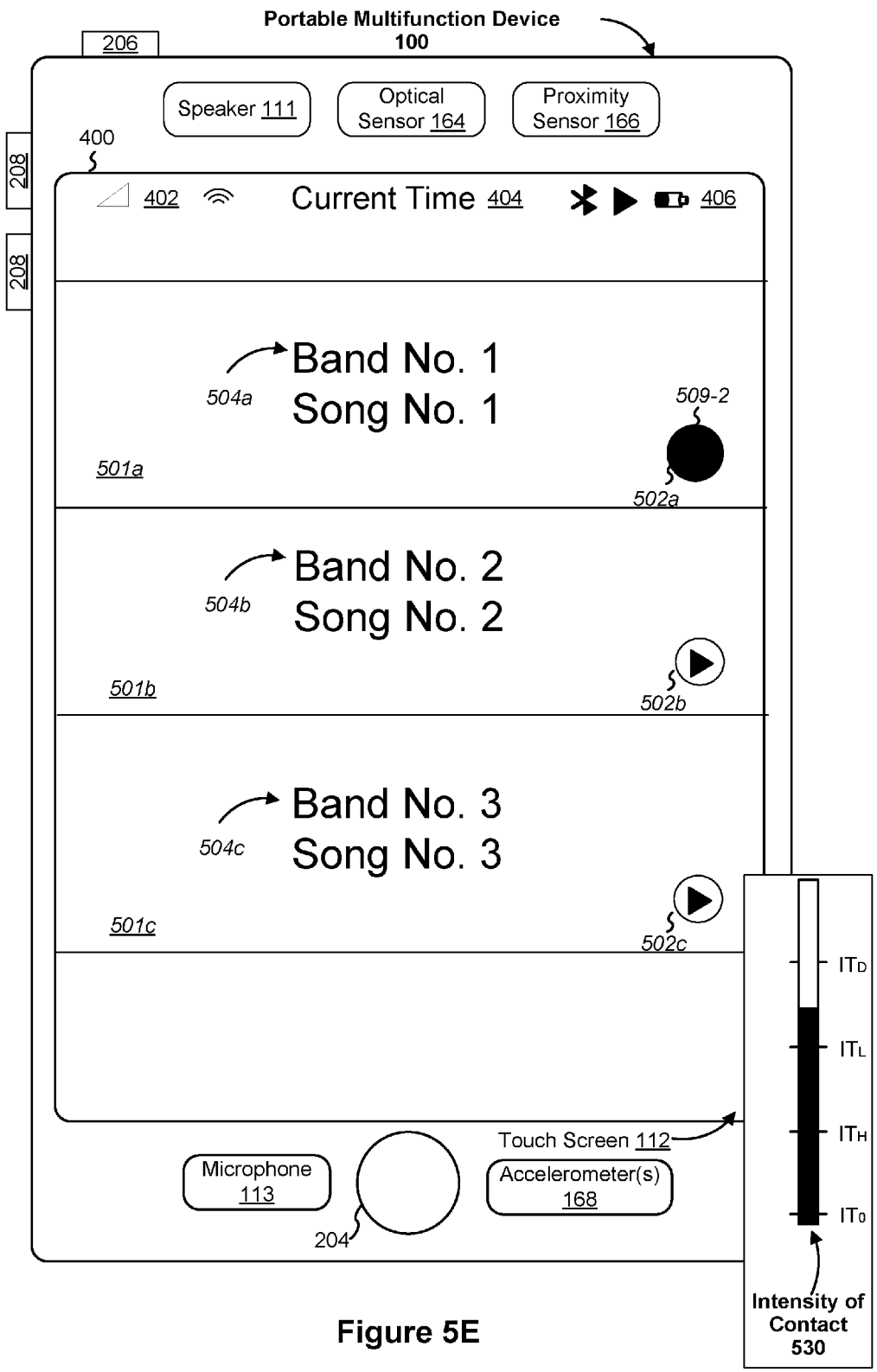
Figure 5F:
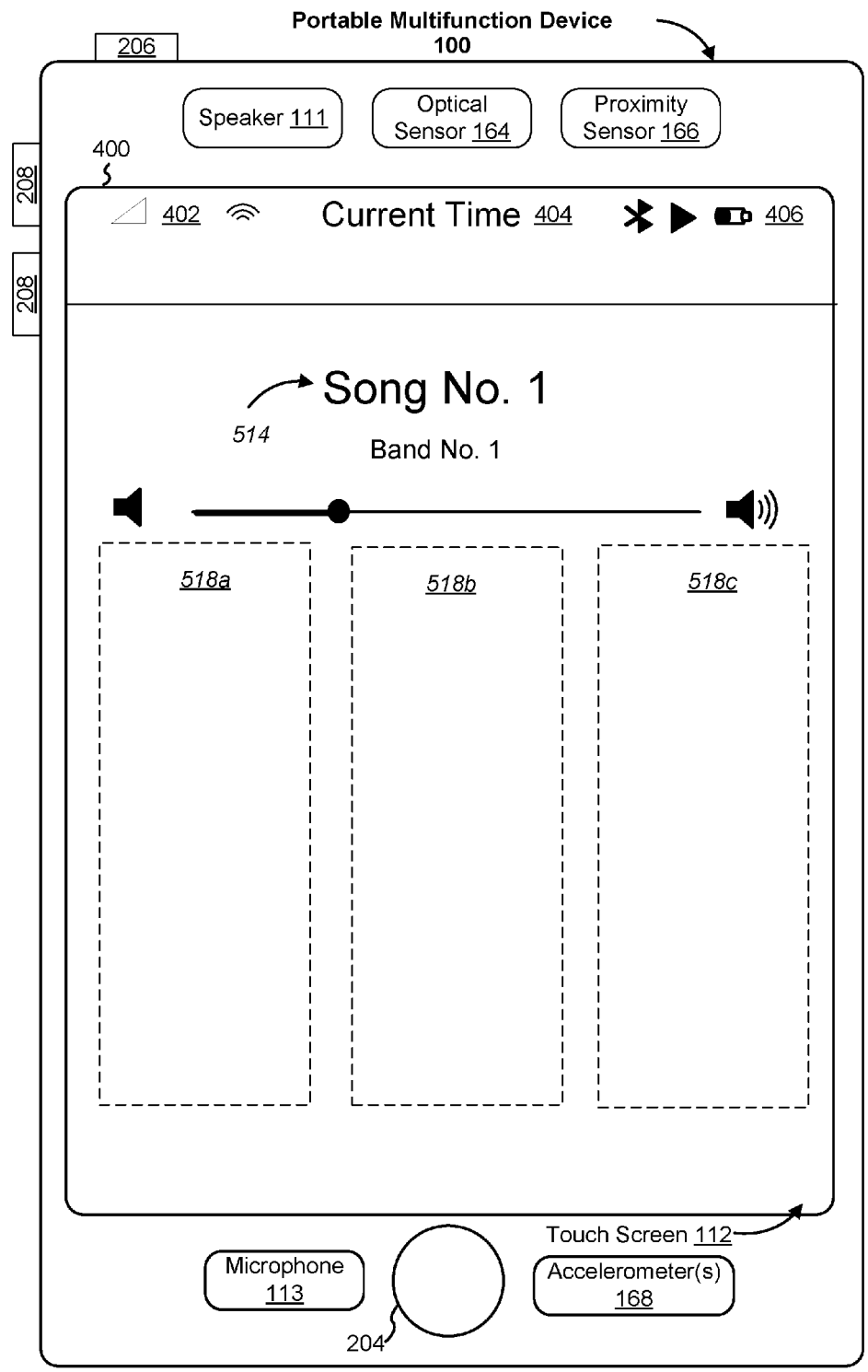
Figure 5G:
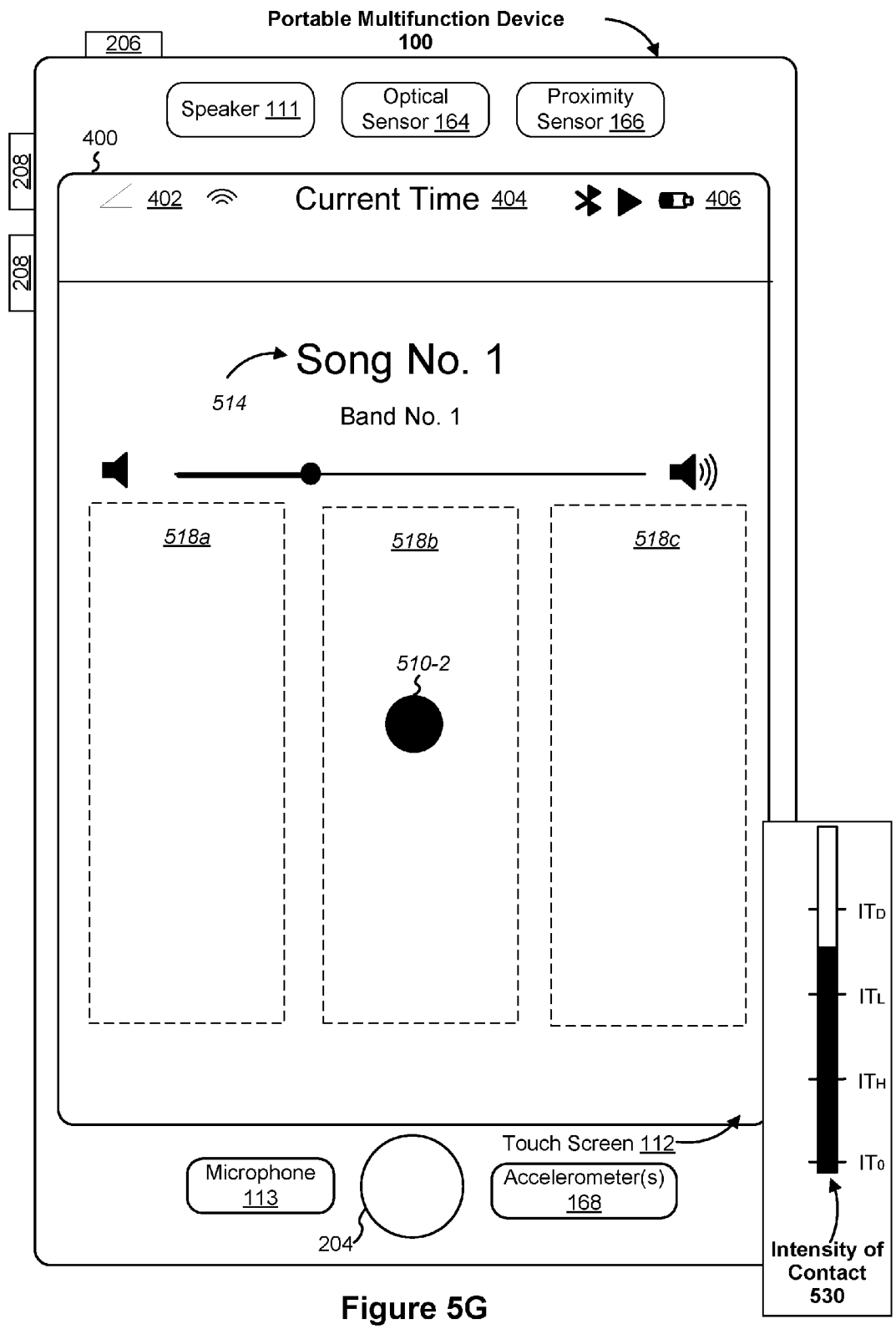
Figure 5H:
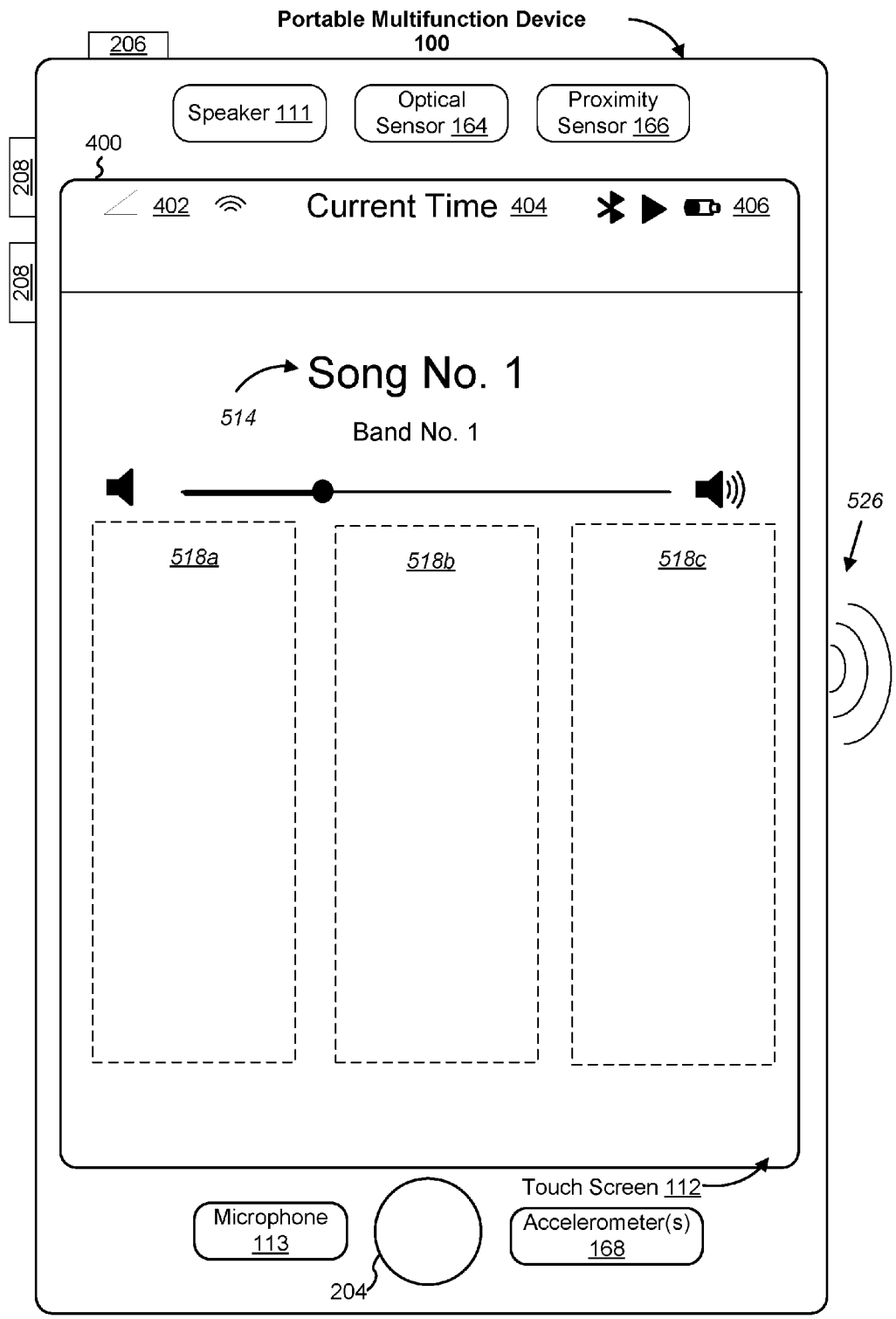
Figure 5I:
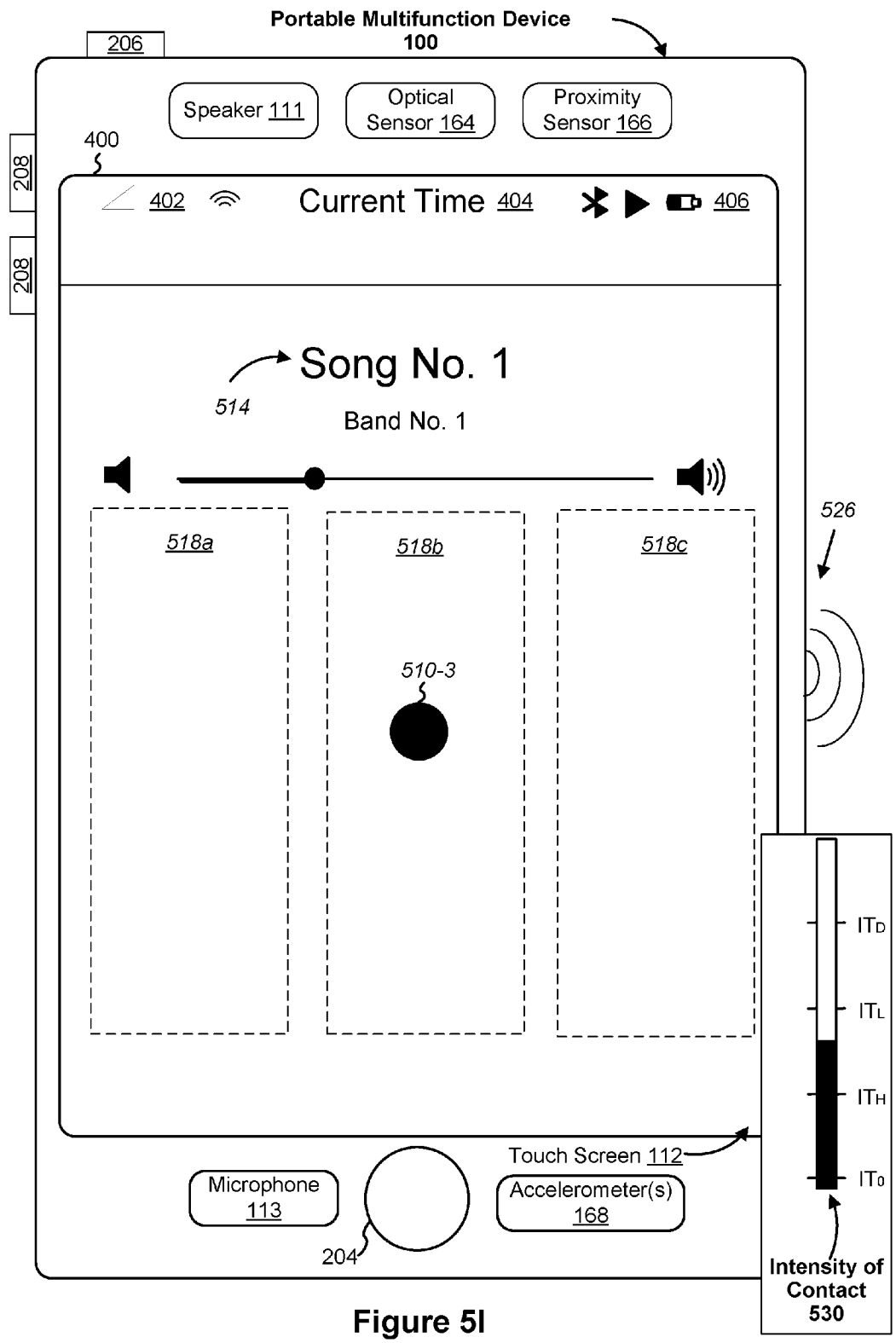
Figure 5J:
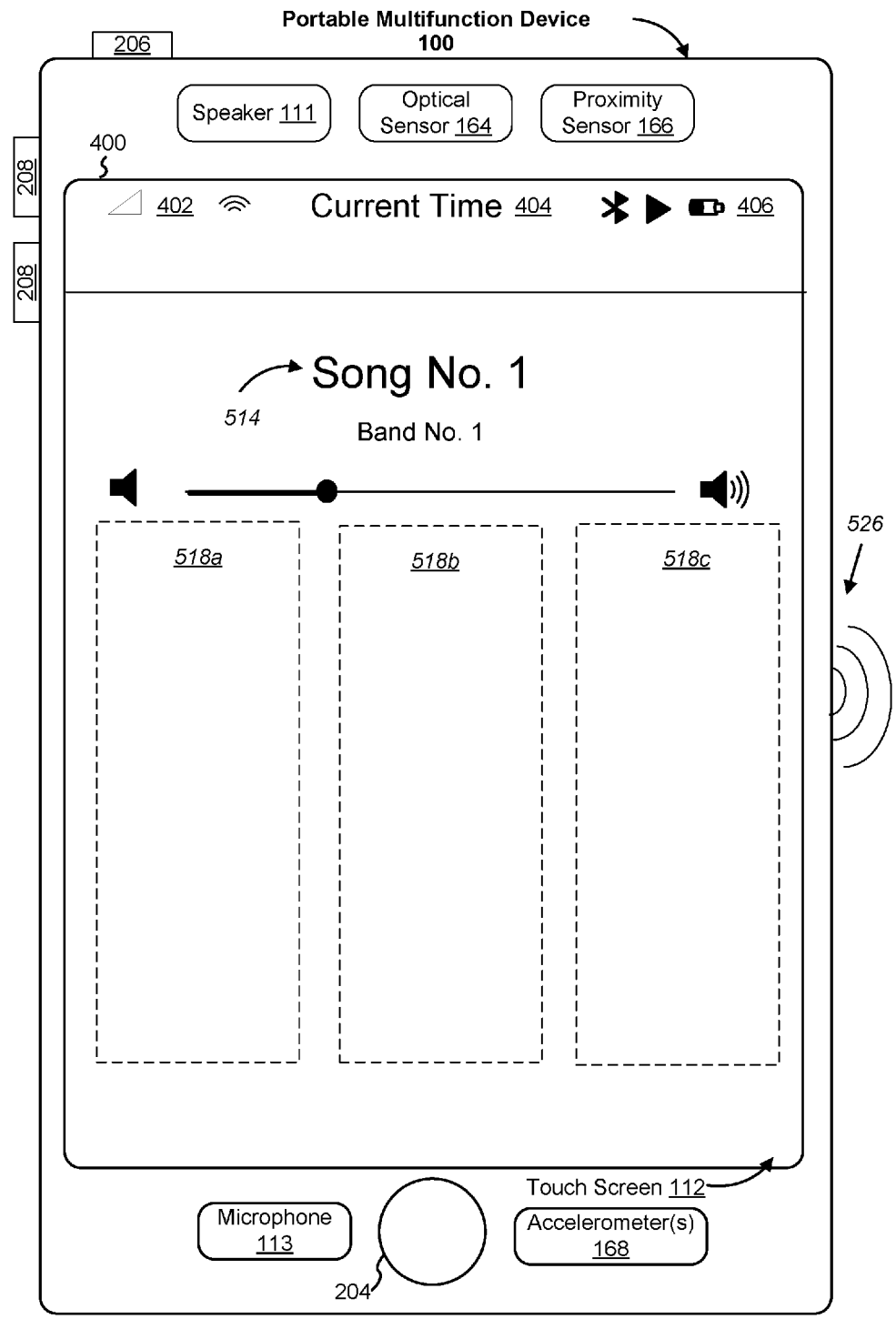
Figure 5K:
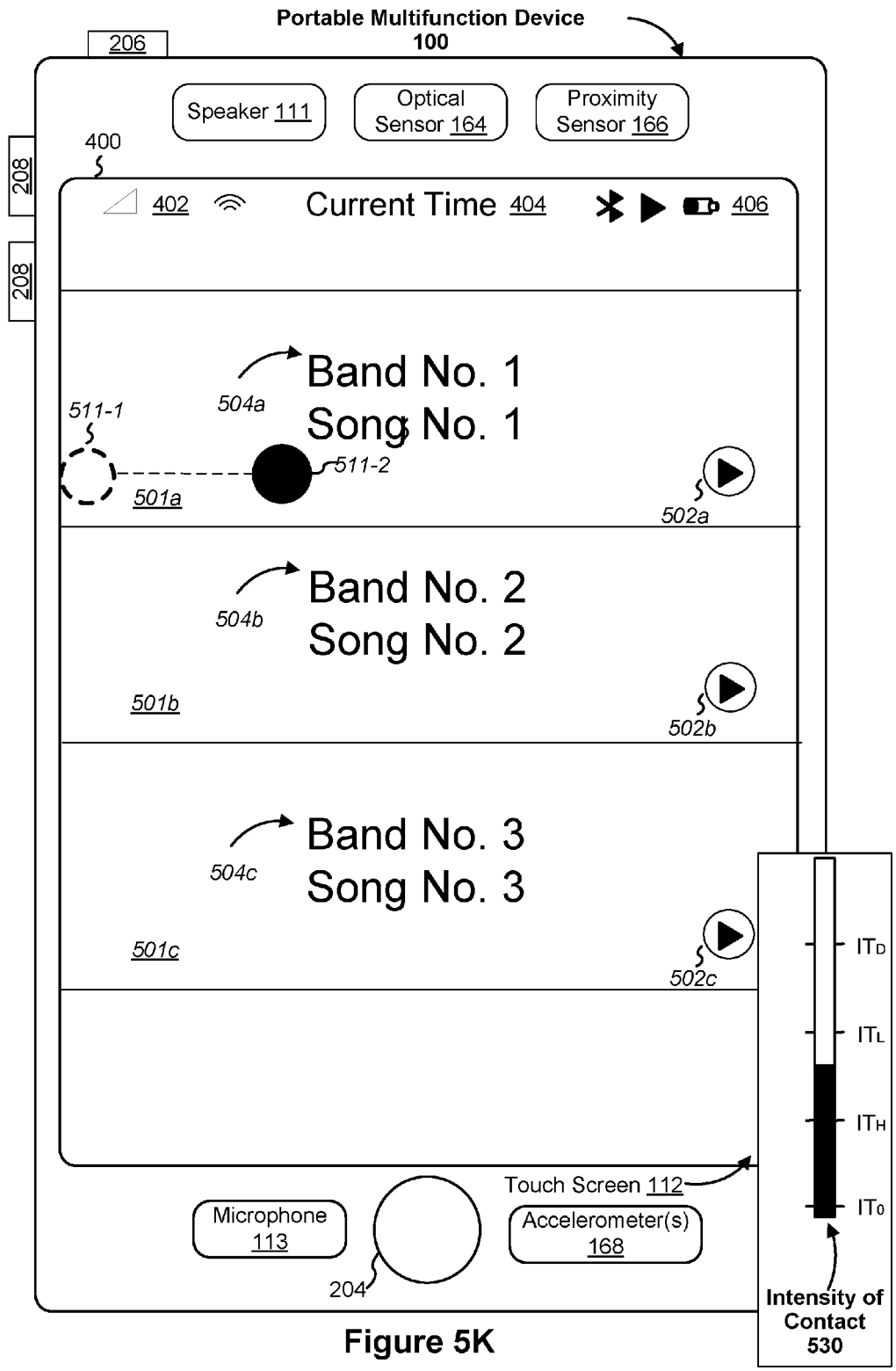
Figure 5L:
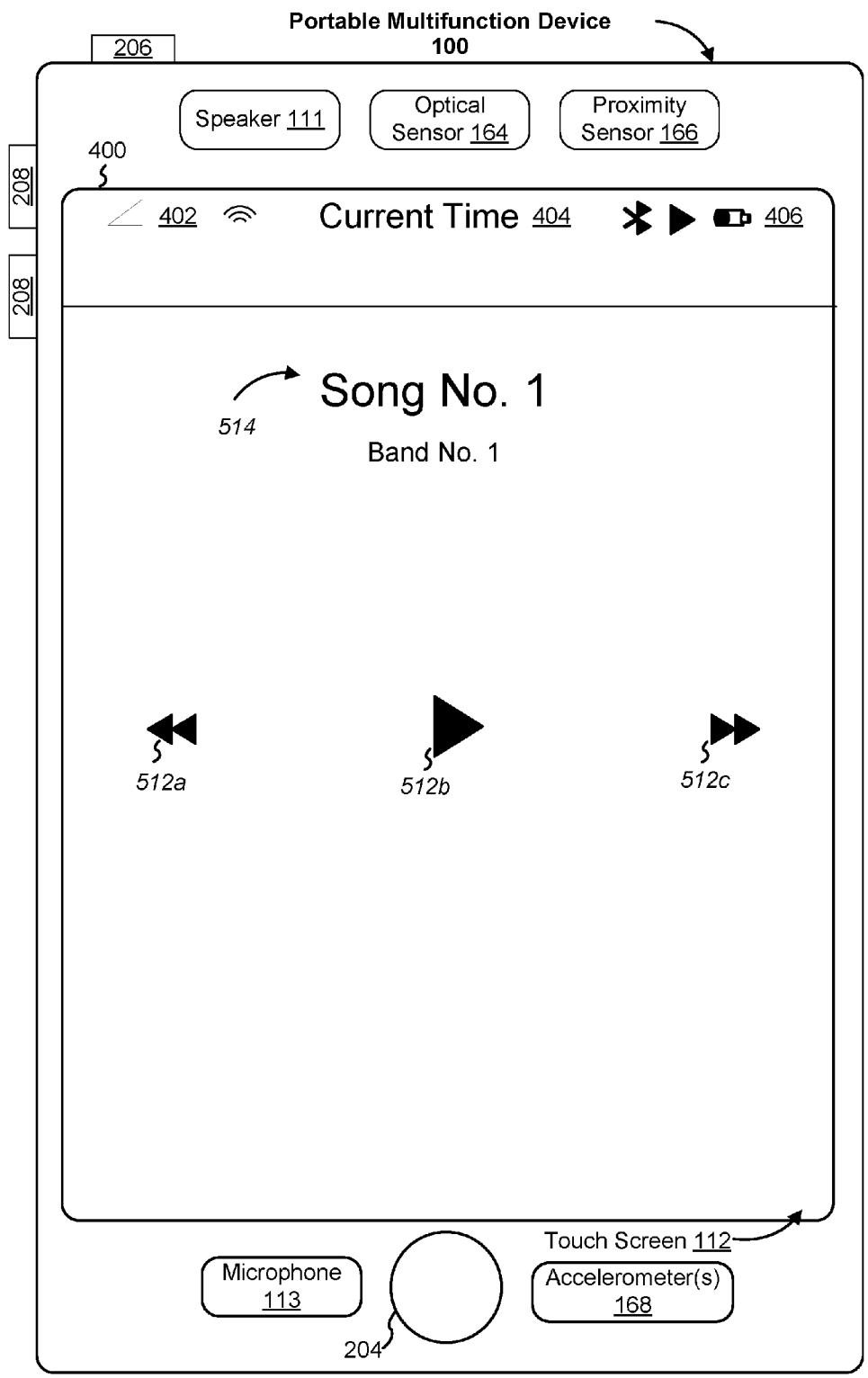
Figure 5M:
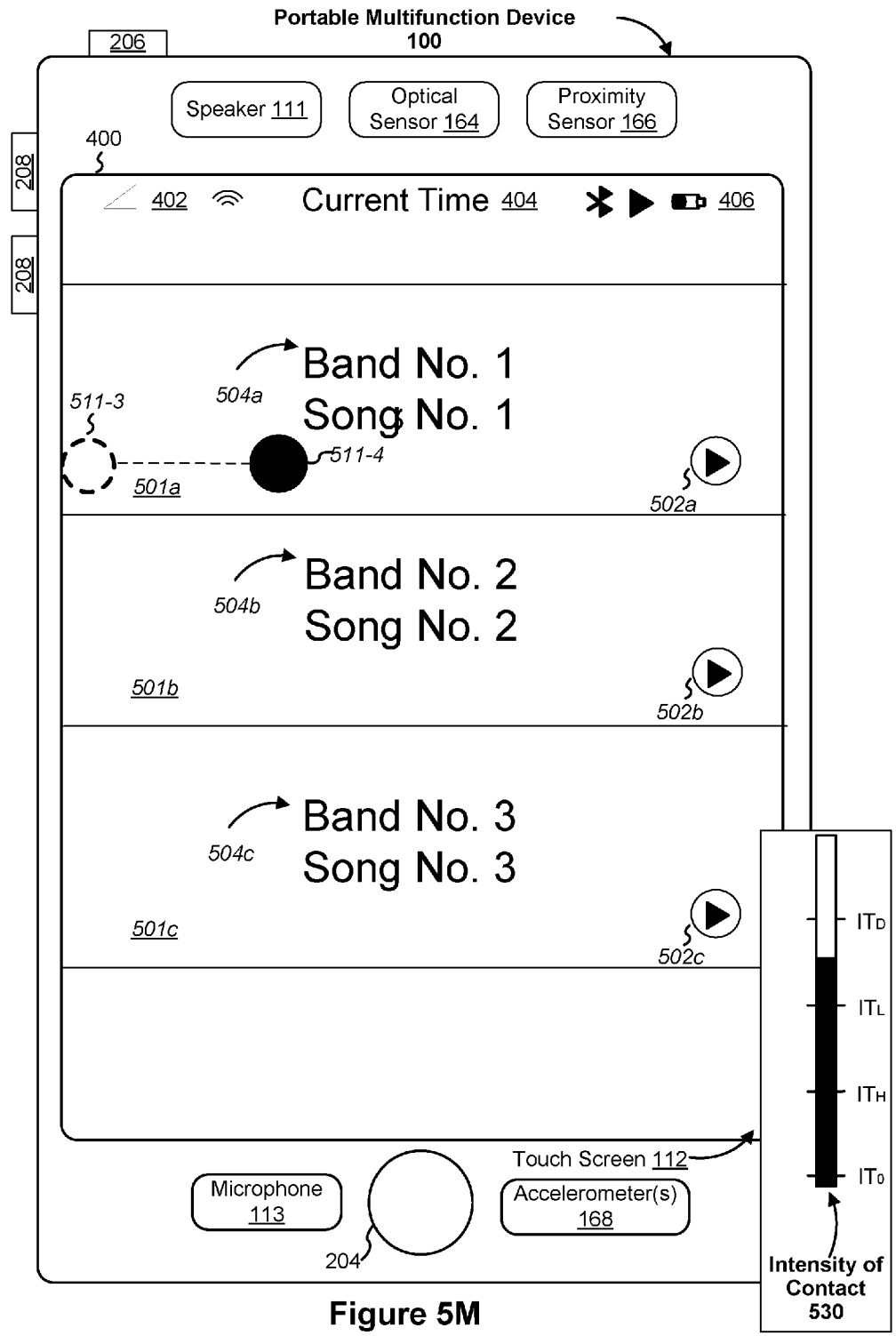
Figure 5N:
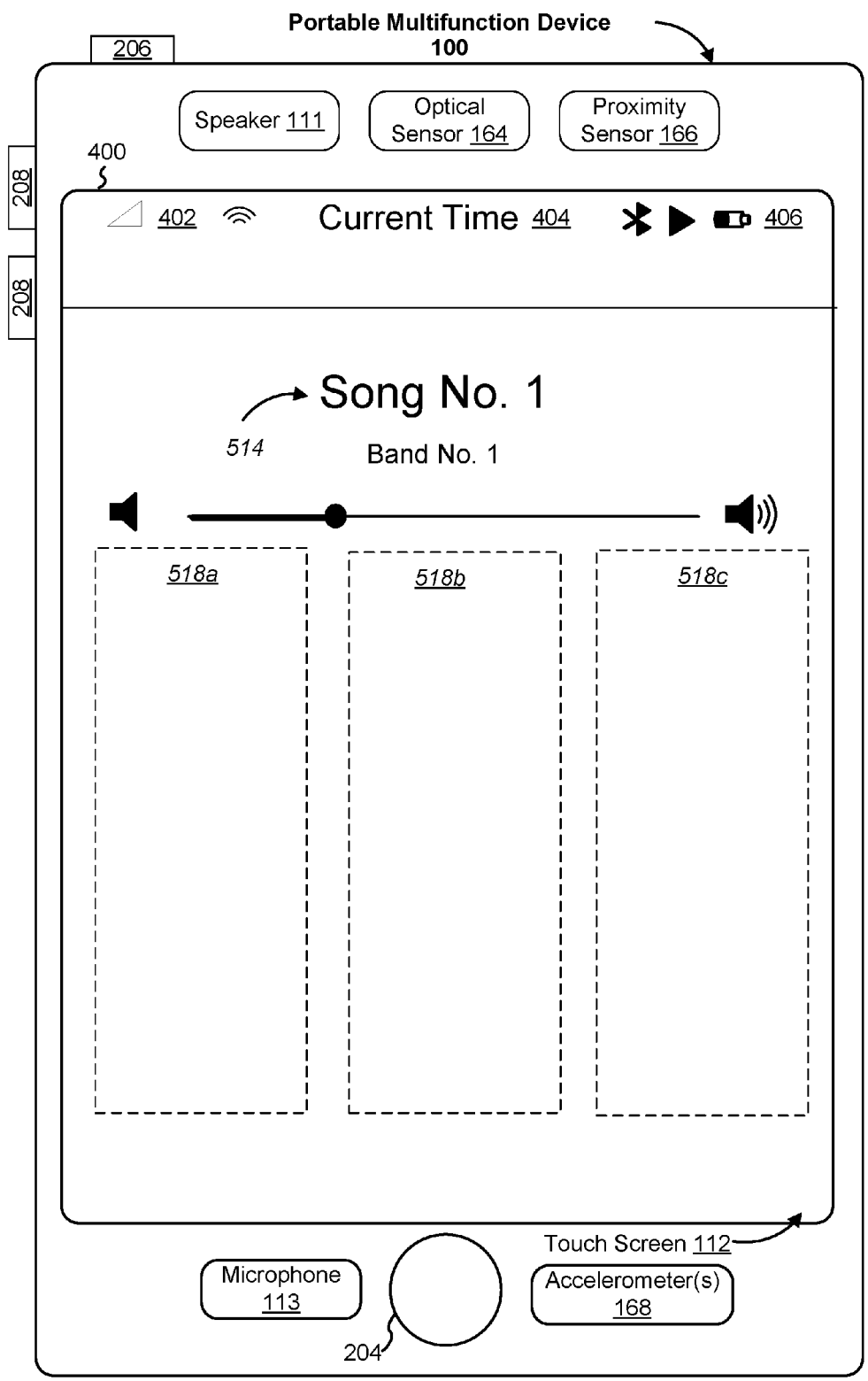
Figure 5O:
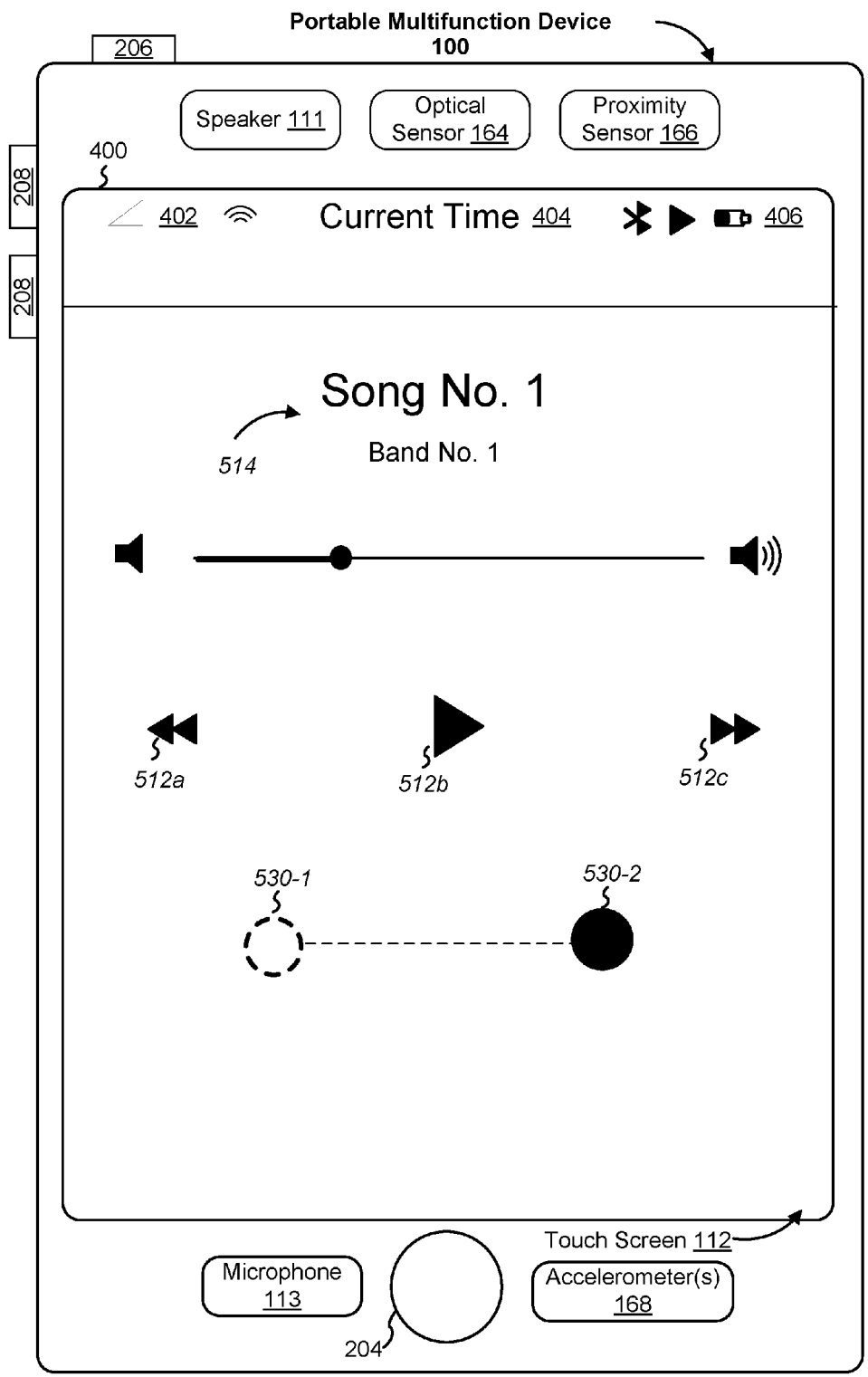

FIGS. 5A-5OO illustrate example user interfaces for media playback control using intensity-based input, in accordance with some embodiments. The user interfaces in these figures are used to illustrate the processes described below, including the processes in FIGS. 6A-6C and 8A-8C.

FIG. 5A illustrates an example user interface on the display 100. The user interface includes a list of different music tracks 501a-501c by different artists. Each music track-501c is associated with a respective play button 502a-502c that, when selected, results in the display of a media player user interface for presenting the associated music track-501c. Each music track-501c is also associated with a respective content label 504a-504c that identifies the band name and song name for each music track 501a-501c.

FIGS. 5B-5D illustrates example user interfaces, displayed subsequent to the user interface of FIG. 5A, to initiate display of, and use, a first media player user interface. In FIG. 5B, the device 100 detects a tap gesture 509-1. In response, the device 100 determines whether to display the first media player user interface based on whether the tap gesture 509-1 remains below a light press intensity threshold $IT_L$. Because the intensity of the tap gesture 509-1 remains below a light press intensity threshold $IT_L$, as illustrated in the intensity of contact chart 530, the device 100 displays the first media player user interface shown in FIG. 5C. The first media player user interface includes a music track label 514 identifying music track selected by the user via the tap gesture 509-1 shown in FIG. 5B. The first media player user interface also includes a rewind icon 512a, player icon 512b and fast-forward icon 512c which causes the device to rewind, play or fast-forward the music track based on activation of the icons 512a-512c, respectively. For example, in FIG. 5C, the device 100 detects a tap gesture 510-1 on player icon 512b. Subsequently, as shown in FIG. 5D, the device 100 presents music track via speaker 111 (as illustrated by sound waves 526 emanating from the device 100) in response to activation of player icon 512b.

FIGS. 5E-5J illustrates example user interfaces, displayed subsequent to the example user interface of FIG. 5A, to initiate display of, and use, a second media player user interface. In FIG. 5E, the device 100 detects a tap gesture 509-2. In response, the device 100 determines whether to display the second media player user interface based on whether the tap gesture 509-2 exceeds a light press intensity threshold $IT_L$. Because the intensity of the tap gesture 509-2 exceeds the light press intensity threshold $IT_L$, the device 100 displays the second media player user interface shown in FIG. 5F. In FIG. 5F, the second media player user interface includes a music track label 514 identifying the music track selected by the user via the tap gesture 510-2 shown in FIG. 5E. The second media player user interface also includes a rewind zone 518a, play zone 518b and fast-forward zone 518c that are typically not visible to the user. Each of the zones 518a-518c includes functionality that corresponds to the functionality of icons 512a-512c shown in FIG. 5C. For example, device 100 presents the music track via speaker 111 in response to activation of player zone 518b (e.g., such as by a tap gesture 510-2 with an intensity that exceeds a light press intensity threshold $IT_L$ as shown in FIG. 5G-5H and illustrated as sound waves 526 emanating from device 100 as shown in FIG. 5H), rewinds the music track in response to activation of the rewind zone 518a and fast forwards the music track in response to activation of the fast-forward zone 518c. In some embodiments, as shown in FIGS. 5I-5J, the device detects a tap gesture 510-3. In response, the device 100 determines whether to continue playing, or pause, the music track based on whether the tap gesture 510-3 exceeds a light press intensity threshold $IT_L$. Because the intensity of the tap gesture 510-3 does not exceed the light press intensity threshold $IT_L$, the device 100 continues to play the selected music track, as shown in FIG. 5J.

FIGS. 5K-5L illustrates alternative example user interfaces, displayed subsequent to the example user interface of FIG. 5A, to initiate display of the first media player user interface. In FIG. 5K, the device 100 detects a swipe gesture 511-2 moving from an initial position 511-1 at a perimeter of the display 400. In response, the device 100 determines whether to display a first media player user interface based on whether the swipe gesture 511-2 is moving from the perimeter of the display 400 and a characteristic intensity of the swipe gesture 511-2 remains below a light press intensity threshold $IT_L$. In this example, because the swipe gesture 511-2 is moving from the perimeter of the display 400 and a characteristic intensity of the swipe gesture 511-2 remains below the light press intensity threshold $IT_L$, the device 100 displays the first media player user interface, as shown in FIG. 5L.

FIGS. 5M-5N illustrates alternative example user interfaces, displayed subsequent to the example user interface of FIG. 5A, to initiate display of the second media player user interface. In FIG. 5M, the device 100 detects a swipe gesture 511-4 moving from an initial position 511-3 at a perimeter of the display 400. In response, the device 100 determines whether to display a second media player user interface based on whether the swipe gesture 511-4 is moving from the perimeter of the display 400 and a characteristic intensity of the swipe gesture 511-4 exceeds a light press intensity threshold $IT_L$. In this example, because the swipe gesture 511-4 is moving from the perimeter of the display 400 and a characteristic intensity of the swipe gesture 511-4 exceeds the light press intensity threshold $IT_L$, the device 100 displays the second media player user interface, as shown in FIG. 5N.

Figure 5P:
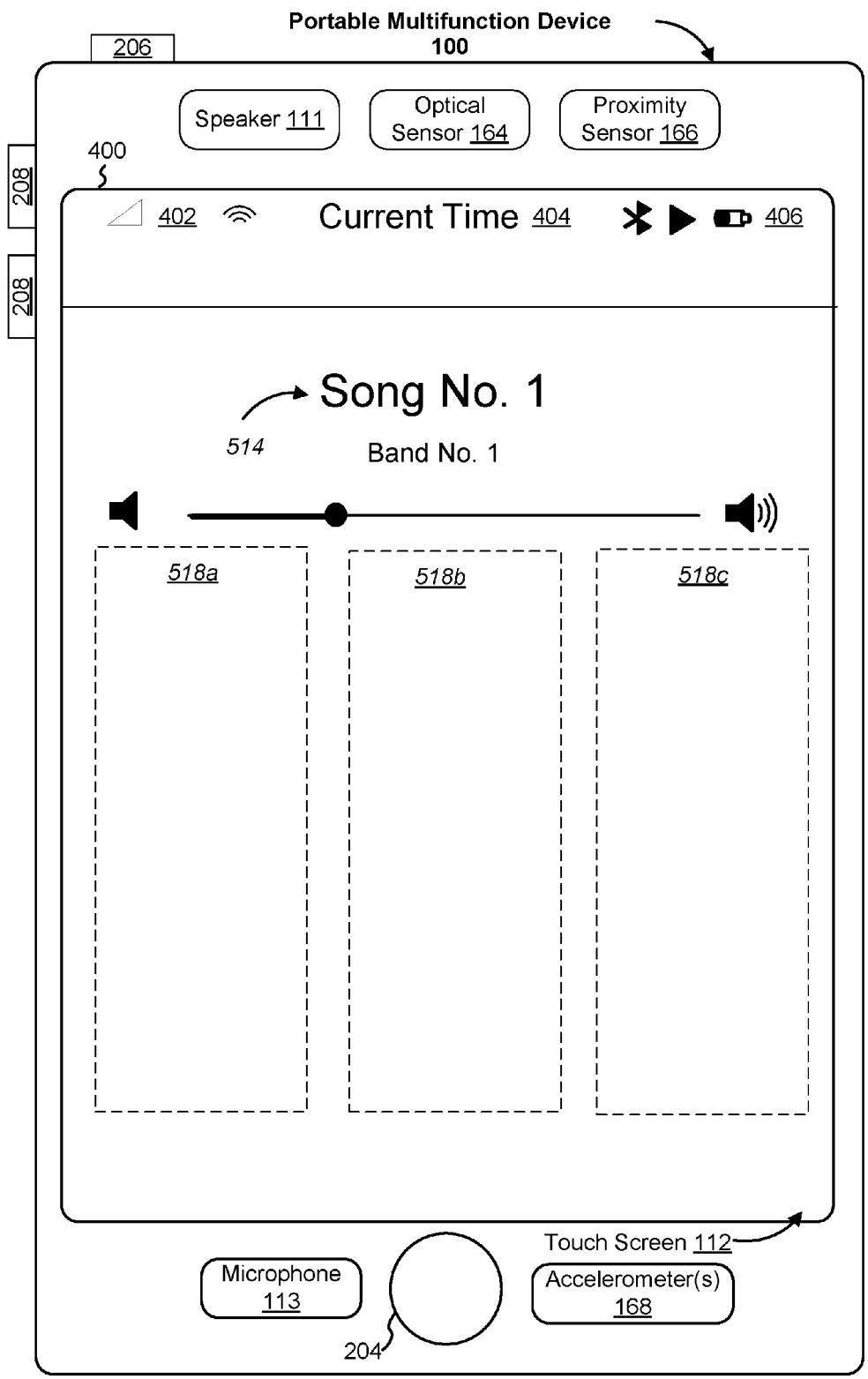

FIGS. 5O-5P illustrate example user interfaces for toggling between the first media player user interface and the second media player user interface. FIG. 5O shows the device 100 displaying the first media player user interface. In this example, the device 100 detects a swipe gesture 530-2 moving from an initial position 530-1. In response, the device 100 determines whether to display the second media player user interface based on whether the swipe gesture 530-2 is moving. In this example, because the swipe gesture 530-2 is moving, the device 100 toggles to display of the second media player user interface, as shown in FIG. 5P.

Figure 5Q:
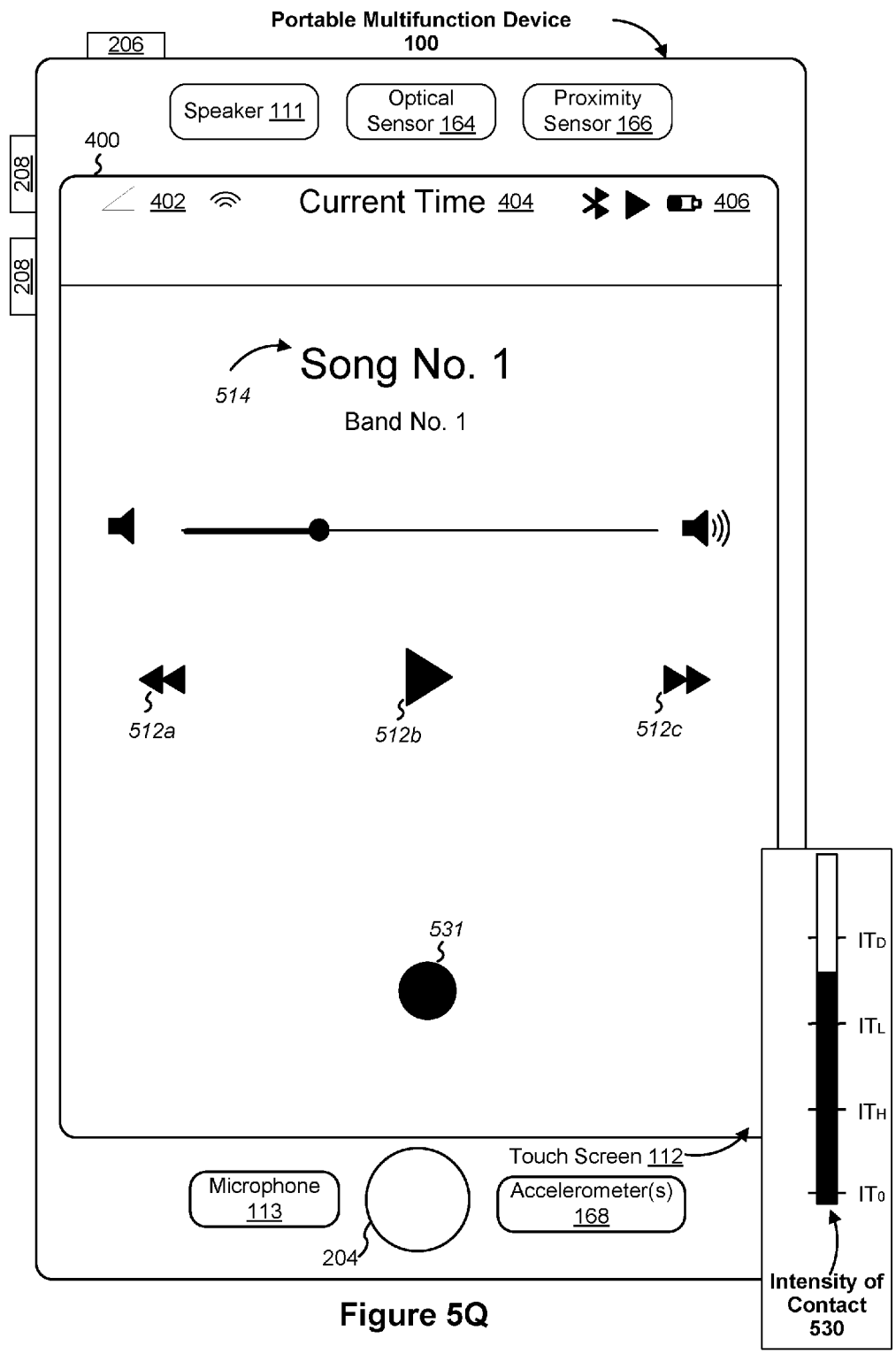
Figure 5R:
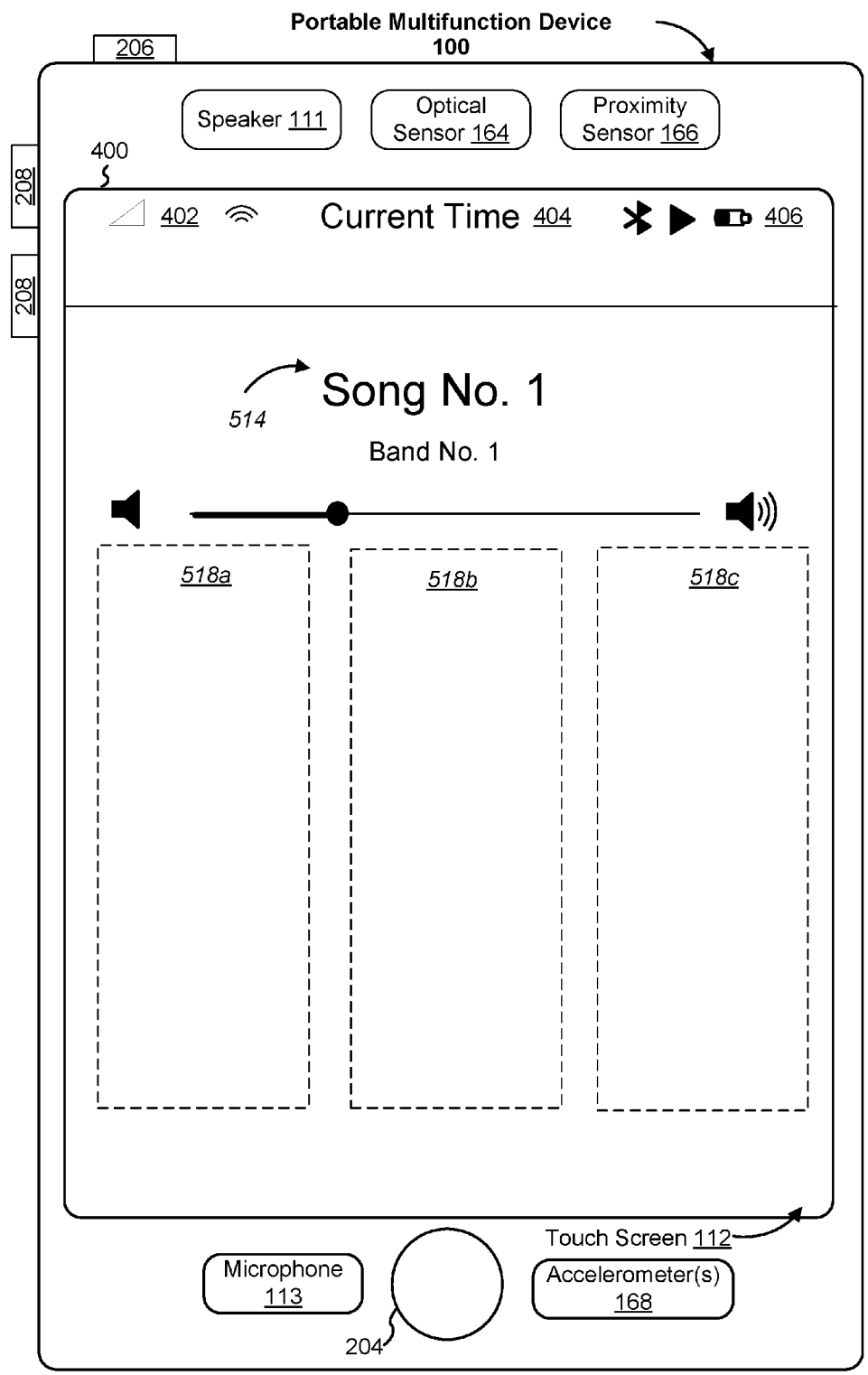

FIG. 5Q-5R illustrate alternative example user interfaces for toggling between the first media player user interface and the second media player user interface. FIG. 5Q shows the device 100 displaying the first media player user interface. In this example, the device 100 detects a tap gesture 531. In response, the device 100 determines whether to display a second media player user interface based on whether the tap gesture 531 exceeds a light press intensity threshold $IT_L$. In this example, because the tap gesture 531 exceeds the light press intensity threshold $IT_L$, the device 100 toggles to display of the second media player user interface as shown in FIG. 5R.

Figure 5S:
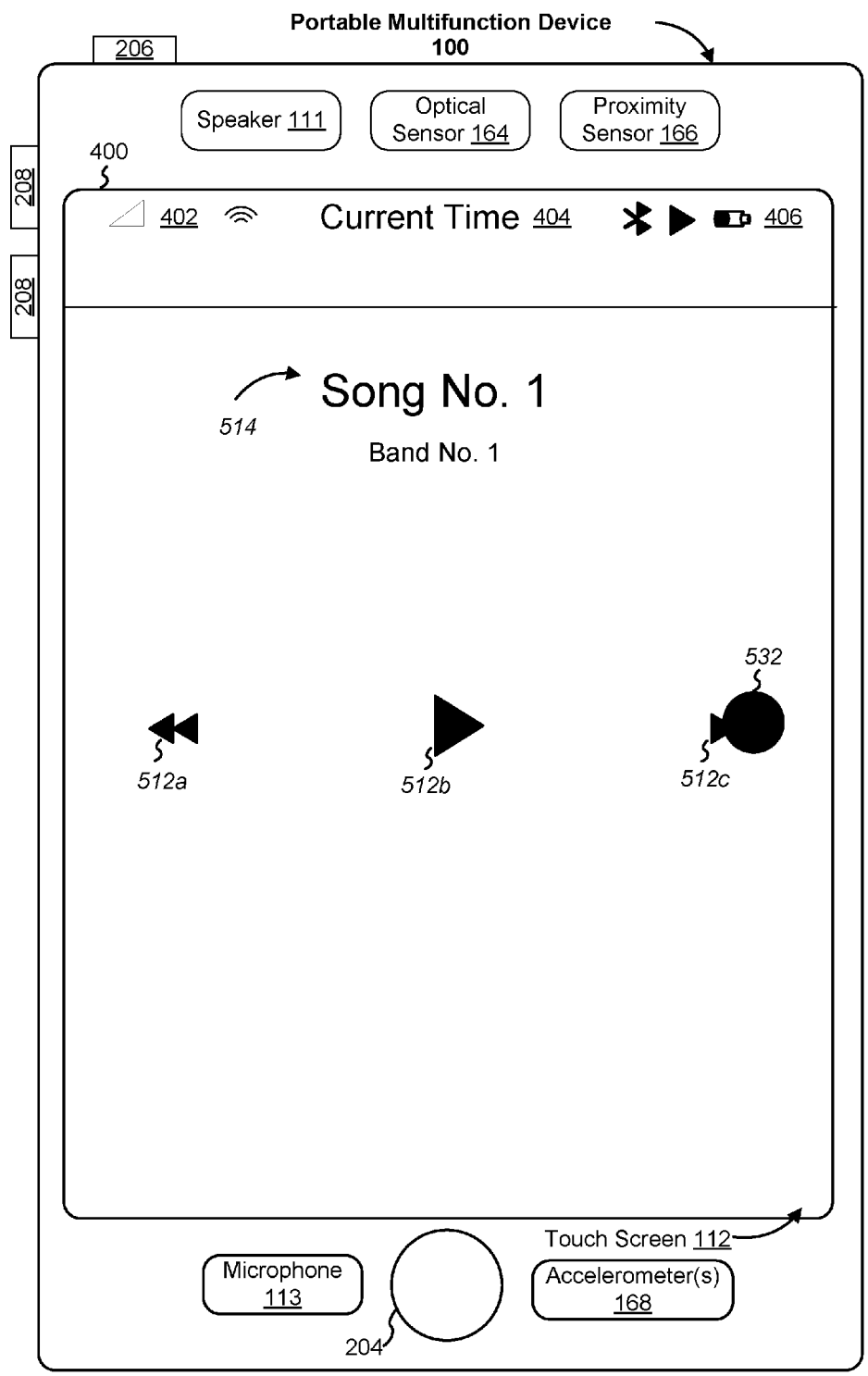
Figure 5T:
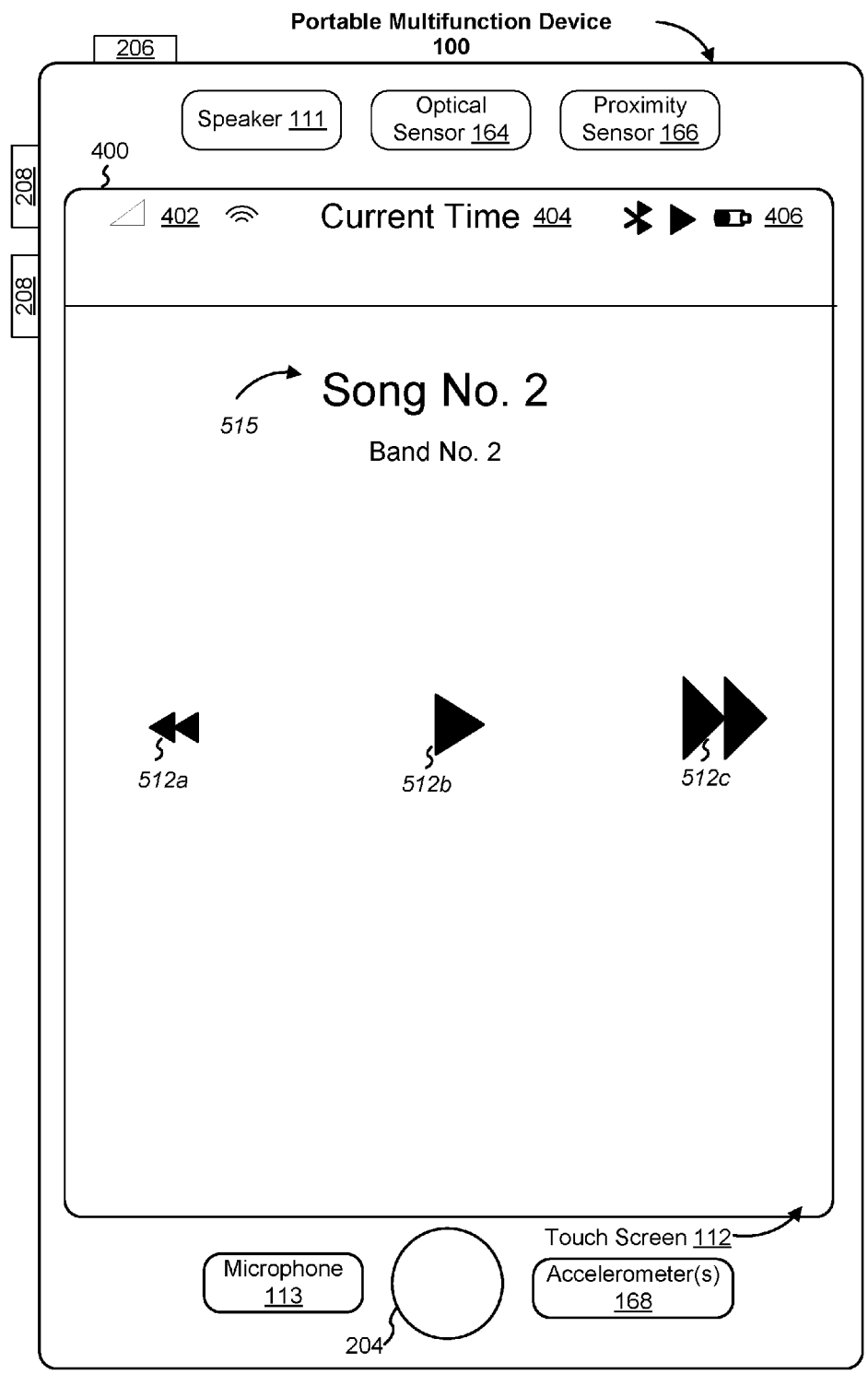

FIGS. 5S-5T illustrate example user interfaces showing an example feedback response by the device 100 while displaying the first media player user interface. In FIG. 5S, the device 100 displays the first media player user interface playing music track Song No. 1 by Band No. 1, illustrated by music track label 514. The device detects a tap gesture 532 of fast-forward icon 512c, as shown in FIG. 5S. In response, as shown in FIG. 5T, the device 100 enlarges the fast-forward icon 512c as compared to rewind icon 512a and play icon 512b. In addition, the device 100 transitions to music track Song No. 2 by Band No. 2, illustrated by music track label 515.

Figure 5U:
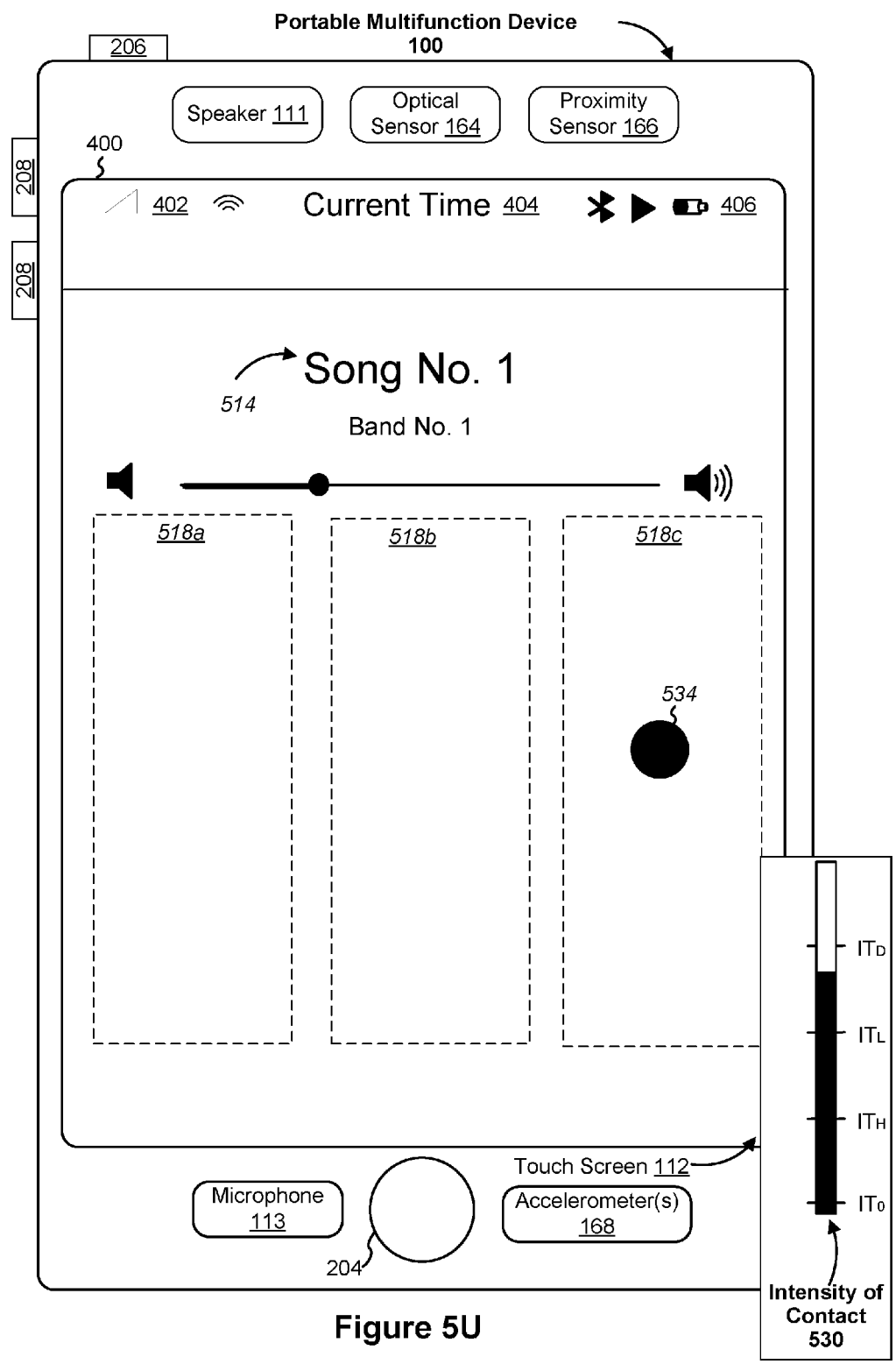
Figure 5V:
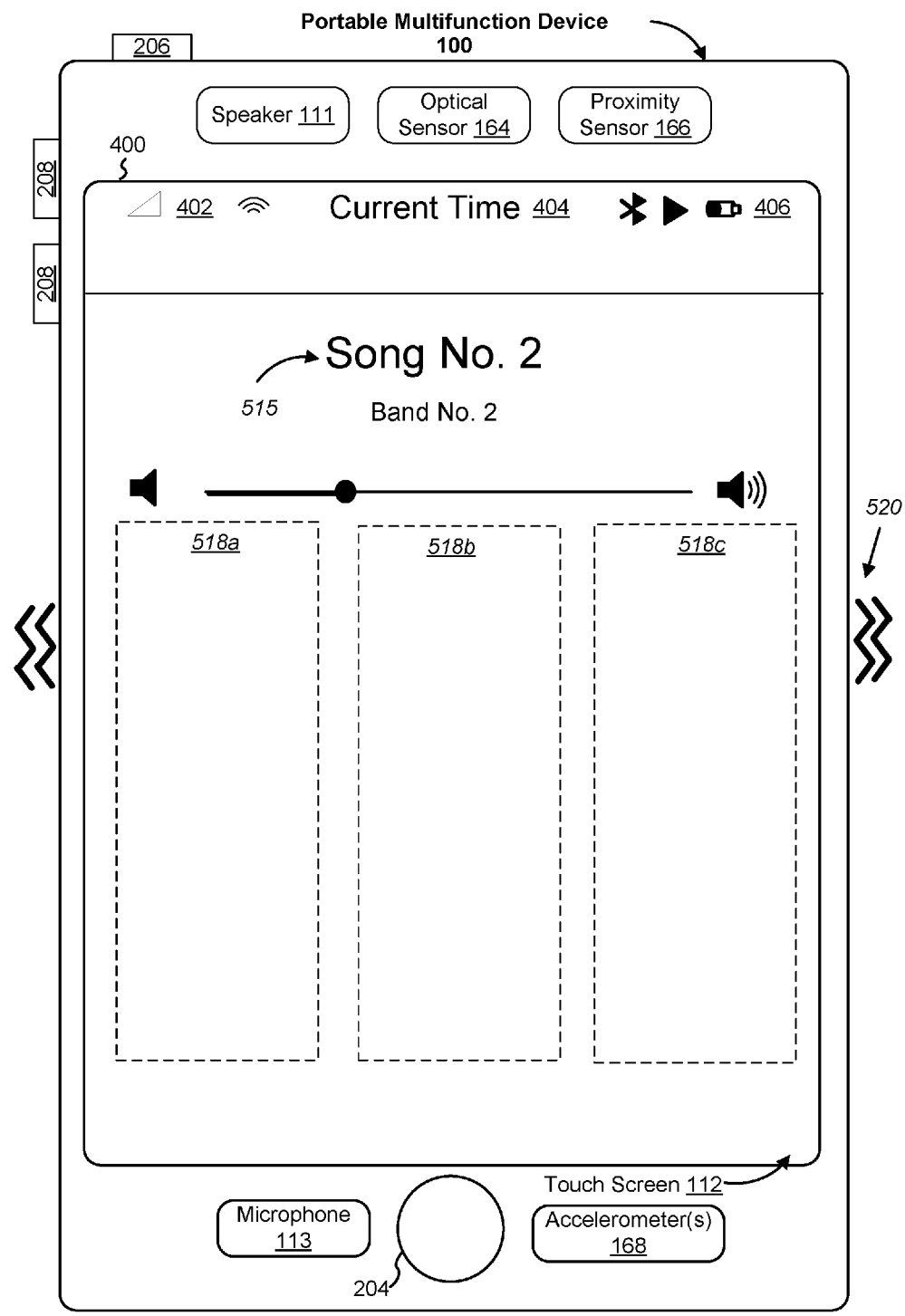
Figure 5W:
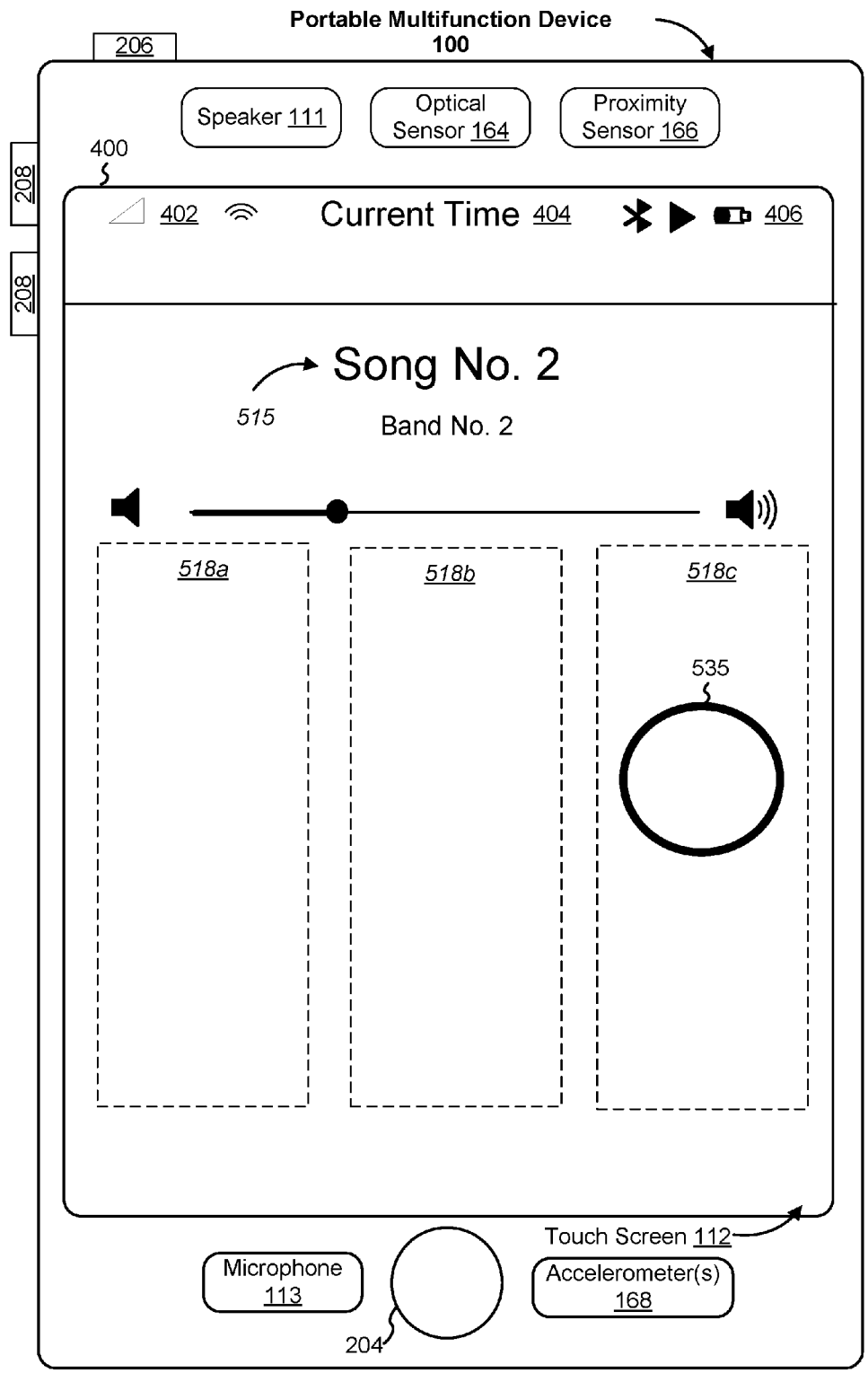

FIGS. 5U-5V illustrate example user interfaces showing an example feedback response by the device 100 while displaying the second media player user interface. In FIG. 5U, the device 100 displays the second media player user interface playing music track Song No. 1 by Band No. 1, illustrated by music track label 514. The device 100 detects a tap gesture 534, at fast-forward zone 518c, with a characteristic intensity that exceeds a light press intensity threshold $IT_L$. In response, as shown in FIG. 5V, the device 100 vibrates, as illustrated by haptic feedback lines 520. In addition, the device 100 transitions to music track Song No. 2 by Band No. 2, illustrated by music track label 515. Alternatively or in addition to providing haptic feedback 520, as shown in FIG. 5W, the device 100 displays a solid line circle 535 or other graphic at the position of the user input 534, shown in FIG. 5U, in response to detecting the tap gesture 534 at fast-forward zone 518c with a characteristic intensity that exceeds a light press intensity threshold $IT_L$. In addition, in either example, the device 100 transitions to music track Song No. 2 by Band No. 2, illustrated by music track label 515.

Figure 5X:
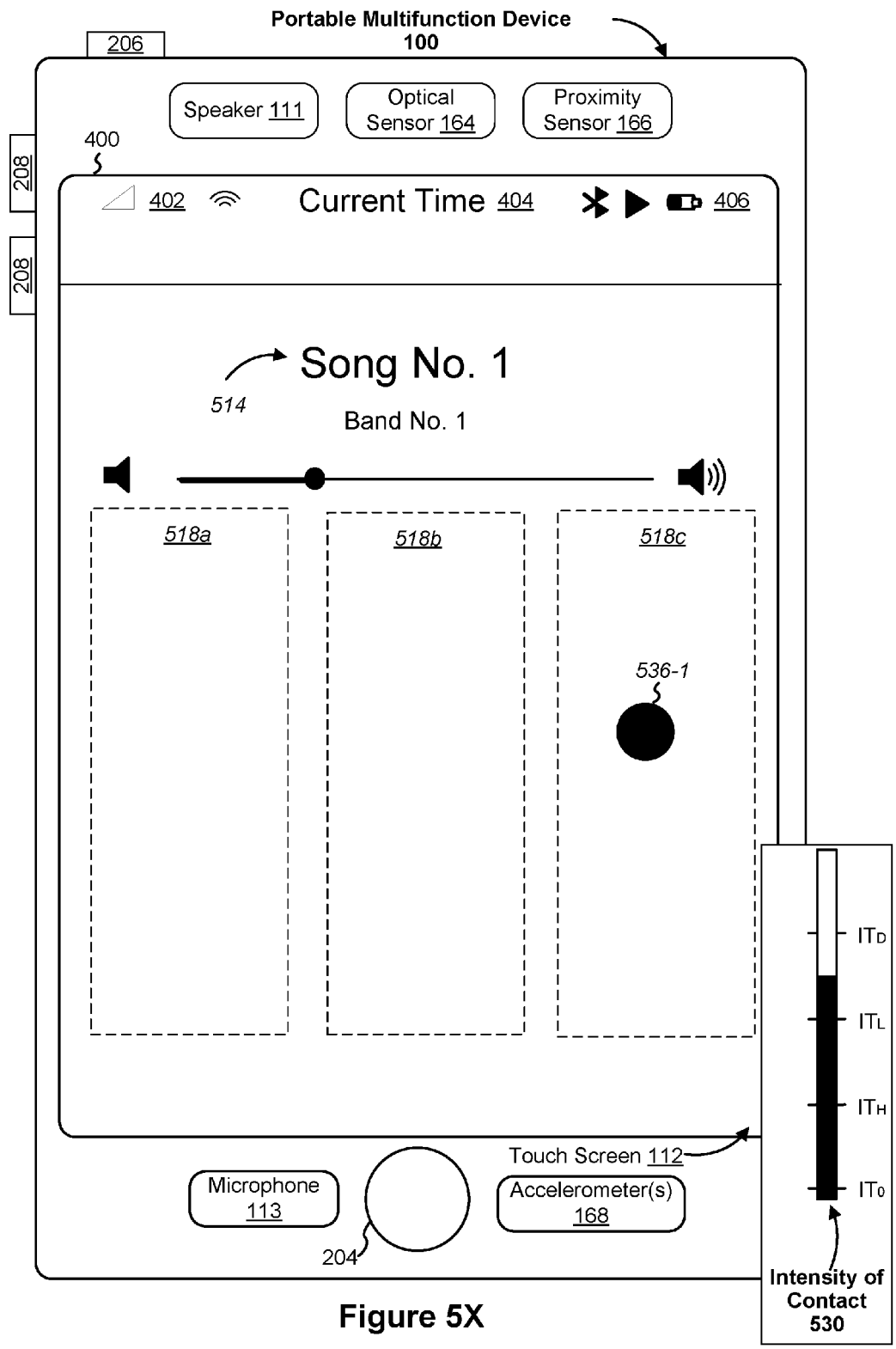
Figure 5Y:
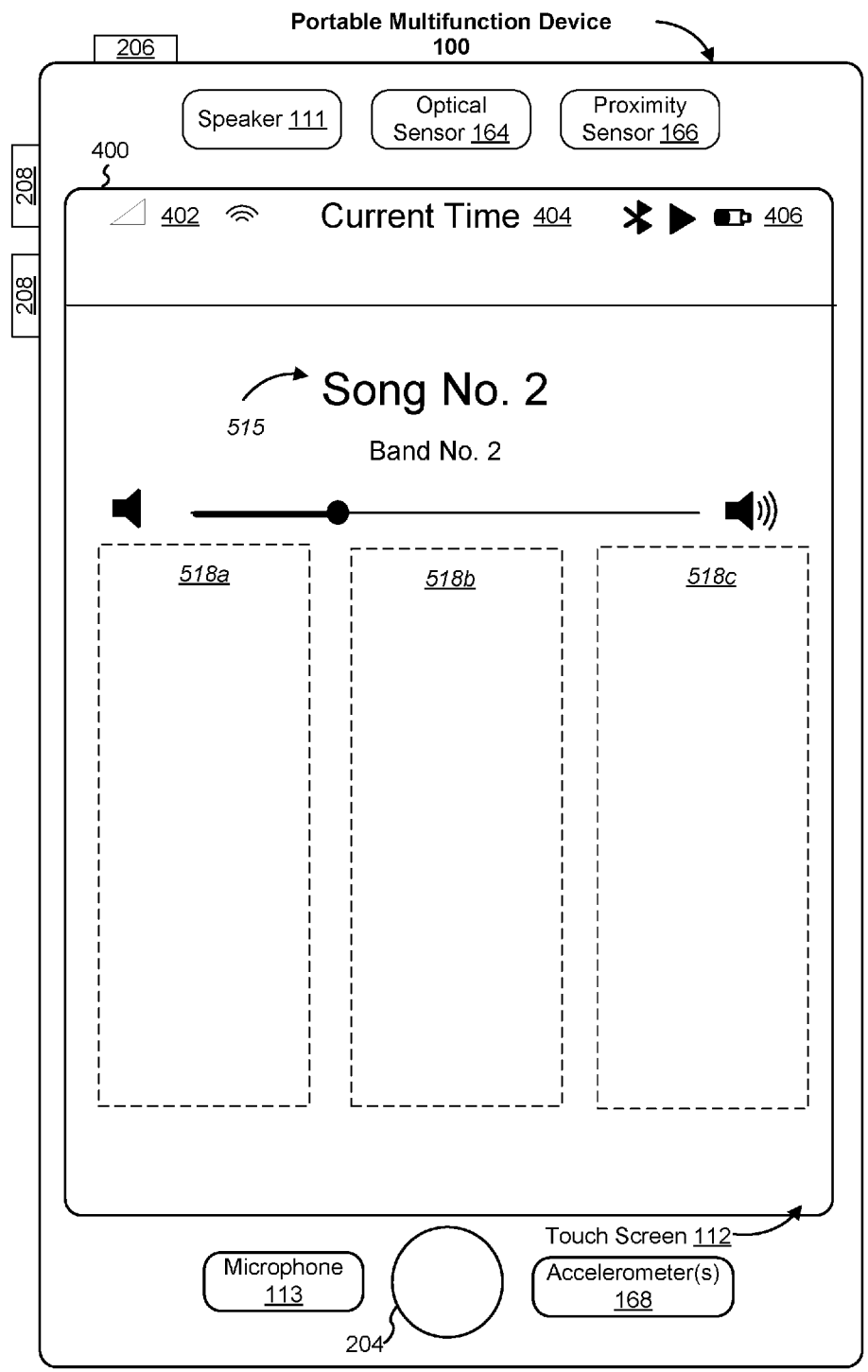
Figure 5Z:
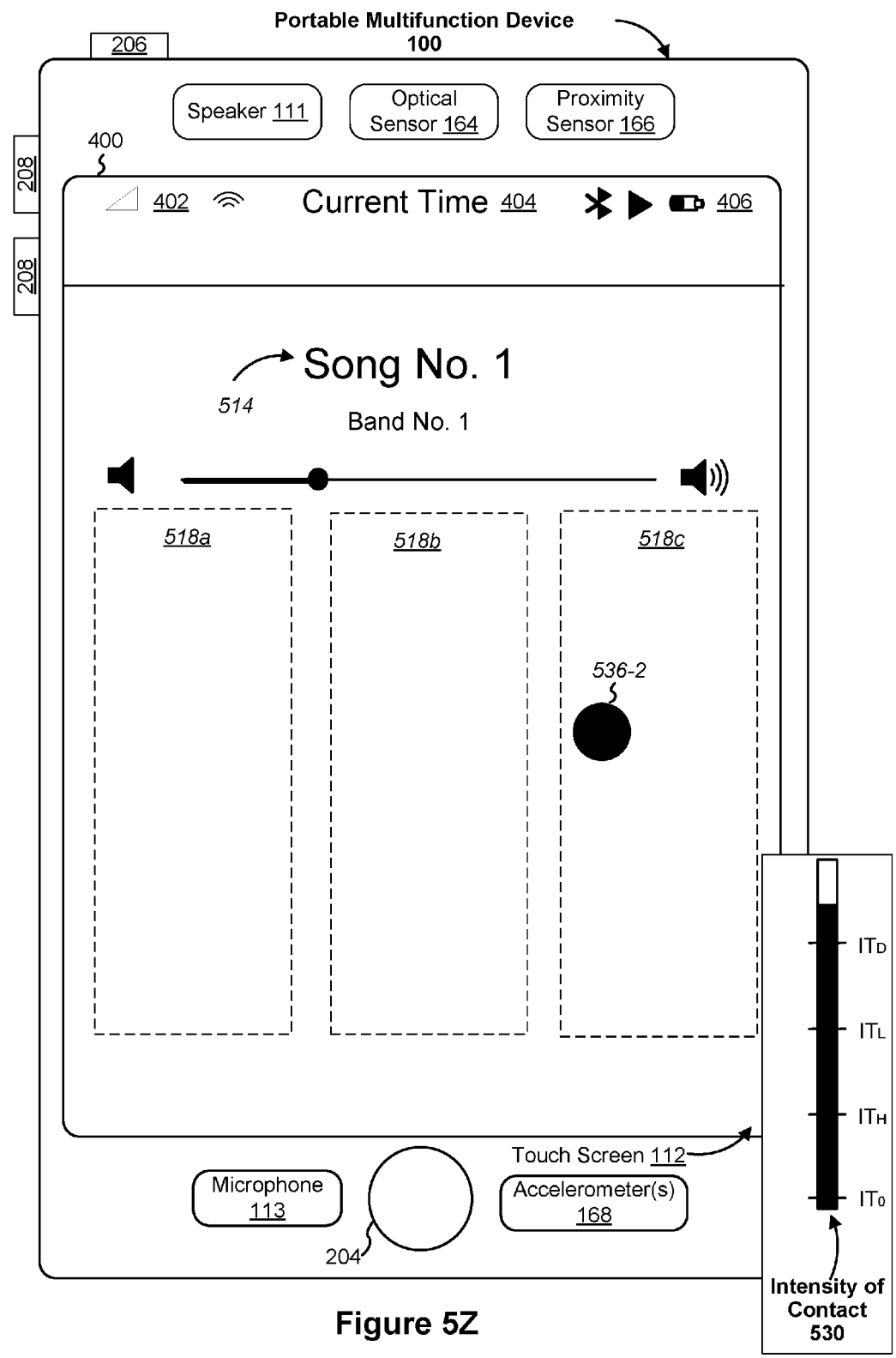
Figure 5A:
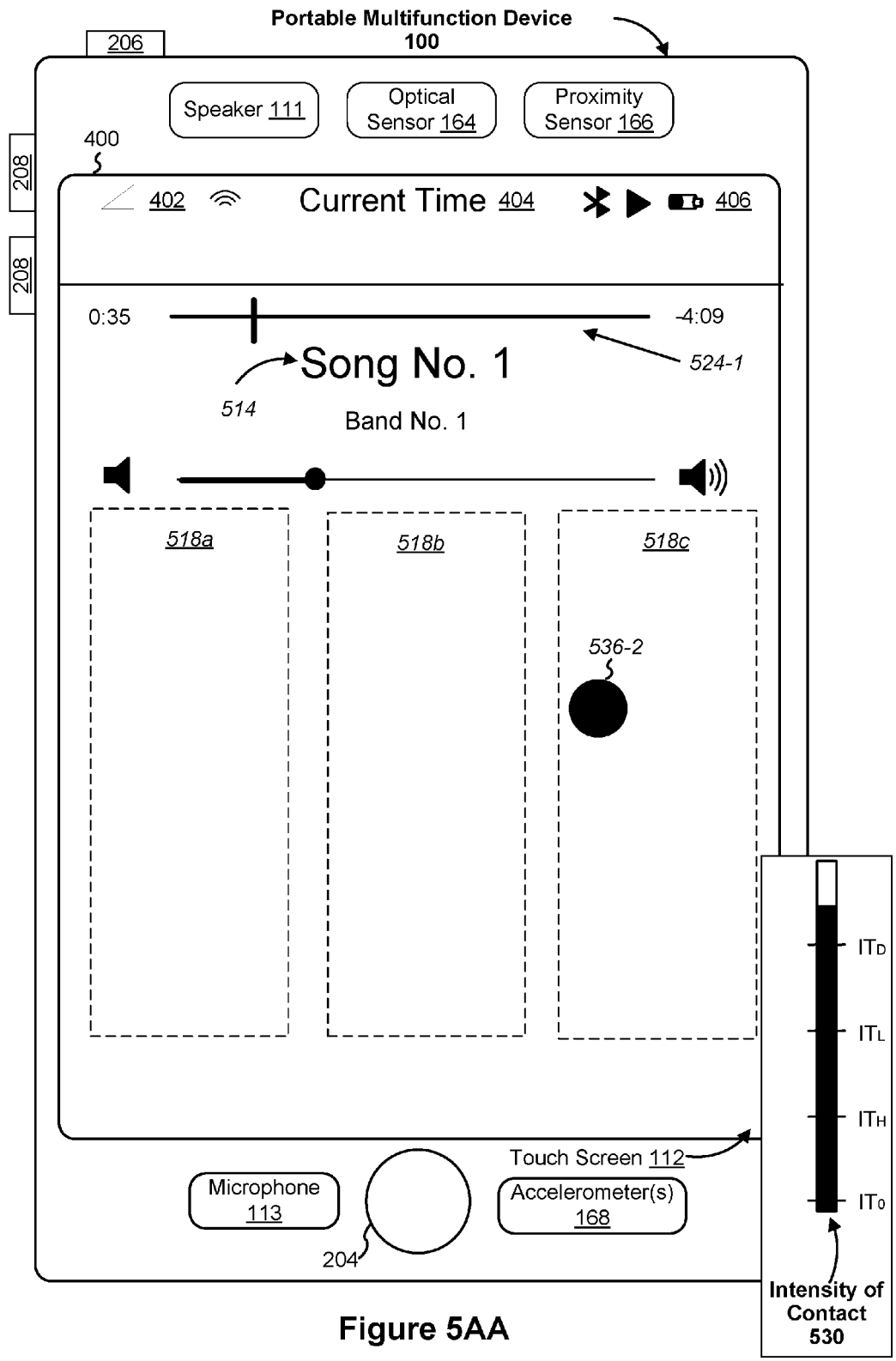
Figure 5B:
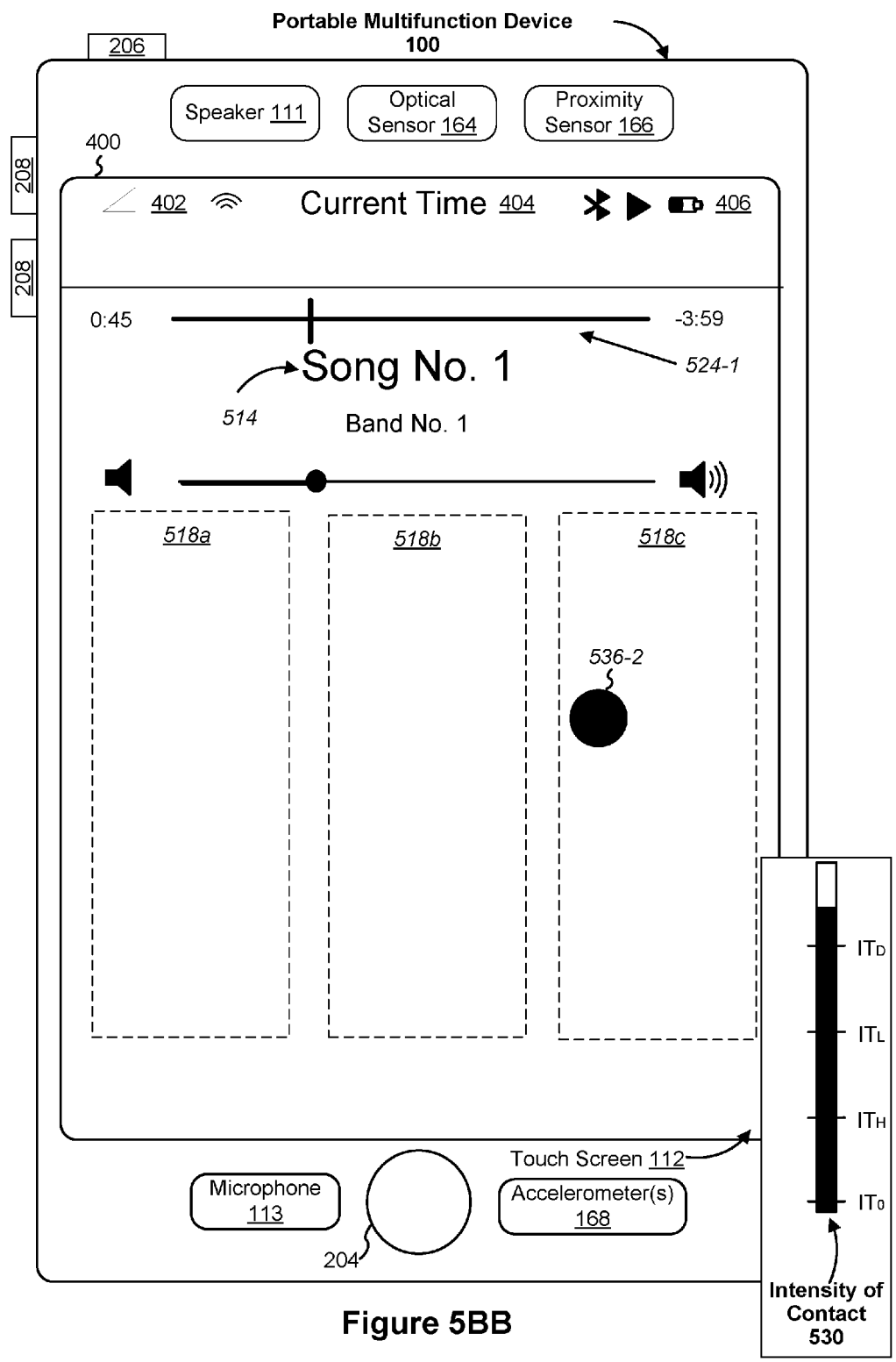
Figure 5C:
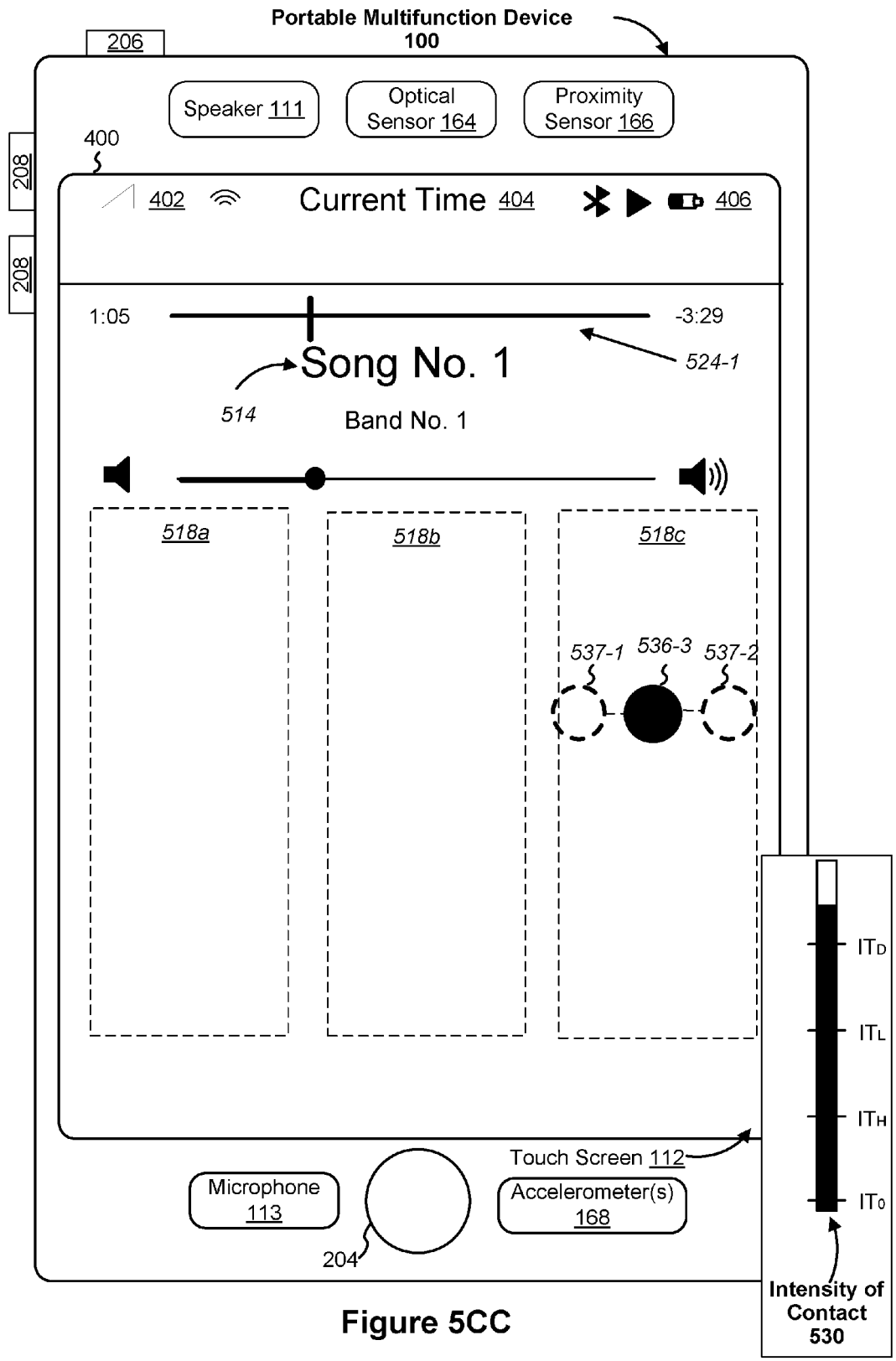
Figure 5D:
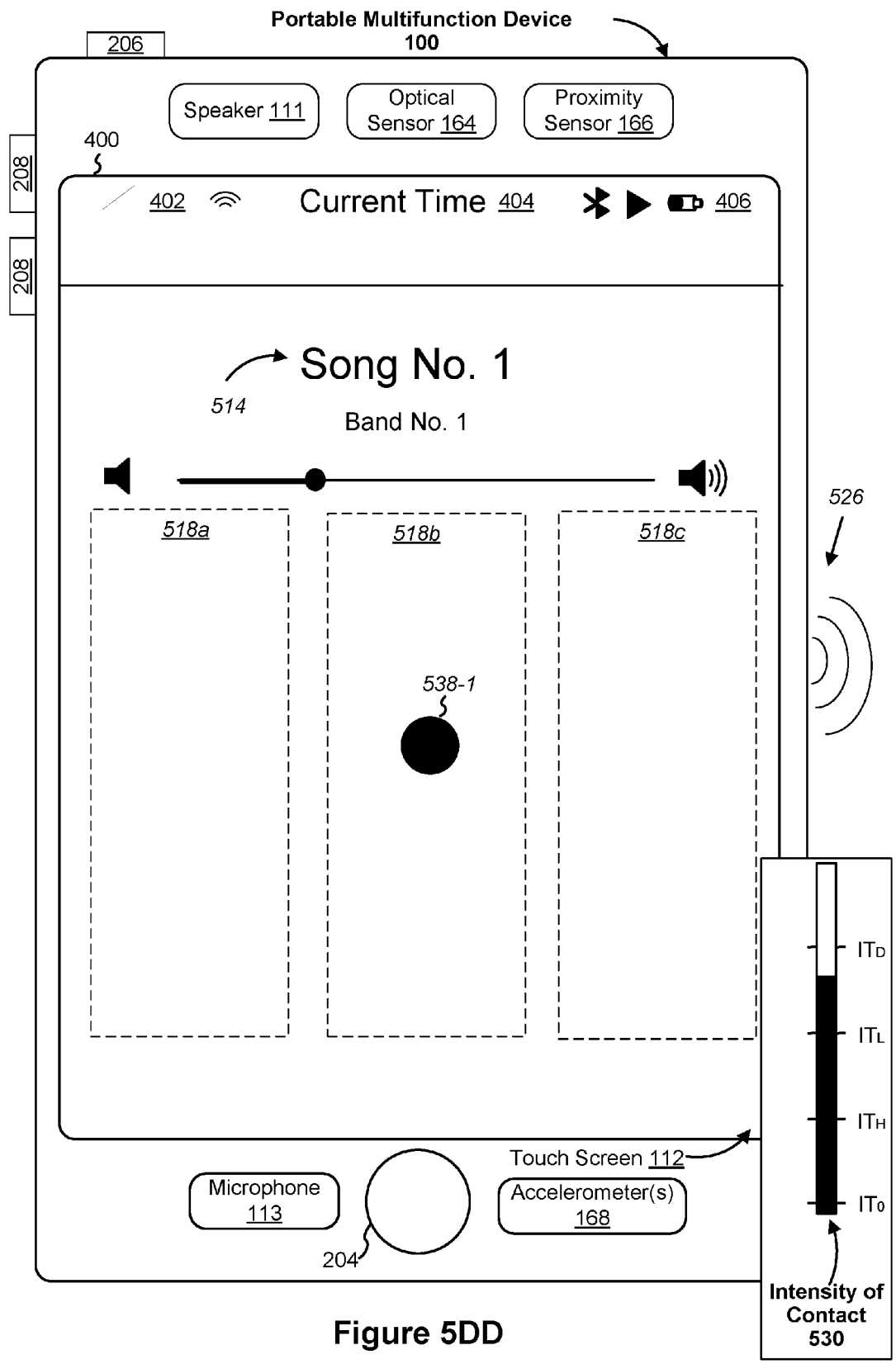
Figure 5E:
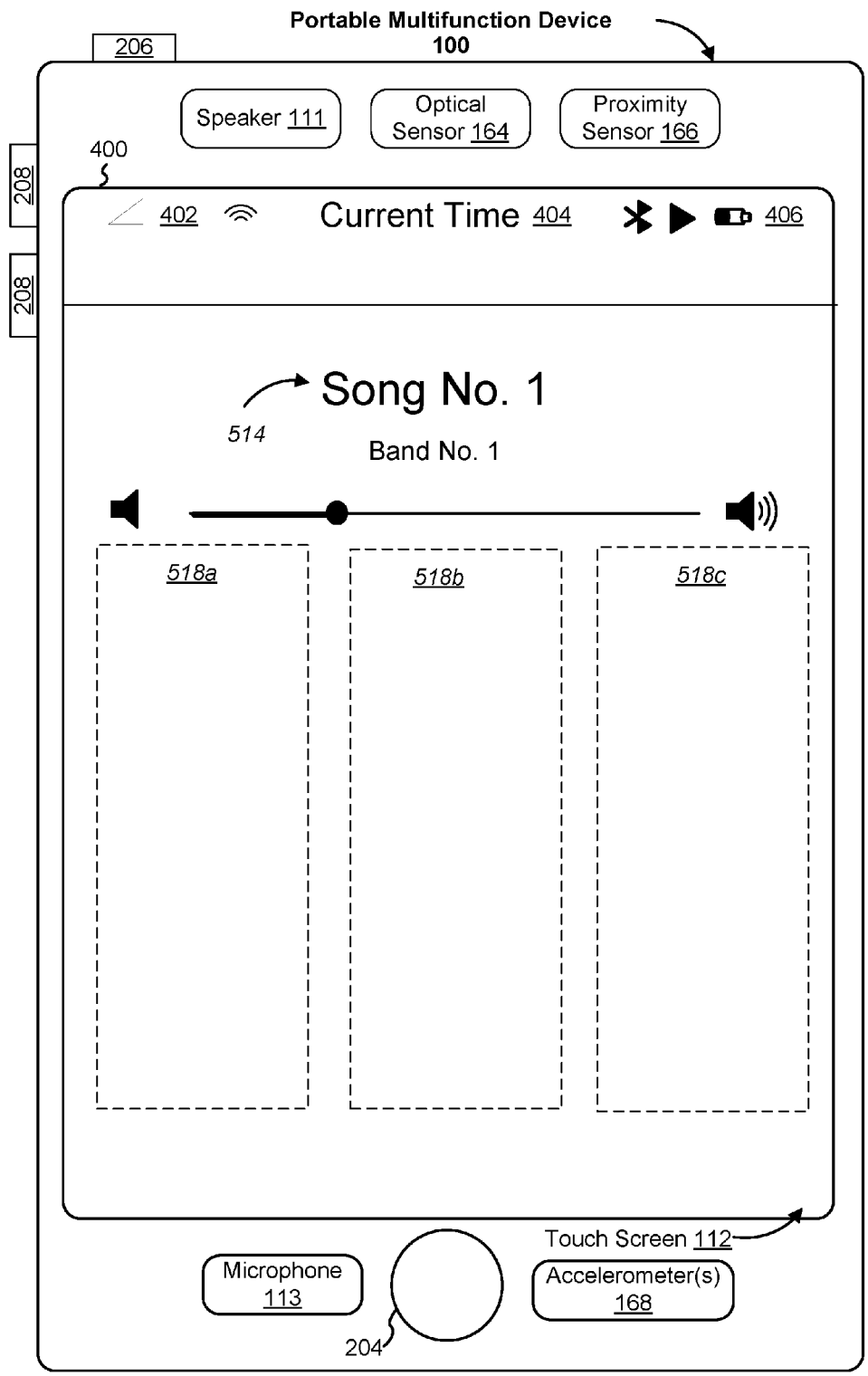
Figure 5F:
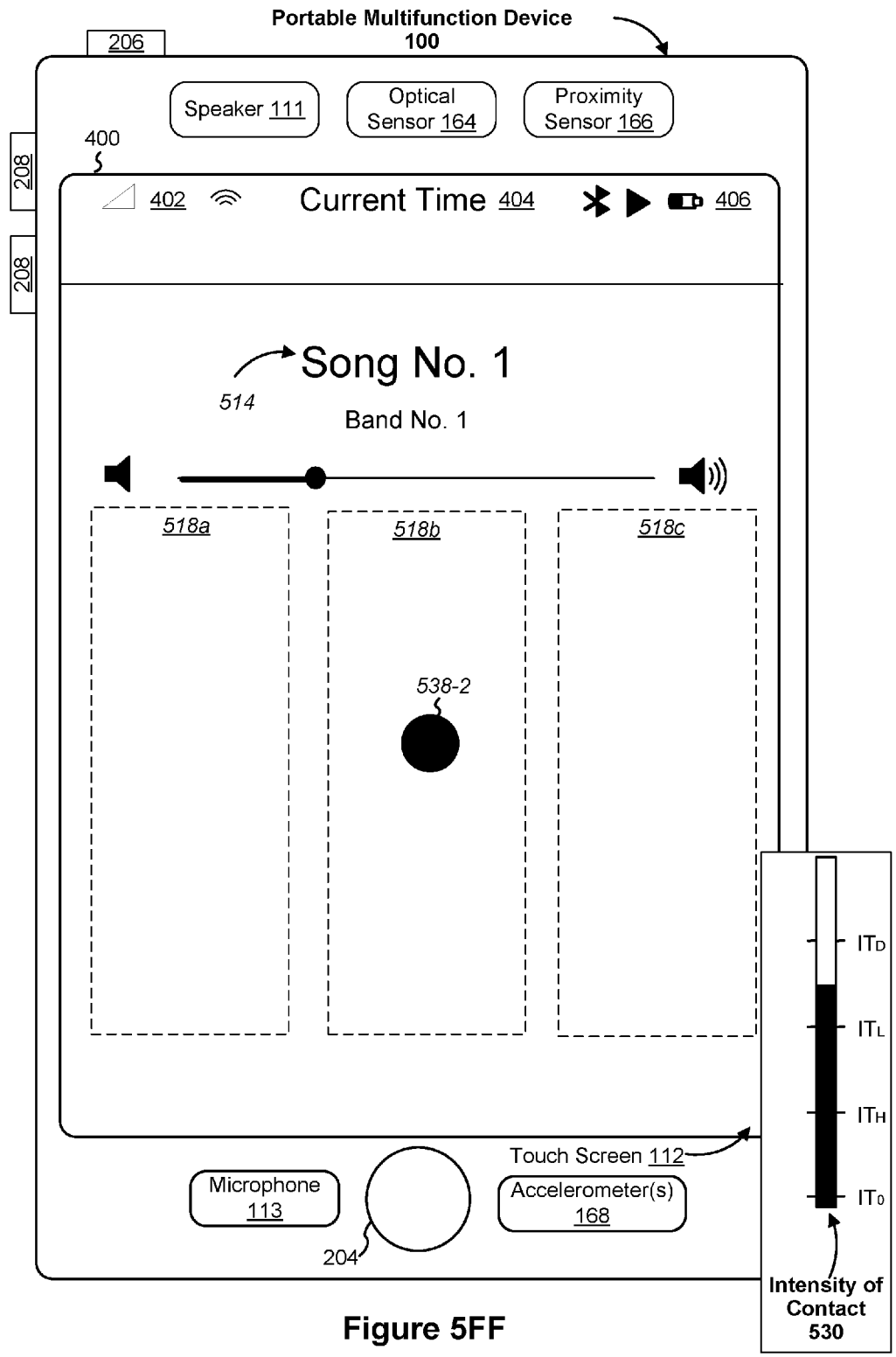
Figure 5G:
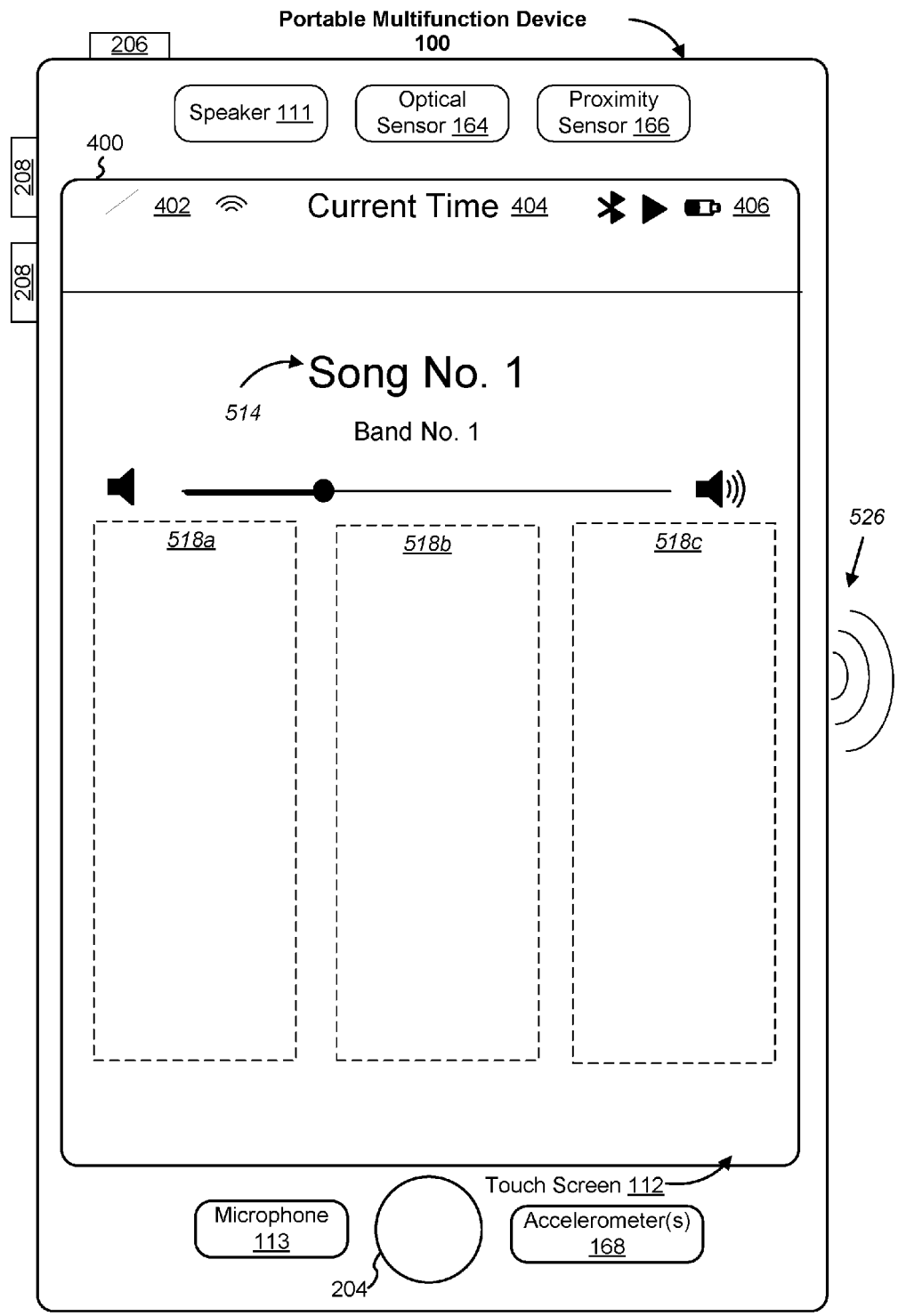
Figure 5H:
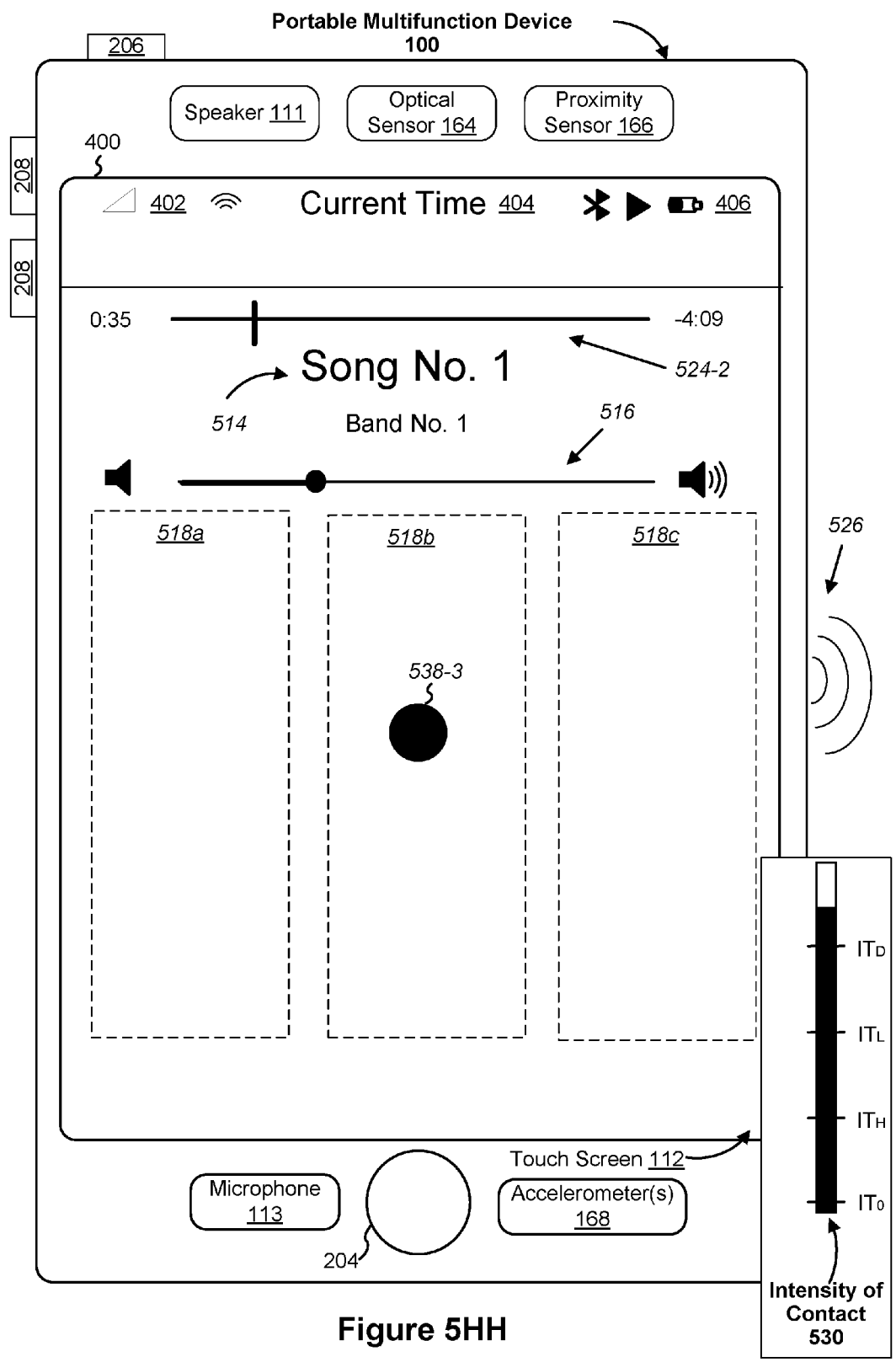
Figure 5I:
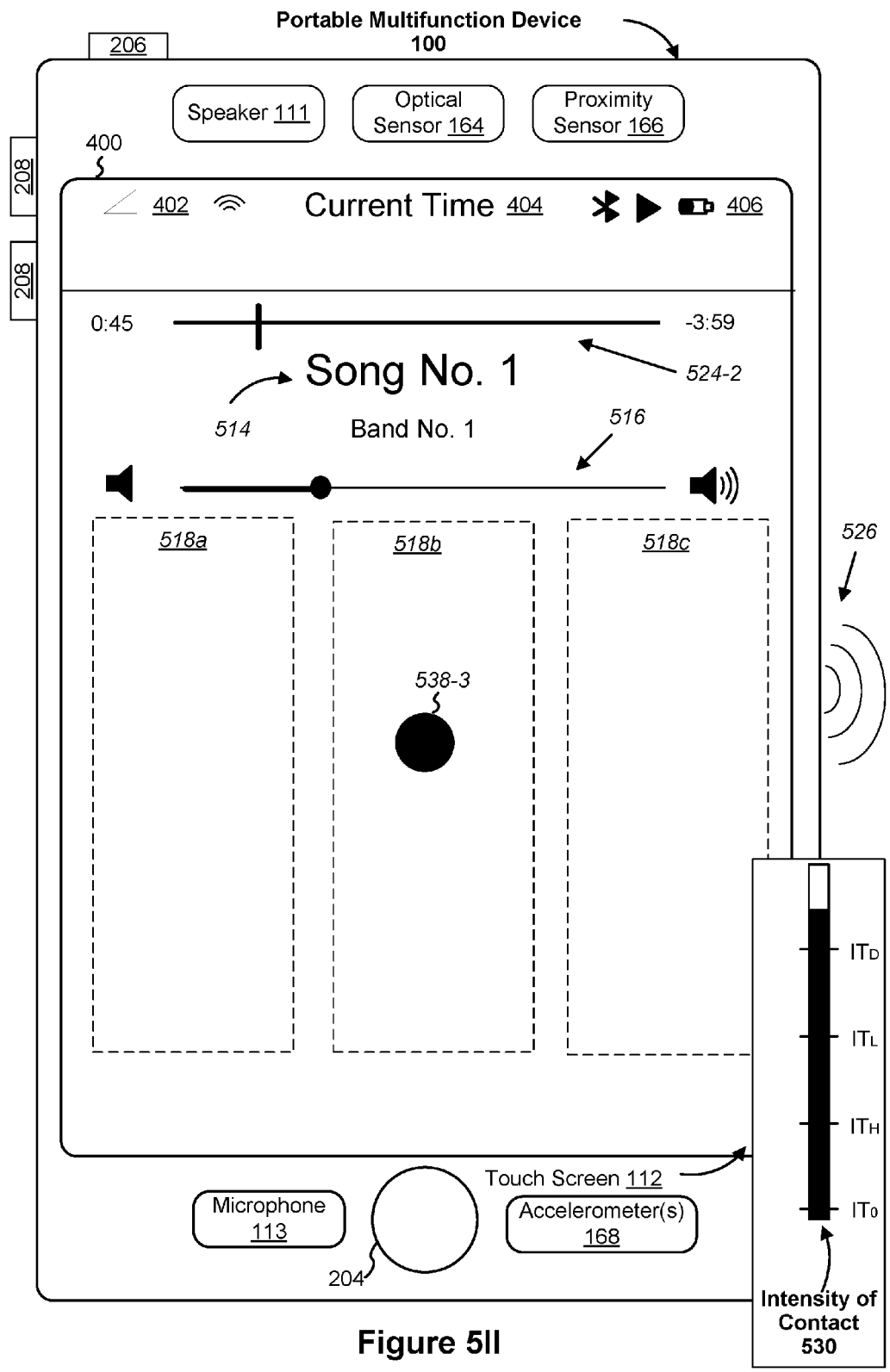
Figure 5J:
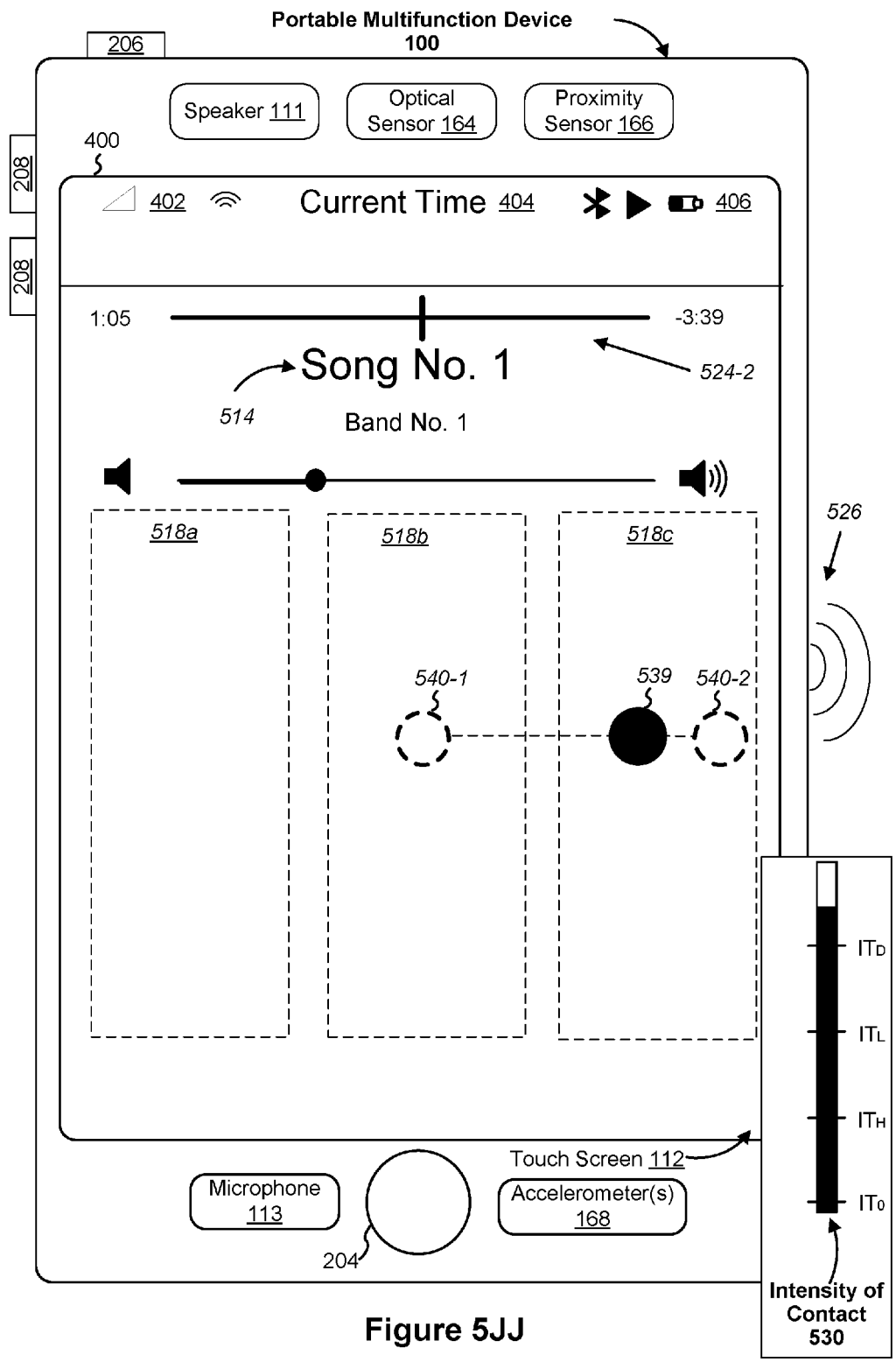
Figure 5K:
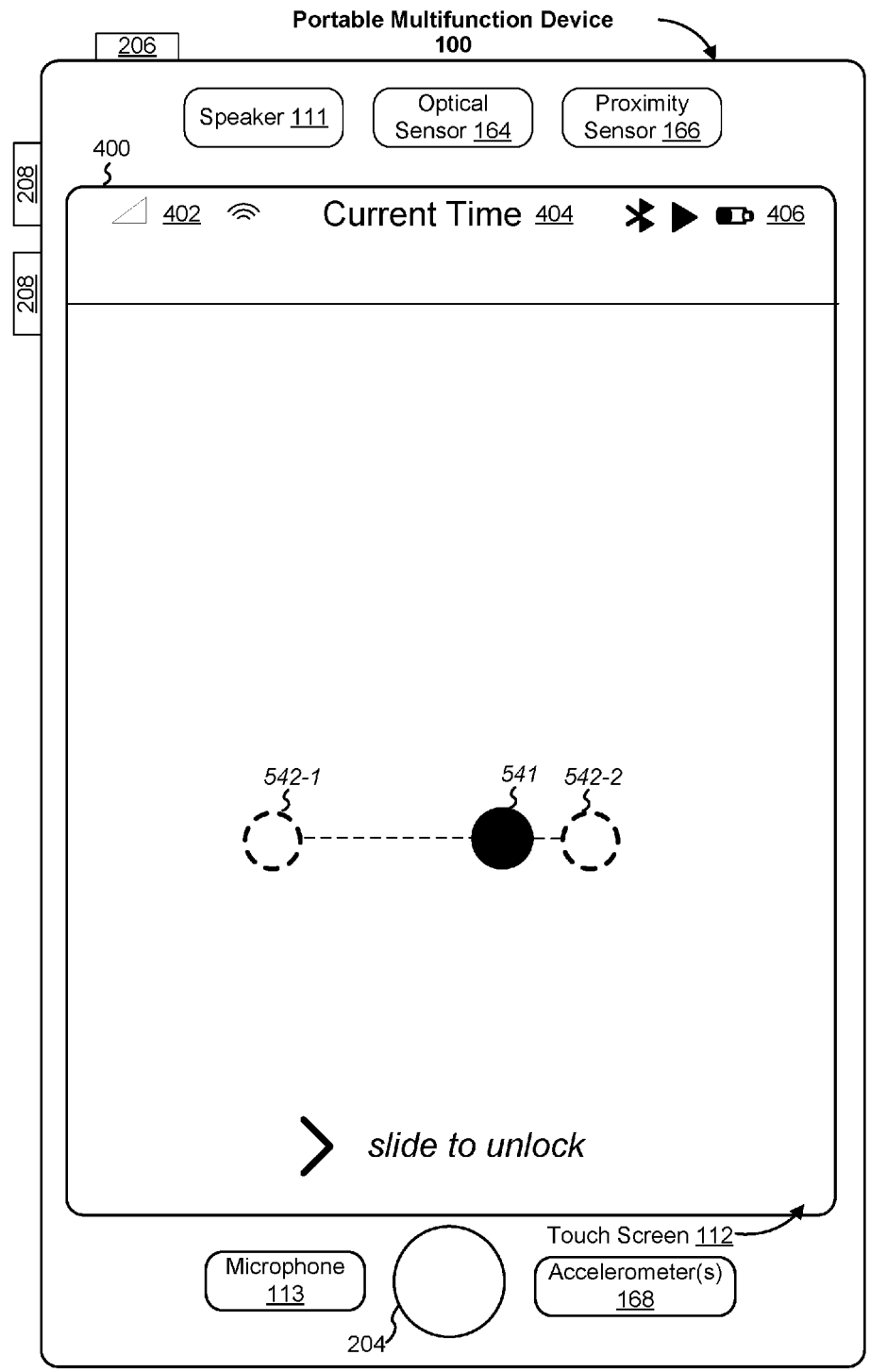
Figure 5L:
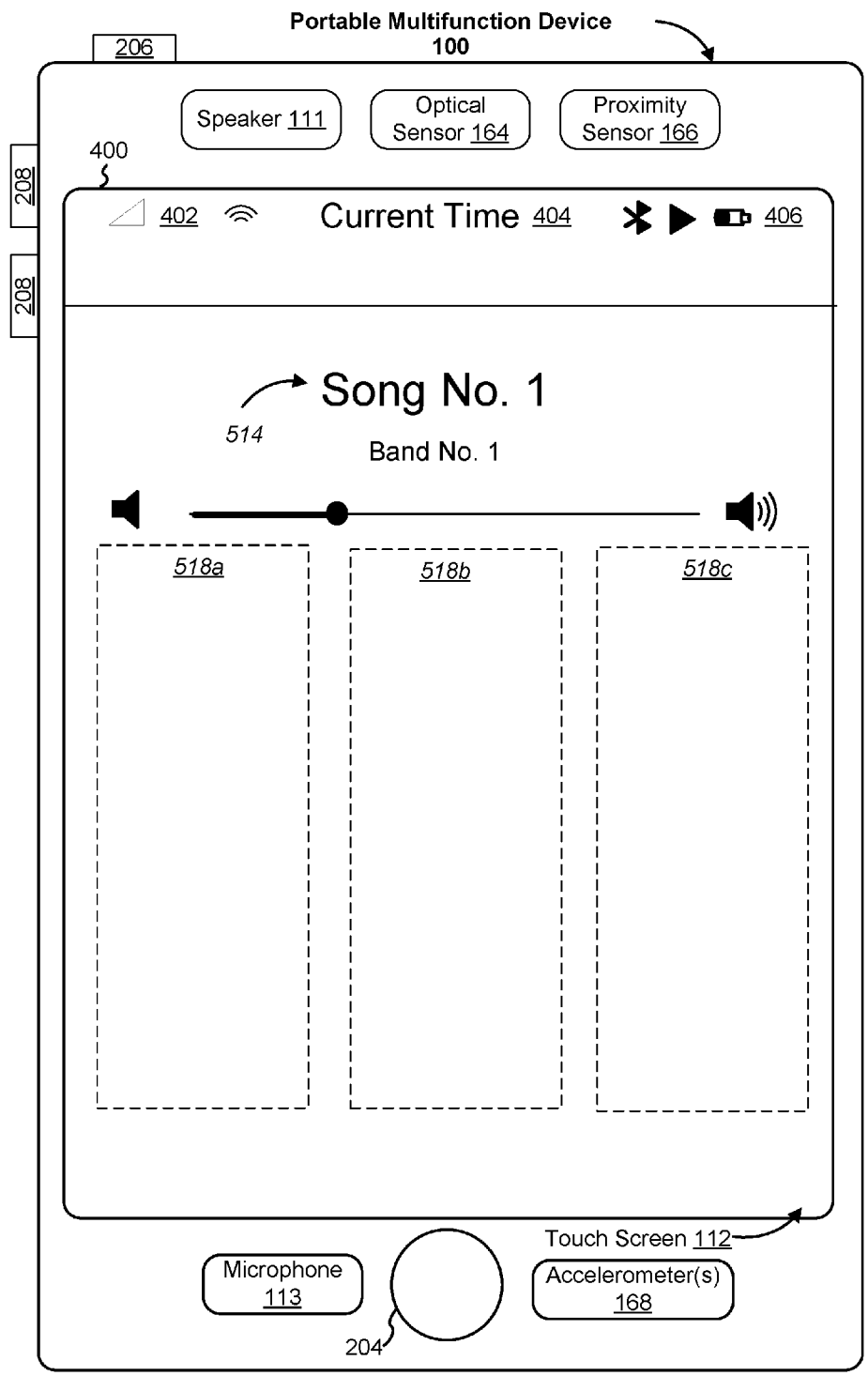
Figure 5M:
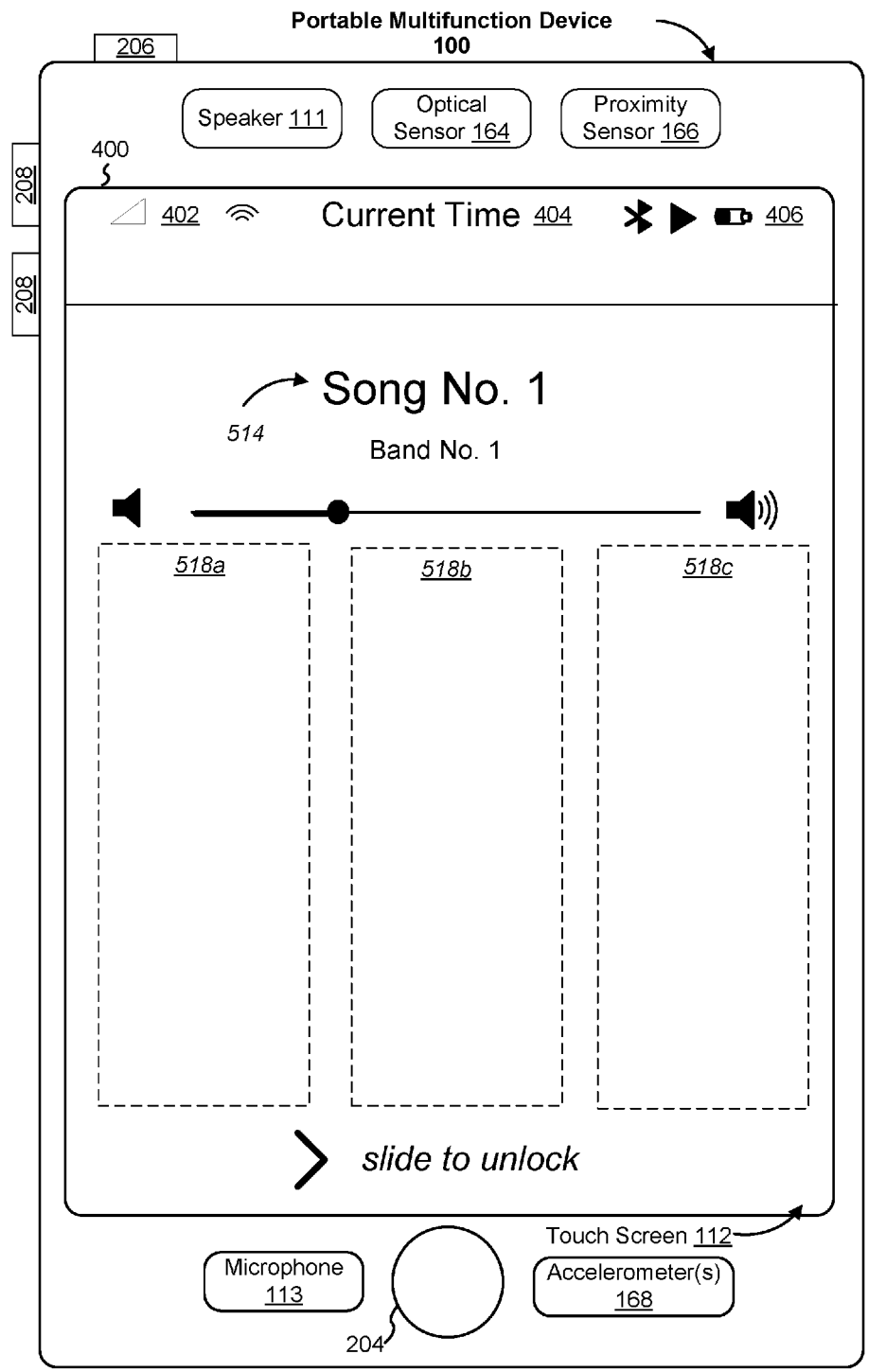
Figure 5N:
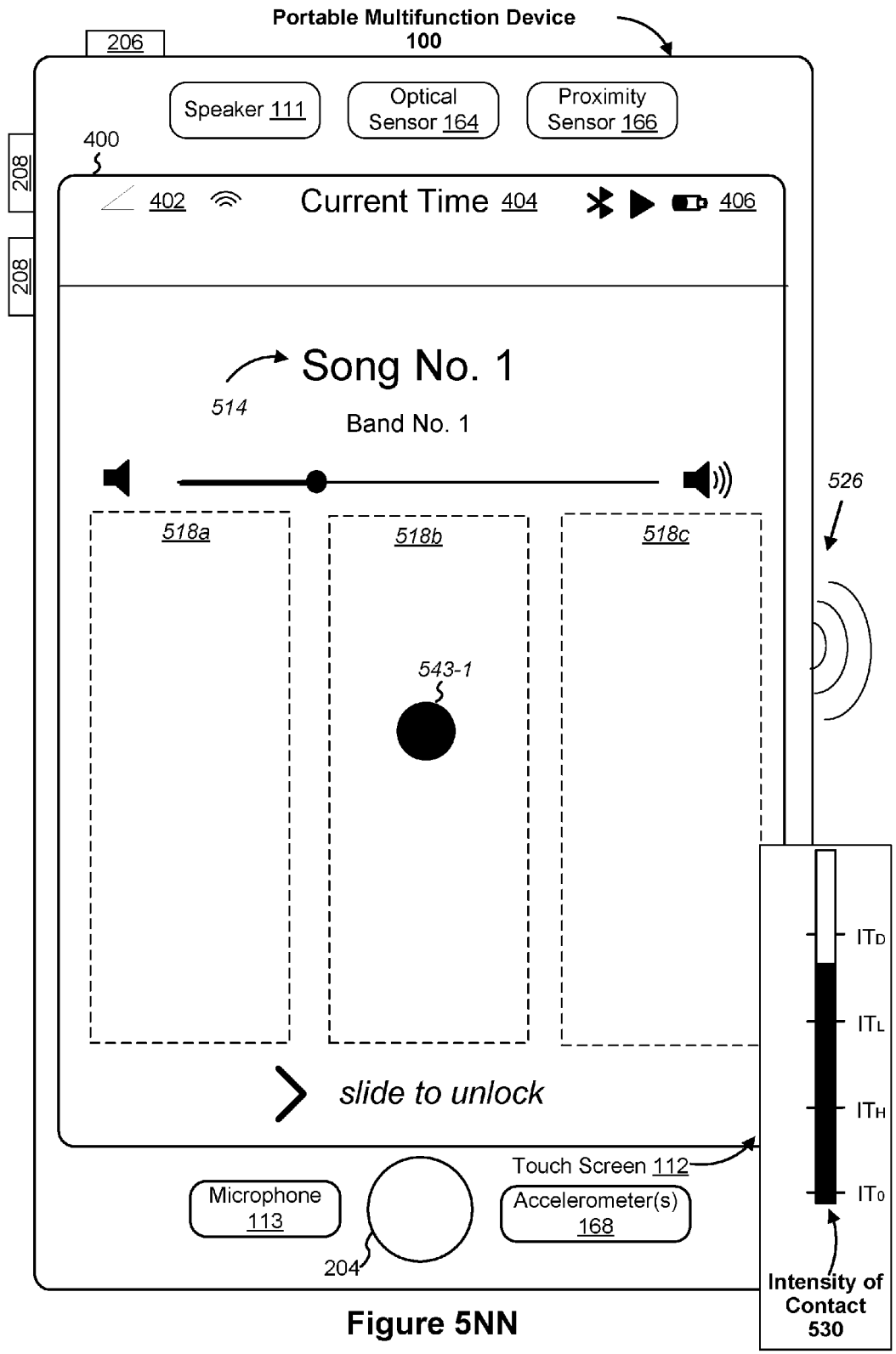
Figure 5O:
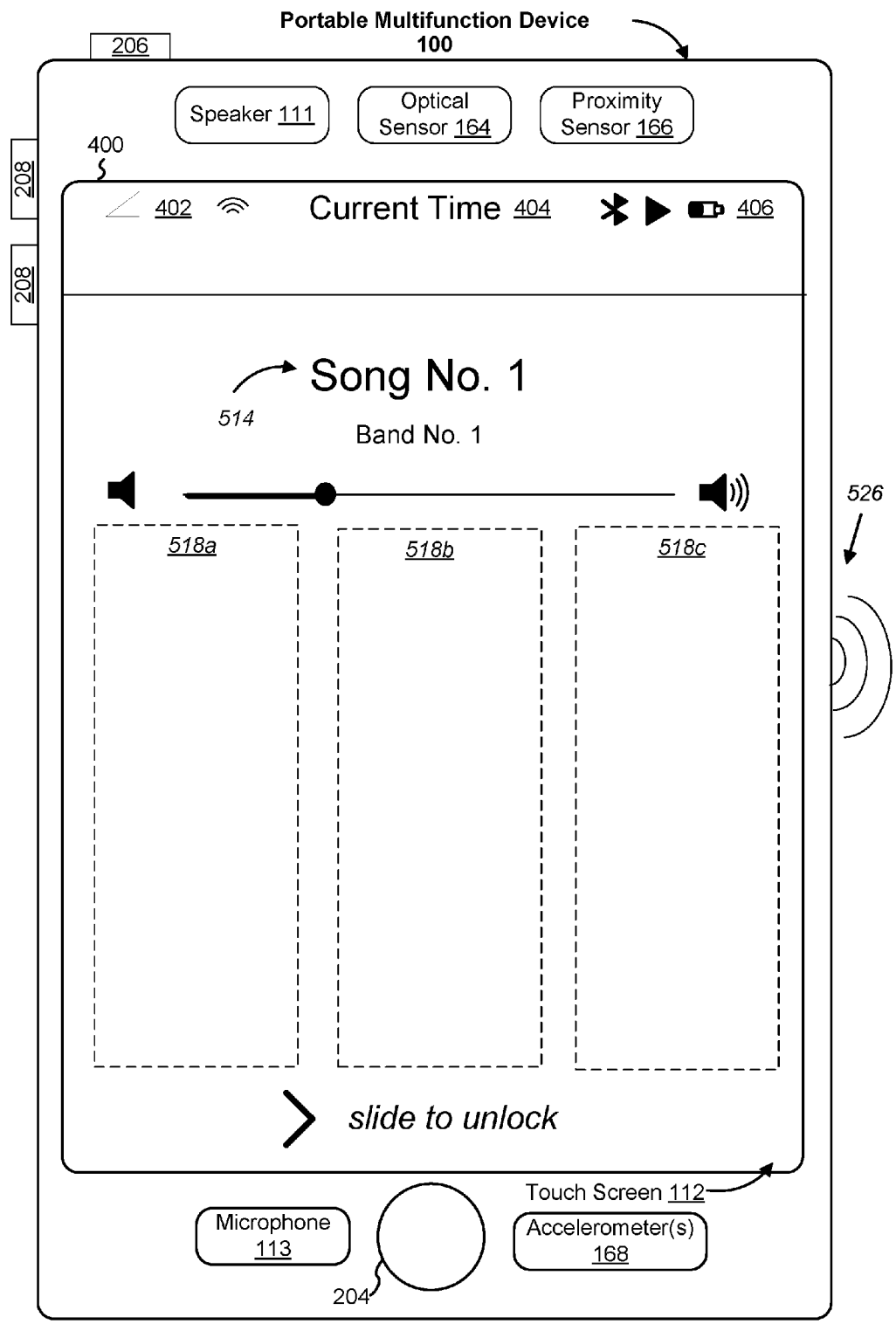

FIGS. 5X-5CC illustrate example user interfaces showing selective forward scrubbing or skip to a next music track functionality by the device 100 while displaying the second media player user interface. In FIG. 5X, the device 100 displays the second media player user interface including a music track label 514 corresponding to music track Song No. 1 by Band No. 1. In this example, the device 100 detects a gesture 536-1 at the fast-forward zone 518c (e.g., a tap or press gesture). If the gesture 536-1 exceeds a light press intensity threshold $IT_L$ and remains below a deep press intensity threshold $IT_D$, the device 100, as shown in FIG. 5Y, skips to the next music track Song No. 2 by Band No. 2 and the second media player user interface displays music track label 515. However, if the device 100 detects a gesture 536-2 that exceeds the deep press intensity threshold $IT_D$, as shown in FIG. 5Z, the device 100 scrubs the music track Song No. 1 by Band No. 1. The scrubbing functionality is illustrated by scrubber bar graphic 524-1 shown in FIGS. 5AA-5CC. Initially, as shown in FIG. 5AA, the scrubber bar graphic 524-1 illustrates that the initial presentation position of 0:35 of the music track. As the gesture 536-2 continues to exceed the deep press intensity threshold $IT_D$, the device 100 continues to scrub the music track, as shown sequentially in FIG. 5BB, where the subsequent presentation position of the music track is 0:45, rather than 0:36. In some embodiments, the scrubbing speed increases as the contact in gesture 536-3 moves laterally across the screen (e.g., in a rightward swipe), as shown in FIG. 5CC, where the contact in rightward swipe gesture 536-3 moves from initial position 537-1 to position 537-2. In FIG. 5CC, the subsequent presentation position of the music track is 1:05, rather than 0:55 (e.g., the presentation position of the music track as a result of continuation of tap gesture 536-2 rather than rightward swipe gesture 536-3).

FIGS. 5DD-5GG illustrate example user interfaces showing toggling between playing or pausing a music track while displaying the second media player user interface. In FIG. 5DD, the device 100 displays the second media player user interface including a music track label 514 corresponding to music track Song No. 1 by Band No. 1. In this example, the device 100 is presenting the music track to the user via speaker 111 and illustrated by sound waves 526 emanating from the device 100. The device 100 detects a tap gesture 538-1 at player zone 518b. If the tap gesture 538-1 exceeds a light press threshold $IT_L$ and remains below a deep press intensity threshold $IT_D$, the device 100 toggles to pausing presentation of the music track, as shown in FIG. 5EE. Subsequently, if the device 100 detects a tap gesture 538-2 that exceeds a light press threshold $IT_L$ and remains below a deep press intensity threshold $IT_D$, as shown in FIG. 5FF the device 100 toggles to playing the music track Song No. 1 by Band No. 1, as shown in FIG. 5GG.

Additional scrubbing functionality is illustrated by scrubber bar graphic 524-2 in FIGS. 5HH-5JJ. In FIG. 5HH, the device 100 is presenting the music track to the user via speaker 111 and illustrated by sound waves 526 emanating from the device 100. In response to a tap gesture 538-3 that exceeds a deep press intensity threshold $IT_D$, the device 100 scrubs the music track as illustrated by the scrubber bar graphic 524-2. As the tap gesture 538-3 continues to exceed the deep press intensity threshold $IT_D$, the device 100 continues to scrub the music track, as shown sequentially in FIG. 5II, where the subsequent presentation position of the music track is 0:45, rather than 0:36. In response to detecting a rightward swipe gesture 539 from initial position 540-1 to position 540-2, the device 100 increases the scrubbing speed of the music track, as shown sequentially in FIG. 5JJ, where the subsequent presentation position of the music track is 1:05, rather than 0:55 (e.g., the presentation position of the music track as a result of tap gesture 538-2 rather than rightward swipe gesture 539).

FIGS. 5KK-5LL illustrate example user interfaces for transitioning from a lock screen of the device 100 to the second media player user interface. In FIG. 5KK, the device 100 displays a lock screen user interface. The device 100 detects a rightward swipe gesture 541 from initial position 542-1 to position 542-2. In some embodiments, in response, the device 100 displays the second media player user interface, as shown in FIG. 5LL.

FIGS. 5MM-5OO illustrate example user interfaces for using a second media player user interface on a lock screen. In FIG. 5MM, the device 100 displays the second media player user interface on a lock screen of the device 100. Subsequently, the device 100 detects a tap gesture 543-1 that exceeds a light press threshold $IT_L$ and remains below a deep press intensity threshold ITS, as shown in FIG. 5NN. In response, the device 100 toggles to playing the music track Song No. 1 by Band No. 1, as shown in FIG. 5OO.

Figure 6A:
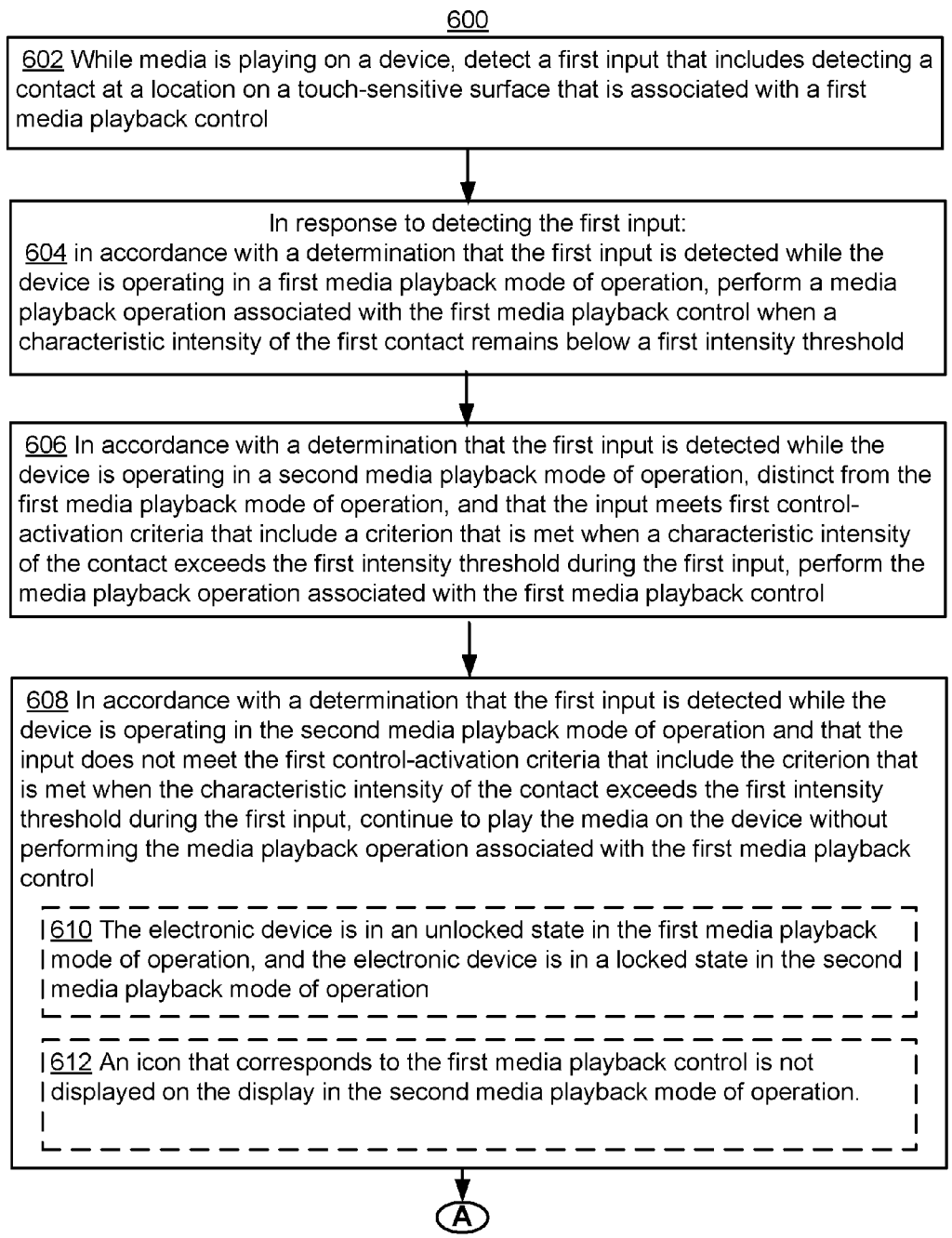

FIGS. 6A-6C are flow diagrams depicting a method 600 for media playback control using intensity-based input, in accordance with some embodiments. Although some of the examples which follow will be given with reference to inputs on a touch-sensitive display (in which a touch-sensitive surface and a display are combined), in some embodiments, the device detects inputs on a touch-sensitive surface 450 that is separate from the display 451, as shown in FIG. 4B. Some operations in method 600 are, optionally, combined and/or the order of some operations is, optionally, changed.

As described below, the method 600 reduces the number, extent, and/or nature of the inputs from a user and produce and more efficient human-machine interface, thereby providing users with easy-to-use and intuitive ways to control media playback. For battery-operated electronic devices, allowing for efficient, seamless control of media playback conserves power and increases the time between battery charges (e.g., by reducing the requirement for extensive and inefficient user interactions that drain battery power).

At an electronic device with a touch-sensitive surface, a display, and one or more sensors to detect intensities of contacts on the touch-sensitive surface, while media (e.g., audio, video, and/or images) is playing on the device, the device detects (602) a first input (e.g., a tap gesture 510-1 as shown in FIG. 5C) that includes detecting a contact at a location on the touch-sensitive surface that is associated with a first media playback control (e.g., player icon 512*b* as shown in FIG. 5C) (e.g., detect an input by a contact on a touch-sensitive display while the contact is at an icon or at an area that corresponds to the first media playback control, or detect an input by a contact on a touch-sensitive surface while a cursor or other location marker is at the icon or at the area that corresponds to the first media playback control on the display).

In response to detecting the first input, in accordance with a determination that the first input is detected while the device is operating in a first media playback mode of operation, the device performs (604) a media playback operation (e.g., play a music track) associated with the first media playback control (e.g., play icon 512*b*, as shown in FIG. 5D) when a characteristic intensity of the first contact remains below a first intensity threshold (e.g., a hint threshold, a light press threshold or a deep press threshold).

In response to detecting the first input, in accordance with a determination that the first input (e.g., tap gesture 510-2 as shown in FIG. 5G) is detected while the device is operating in a second media playback mode of operation, distinct from the first media playback mode of operation, and that the input meets first control-activation criteria that include a criterion that is met when a characteristic intensity of the contact exceeds the first intensity threshold during the first input, the device performs (606) the media playback operation (e.g., video presented via the display, music presented with speakers built into the electronic device, as shown in 5H, or music presented with remote (e.g., wireless) speakers that communicate with the electronic device) associated with the first media playback control.

In response to detecting the first input, in accordance with a determination that the first input (e.g., tap gesture 510-3 as shown in FIG. 5I) is detected while the device is operating in the second media playback mode of operation and that the input does not meet the first control-activation criteria that include the criterion that is met when the characteristic intensity of the contact exceeds the first intensity threshold during the first input, the device continues (608) to play the media on the device without performing the media playback operation associated with the first media playback control (e.g., as shown in FIGS. 5I-5J).

Providing two different media playback mode enhances the operability of the device. Having one mode with easier-to-select playback controls based on input intensity enhances the operability of the device and makes the user-device interface more efficient by helping the user to provide proper inputs and reducing user mistakes when operating/interacting with the device, even without the user having to view the display.

In some embodiments, the electronic device is (610) in an unlocked state in the first media playback mode of operation (e.g., as shown in FIG. 5C), and the electronic device is in a locked state in the second media playback mode of operation (e.g., as shown in FIG. 5OO). In some embodiments, the locked state prevents access to most, if not all, of the applications on the electronic device, except a media player application. In some embodiments, the unlocked state permits access to most, if not all, of the applications on the electronic device, including the media player application.

Including a second media playback mode of operation that operates in a locked state provides the user with improved media playback functionality that enhances the operability of the device. For example, accessing playback functionality from a locked state makes the user-device interface more efficient by helping the user to consume and navigate media content without having to unlock the device.

In some embodiments, an icon that corresponds to the first media playback control is not displayed (612) on the display in the second media playback mode of operation (e.g., as represented by zones 518*a*-518*c* shown in FIG. 5F, which do not display playback controls).

In some embodiments, the device detects (614) a second input that includes detecting a second contact at a second location on the touch-sensitive surface. In some embodiments, the second contact makes a tap gesture (e.g., tap gesture 509-1 as shown in FIG. 5B). In some embodiments, the second contact makes a swipe gesture from a predefined edge of the touch-sensitive surface (e.g., rightward swipe gesture 511-2 as shown in FIG. 5K). In response to detecting the second input, in accordance with a determination that the second input meets first media playback mode selection criteria that include a criterion that is met when a characteristic intensity of the second contact remains below a second intensity threshold (e.g., a light press or deep press threshold) during the second input, the device operates in the first media playback mode of operation (e.g., as shown in FIGS. 5B-5C). In response to detecting the second input, in accordance with a determination that the second input meets second media playback mode selection criteria that include a criterion that is met when the characteristic intensity of the second contact exceeds the second intensity threshold during the second input, the device operates in the second media playback mode of operation (e.g., as shown in FIGS. 5E-5F). In some embodiments, the first input and the second input are the same input. In some embodiments, the second input occurs prior to the first input.

Providing a user with the capability to selectively transition to a first media playback mode or a second media playback mode of operation using a single user input enhances the operability of the device. For example, allowing a user to transition to a media playback mode using a single user input makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the device displays (616) icons that correspond to media playback controls (e.g., icons 512a-512c as shown in FIG. 5D) on the display when the electronic device is operating in the first media playback mode of operation and foregoes display of icons that correspond to media playback controls on the display when the electronic device is operating in the second media playback mode of operation (e.g., as shown in FIG. 5F).

In some embodiments, in response to detecting the first input, in accordance with a determination that the first input is detected while the device is operating in the first media playback mode of operation, the device visually distinguishes (620) an icon that corresponds to the first media playback control (e.g. by highlighting and/or enlarging the icon, as shown in FIG. 5S-5T) to indicate that the first media playback control has been activated. In response to detecting the first input, in accordance with a determination that the first input is detected while the device is operating in the second media playback mode of operation, the device visually distinguishes an area of the display that is proximate to a location on the display that corresponds to the location of the contact on touch-sensitive surface (e.g. by highlighting the area on the display, independent of whether an icon that corresponds to the first media playback control is displayed in the area, as shown in FIGS. 5U and 5W, or by providing haptic feedback, as shown in FIGS. 5U-5V) to indicate that the first media playback control has been activated.

Providing visual feedback in response to a user activation of an icon or an area of a display provides the user with feedback about an activation detected by the device and provides visual feedback to the user indicating that pressing at an icon or an area of a display will cause the device to perform an operation associated with the user interface element. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the first input, in accordance with a determination that the first input is detected while the device is operating in the second media playback mode of operation and that the first input meets the first control-activation criteria that include a criterion that is met when the characteristic intensity of the contact does not exceed a second intensity threshold, greater than the first intensity threshold (e.g., light press threshold or a deep press threshold), during the first input, the device performs (622) a discrete media playback operation (e.g., a discrete operation such as play, pause, skip to next media in an ordered list of a plurality of media, or skip to previous media in an ordered list of the plurality of media) associated with the first media playback control (e.g., as shown in FIGS. 5X-5Y). In response to detecting the first input, in accordance with a determination that the first input is detected while the device is operating in the second media playback mode of operation and that the first input meets second control-activation criteria that include a criterion that is met when the characteristic intensity of the contact exceeds the second intensity threshold during at least part of the first input, the device performs a continuous media playback operation (e.g., a continuous operation such as fast forward or rewind through the current media, based on the intensity of the contact or lateral movement of the contact) associated with the first media playback control (instead of performing a discrete media playback operation) (e.g., as shown in FIGS. 5Z-5BB).

Performing a discrete or continuous operation based on a single user input provides the user with more efficient user-device interface and thereby enhances operability.

In some embodiments, the device displays (624) a scrubber bar (e.g., 524-1 shown in FIG. 5AA) when the characteristic intensity of the contact exceeds the second intensity threshold. For example, when the characteristic intensity initially meets or exceeds the second intensity threshold during the first input, the electronic device performs a fast forward or rewind operation on the currently playing media and also displays a scrubber bar until the first input ends (e.g., as shown in FIGS. 5Z-5BB).

Displaying a scrubber bar in response to a user input with certain characteristics provides the user with visual feedback about how the device is navigating the content media and thereby provides more efficient use of the device and enhances operability. Displaying the scrubber bar enhances the operability of the device and makes the user-device interface more efficient (e.g., by avoiding display during inadvertent user inputs and by being displayed during intentional user inputs that meet certain intensity criteria) which, additionally, reduces power usage and improves battery life of the device by enabling the user to use the device more quickly and efficiently.

In some embodiments, while the electronic device is operating in the first media playback mode of operation, the device displays (626) a first media player user interface on the display, wherein: the first media player user interface includes a first media player transport control icon (e.g., rewind icon 512a, player icon 512b, fast-forward icon 512c as shown in FIG. 5C) that corresponds to the first media playback control. The first media player transport control icon corresponds to a first area of the touch-sensitive surface that, when activated, causes the electronics device to perform the media playback operation associated with the first media playback control (e.g., rewind, play, fast-forward). While the electronic device is operating in the second media playback mode of operation, the device displays a second media player user interface on the display, distinct from the first media player user interface. The second media player user interface includes a media player transport control zone (e.g., rewind zone 518a, player zone 518b, fast-forward zone 518c as shown in FIG. 5F) associated with the first media playback control. The media player transport control zone corresponds to a second area of the touch-sensitive surface, larger than the first area of the touch-sensitive surface, that, when activated, causes the electronic device to perform the media playback operation (e.g., rewind, play, fast-forward) associated with the first media playback control. In some embodiments, the first area and the second area are hit regions for the first media playback control in the first media playback mode of operation and the second media playback mode of operation, respectively, and the hit region is larger in the second media playback mode of operation. In some embodiments, a plurality of media player zones in the second media playback mode of operation cover substantially the entire display, with each zone corresponding to a separate portion of the display (e.g., a top third, middle third, and bottom third; or a left third, center third, and right third). In some embodiments, the media player transport control zones in the second media playback mode of operation comprise three zones, such as a first zone for transitioning backwards through a media content item (e.g., a song) at an accelerated rate or switching to a previous media content item in a list of media content items; a second zone for moving forwards through the media content item at a normal rate or pausing the media content item; and a third zone for transitioning forwards through the media content item at an accelerated rate or switching to a next media content item in the list of media content items.

By associating a media playback control with a zone that is larger than a region of an icon, the user can more easily select a media playback control. Easier media playback control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be understood that the particular order in which the operations in FIG. 6A-6C have been described is merely one example and is not intended to indicate that the described order is the only order in which the operations could be performed. One of ordinary skill in the art would recognize various ways to reorder the operations described herein. In some embodiments, one or more operations of method 600 are combined, supplemented, or replaced with one or more operations of other methods described herein.

Figure 7:
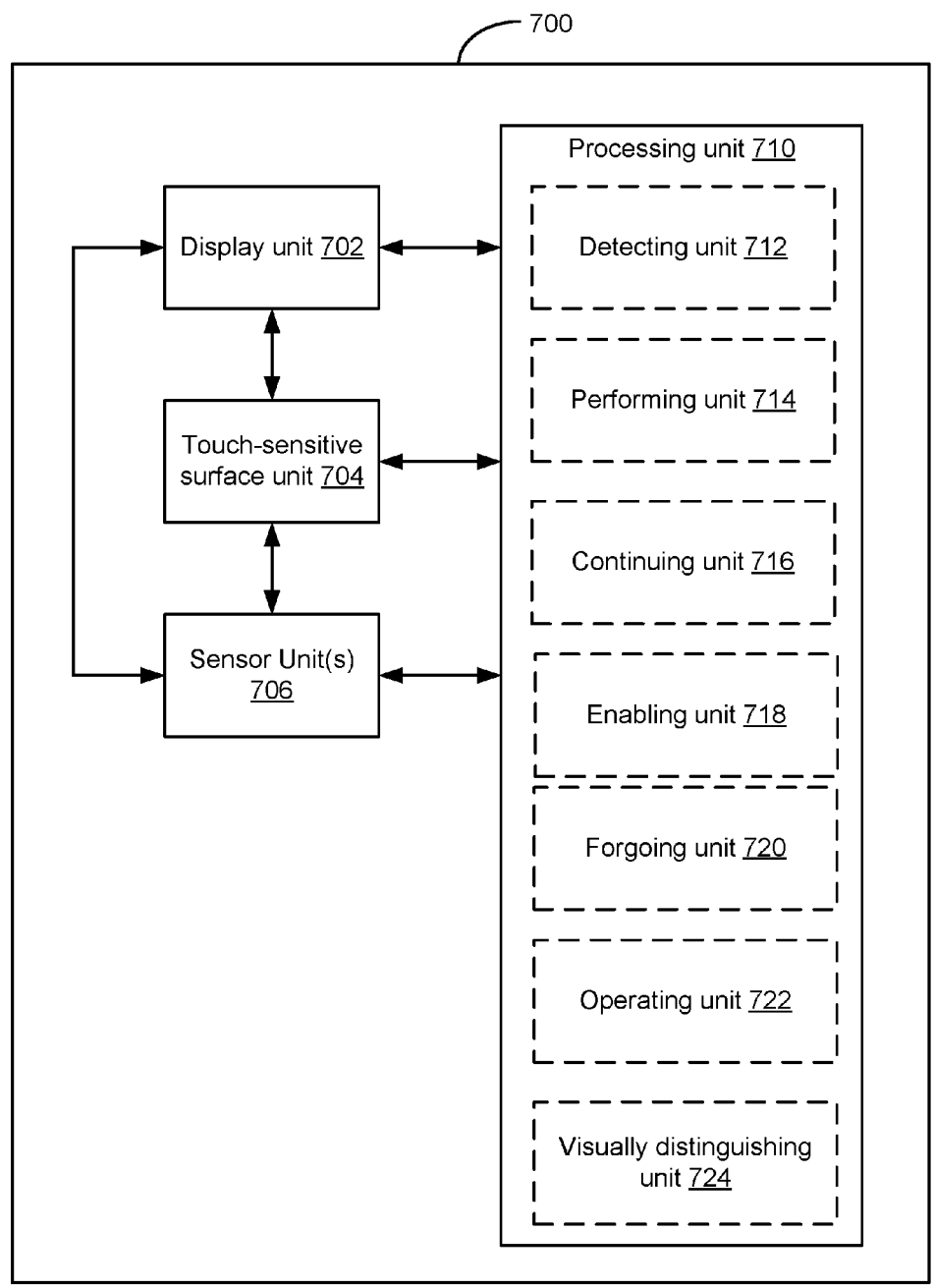
FIG. 7 is a functional block diagram of an electronic device, in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display one or more media playback user interfaces including one or more media playback controls; a touch-sensitive surface unit 704 configured to receive user inputs; one or more sensor units 706 configured to detect intensity of contacts with the touch-sensitive surface unit 704; and a processing unit 710 coupled to the display unit 702, the touch-sensitive surface unit 704 and the one or more sensor units 706. The processing unit 710 includes a detecting unit 712, performing unit 714, continuing unit 716, enabling unit 718, forgoing unit 720, operating unit 722 and visually distinguishing unit 724.

The processing unit 710 is configured to while media is playing on the device, detect (e.g., via detecting unit 712) a first input that includes detecting a contact at a location on the touch-sensitive surface unit 704 that is associated with a first media playback control. In response to detecting the first input, in accordance with a determination that the first input is detected while the device is operating in a first media playback mode of operation, the processing unit 710 is configured to perform (e.g., via performing unit 714) a media playback operation associated with the first media playback control when a characteristic intensity of the first contact remains below a first intensity threshold. In accordance with a determination that the first input is detected while the device is operating in a second media playback mode of operation, distinct from the first media playback mode of operation, and that the input meets first control-activation criteria that include a criterion that is met when a characteristic intensity of the contact exceeds the first intensity threshold during the first input, the processing unit 710 is configured to perform (e.g., via performing unit 714) the media playback operation associated with the first media playback control. In accordance with a determination that the first input is detected while the device is operating in the second media playback mode of operation and that the input does not meet the first control-activation criteria that include the criterion that is met when the characteristic intensity of the contact exceeds the first intensity threshold during the first input, the processing unit 710 is configured to continue (e.g., via continuing unit 716) to play the media on the device without performing the media playback operation associated with the first media playback control.

In some embodiments, an icon that corresponds to the first media playback control is not displayed on the display unit 702 in the second media playback mode of operation.

In some embodiments, the electronic device is in an unlocked state in the first media playback mode of operation, and the electronic device is in a locked state in the second media playback mode of operation.

In some embodiments, the processing unit 710 is configured to enable display (e.g., via enabling unit 718) of icons that correspond to media playback controls on the display unit 702 when the electronic device is operating in the first media playback mode of operation and forego display (e.g., via forgoing unit 720) of icons that correspond to media playback controls on the display unit 702 when the electronic device is operating in the second media playback mode of operation.

In some embodiments, the processing unit 710 is configured to detect (e.g., via detecting unit 712) a second input that includes detecting a second contact at a second location on the touch-sensitive surface unit 704. In response to detecting the second input, in accordance with a determination that the second input meets first media playback mode selection criteria that include a criterion that is met when a characteristic intensity of the second contact remains below a second intensity threshold during the second input, the processing unit 710 is configured to operate (e.g., via operating unit 722) in the first media playback mode of operation; and, in accordance with a determination that the second input meets second media playback mode selection criteria that include a criterion that is met when the characteristic intensity of the second contact exceeds the second intensity threshold during the second input, the processing unit 710 is configured to operate (e.g., via operating unit 722) in the second media playback mode of operation.

In some embodiments, in response to detecting the first input, in accordance with a determination that the first input is detected while the device is operating in the first media playback mode of operation, the processing unit 710 is configured to visually distinguish (e.g., via visually distinguishing unit 724) an icon that corresponds to the first media playback control to indicate that the first media playback control has been activated. In accordance with a determination that the first input is detected while the device is operating in the second media playback mode of operation, the processing unit 710 is configured to visually distinguish (e.g., via visually distinguishing unit 724) an area of the display unit 702 that is proximate to a location on the display unit 702 that corresponds to the location of the contact on touch-sensitive surface to indicate that the first media playback control has been activated.

In some embodiments, in response to detecting the first input, in accordance with a determination that the first input is detected while the device is operating in the second media playback mode of operation and that the first input meets the first control-activation criteria that include a criterion that is met when the characteristic intensity of the contact does not exceed a second intensity threshold, greater than the first intensity threshold, during the first input, the processing unit 710 is configured to perform (e.g., via performing unit 714) a discrete media playback operation associated with the first media playback control. In accordance with a determination that the first input is detected while the device is operating in the second media playback mode of operation and that the first input meets second control-activation criteria that include a criterion that is met when the characteristic intensity of the contact exceeds the second intensity threshold during at least part of the first input, the processing unit 710 is configured to perform (e.g., via performing unit 714) a continuous media playback operation associated with the first media playback control.

In some embodiments, the processing unit 710 is configured to enable display (e.g., via enabling unit 718) of a scrubber bar when the characteristic intensity of the contact exceeds the second intensity threshold.

In some embodiments, while the electronic device is operating in the first media playback mode of operation, the processing unit 710 is configured to enable display (e.g., via enabling unit 718) of a first media player user interface on the display unit 702. In some embodiments, the first media player user interface includes a first media player transport control icon that corresponds to the first media playback control. In some embodiments, the first media player transport control icon corresponds to a first area of the touch-sensitive surface unit 704 that, when activated, causes the electronics device to perform the media playback operation associated with the first media playback control. In some embodiments, while the electronic device is operating in the second media playback mode of operation, the processing unit 710 is configured to enable display (e.g., via enabling unit 718) of a second media player user interface on the display unit 702, distinct from the first media player user interface. In some embodiments, the second media player user interface includes a media player transport control zone associated with the first media playback control, and the media player transport control zone corresponds to a second area of the touch-sensitive surface unit 704, larger than the first area of the touch-sensitive surface unit 704, that, when activated, causes the electronics device to perform the media playback operation associated with the first media playback control.

Figure 8A:
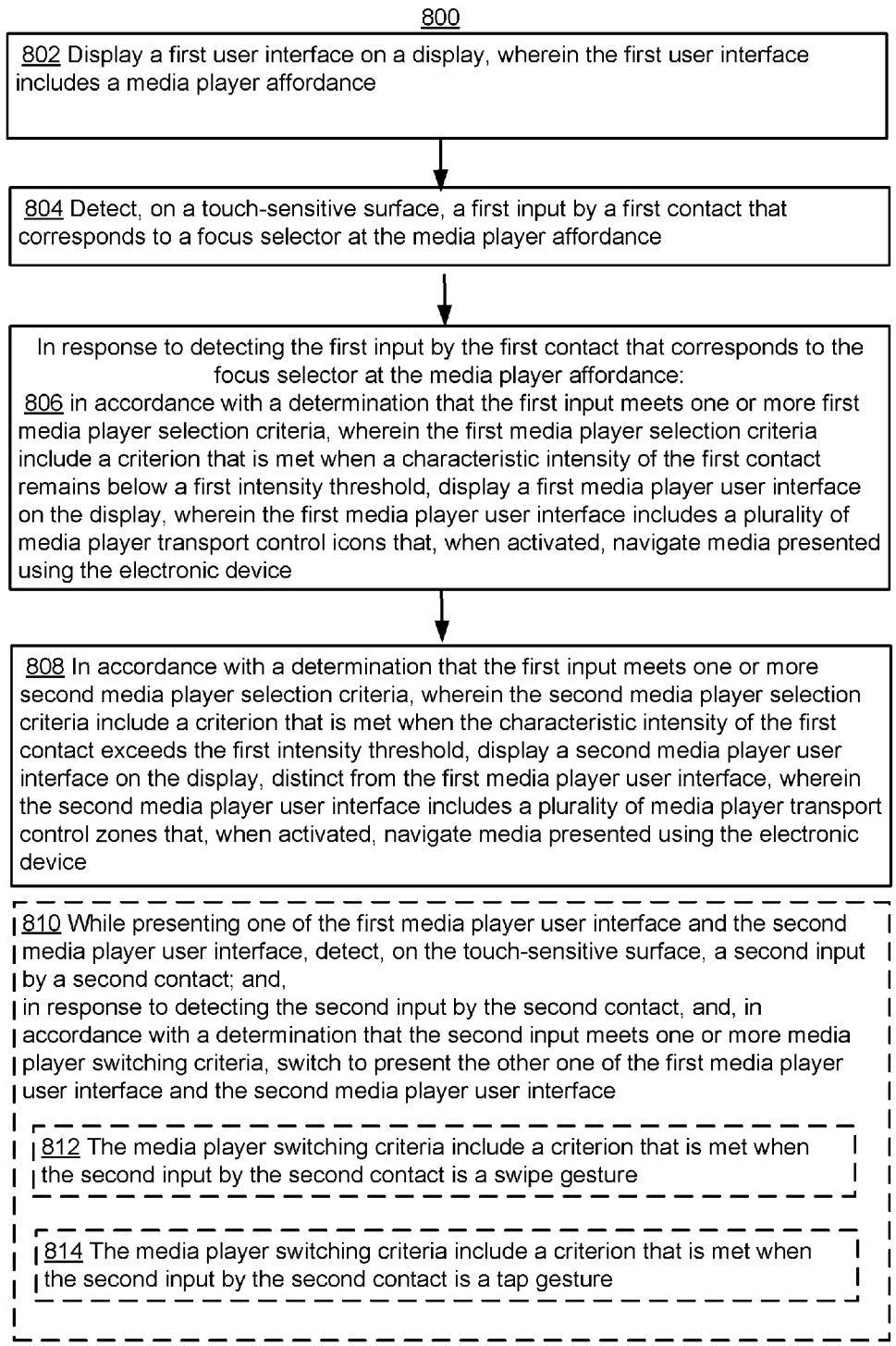

FIGS. 8A-8C are flow diagrams depicting a method 800 for media playback control using intensity-based input, in accordance with some embodiments. Although some of the examples which follow will be given with reference to inputs on a touch-sensitive display (in which a touch-sensitive surface and a display are combined), in some embodiments, the device detects inputs on a touch-sensitive surface 450 that is separate from the display 451, as shown in FIG. 4B. Some operations in method 800 are, optionally, combined and/or the order of some operations is, optionally, changed.

As described below, the method 800 reduces the number, extent, and/or nature of the inputs from a user and produce and more efficient human-machine interface, thereby providing users with easy-to-use and intuitive ways to control media playback. For battery-operated electronic devices, allowing for efficient, seamless control of media playback conserves power and increases the time between battery charges (e.g., by reducing the requirement for extensive and inefficient user interactions that drain battery power).

At an electronic device with a touch-sensitive surface, a display, and one or more sensors to detect intensities of contacts on the touch-sensitive surface, the device displays (802) a first user interface on the display, wherein the first user interface includes a media player affordance (e.g., play icon 502a in FIG. 5A). In some embodiments, the first user interface also displays a list of media content items (e.g., music tracks as shown in FIG. 5A) available for playback using the electronic device.

The device detects (804), on the touch-sensitive surface, a first input by a first contact that corresponds to a focus selector at the media player affordance (e.g., detect an input by a contact on a touch-sensitive display while the contact is at the media player affordance (such as tap gesture 509-1 or 509-2 in FIGS. 5B and 5E, respectively), or detect an input by a contact on a touch-sensitive surface while a cursor or other location marker is at the media player affordance on the display).

In response to detecting the first input by the first contact that corresponds to the focus selector at the media player affordance, in accordance with a determination that the first input meets one or more first media player selection criteria, wherein the first media player selection criteria include a criterion that is met when a characteristic intensity of the first contact remains below a first intensity threshold (e.g., below a "light press" or "deep press" intensity threshold), the device displays (806) a first media player user interface on the display (e.g., as shown in FIG. 5C), wherein the first media player user interface includes a plurality of media player transport control icons (e.g., icons to play, pause, skip to next media content item, skip to previous media content item, and/or scrub a media content item) that, when activated, control playback of media (e.g., audio, video, and/or images) presented using the electronic device (e.g., music presented with speakers built into the electronic device or music presented with remote (e.g., wireless) speakers that communicate with the electronic device).

In response to detecting the first input by the first contact that corresponds to the focus selector at the media player affordance, in accordance with a determination that the first input meets one or more second media player selection criteria, wherein the second media player selection criteria include a criterion that is met when the characteristic intensity of the first contact exceeds the first intensity threshold (e.g., the contact intensity goes above a "light press" or "deep press" intensity threshold, at least momentarily), the device displays (808) a second media player user interface on the display (e.g., as shown in FIG. 5F), distinct from the first media player user interface, wherein the second media player user interface includes a plurality of media player transport control zones (e.g., predefined areas on the touch-sensitive surface associated with play, pause, skip to next media content item, skip to previous media content item, and/or scrub media content item functions) that, when activated, control playback of media presented using the electronic device. In some embodiments, the plurality of media player zones cover substantially the entire display, with each zone corresponding to a separate portion of the display (e.g., a top third, middle third, and bottom third; or a left third, center third, and right third). In some embodiments, the media player transport control zones comprise three zones, such as a first zone for transitioning backwards through a media content item (e.g., a song) at an accelerated rate or switching to a previous media content item in a list of media content items; a second zone for moving forwards through the media content item at a normal rate or pausing the media content item; and a third zone for transitioning forwards through the media content item at an accelerated rate or switching to a next media content item in the list of media content items.

Providing a user with the capability to selectively transition to a first media playback mode or a second media playback mode of operation using a single user input enhances the operability of the device and makes the user-device interface more efficient (e.g., by helping the user to provide proper inputs and reducing user mistakes when operating/interacting with the device).

In some embodiments, while presenting one of the first media player user interface and the second media player user interface, the device detects (810), on the touch-sensitive surface, a second input by a second contact. In response to detecting the second input by the second contact, and, in accordance with a determination that the second input meets one or more media player switching criteria, the device switches to present the other one of the first media player user interface and the second media player user interface (e.g., as shown in FIGS. 5O-5P).

Toggling between media player user interfaces using a single input enhances the operability of the device and makes the user-device interface more efficient (e.g., by helping the user to provide proper inputs and reducing user mistakes when operating/interacting with the device).

In some embodiments, the media player switching criteria include (812) a criterion that is met when the second input by the second contact is a swipe gesture (e.g., a rightward swipe gesture 530-1 to 530-2, as shown in FIG. 5O).

In some embodiments, the media player switching criteria include (814) a criterion that is met when the second input by the second contact is a tap gesture.

In some embodiments, the device detects (816), on the touch-sensitive surface, a third input by a third contact that corresponds to the focus selector at a first media player transport control zone in the second media player user interface (e.g., detect an input by a contact on a touch-sensitive display while the contact is at the first media player transport control zone, or detect an input by a contact on a touch-sensitive surface while a cursor or other location marker is at the first media player transport control zone on the display). In response to detecting the third input by the third contact, and, in accordance with a determination that the third input meets one or more zone activation criteria, wherein the zone activation criteria include a criterion that is met when a characteristic intensity of the third contact exceeds an intensity threshold (e.g., above a "light press" or "deep press" intensity threshold), the device activates a media navigation function that corresponds to the first media player transport control zone; and the device provides haptic feedback to indicate that the first media player transport control zone has been activated (e.g., as shown in FIGS. 5U-5V).

Providing tactile feedback in response to a user selection of an icon or area of a display provides the user with feedback about a selection detected by the device and indicates that pressing at the icon or area of a display caused the device to perform an operation associated with the user interface element. Providing tactile feedback to the user enhances the operability of the device and makes the user-device interface more efficient (e.g., by helping the user to provide proper inputs and reducing user mistakes when operating/interacting with the device).

In some embodiments, the device detects (818), on the touch-sensitive surface, a fourth input by a fourth contact that corresponds to the focus selector at a first media player transport control zone in the second media player user interface (e.g., detect an input by a contact on a touch-sensitive display while the contact is at the first media player transport control zone, or detect an input by a contact on a touch-sensitive surface while a cursor or other location marker is at the first media player transport control zone on the display). In some embodiments, the fourth input and the third input are the same input by the same contact. In response to detecting the fourth input by the fourth contact, and, in accordance with a determination that the fourth input meets one or more zone activation criteria, wherein the zone activation criteria include a criterion that is met when a characteristic intensity of the fourth contact exceeds an intensity threshold (e.g., above a "light press" or "deep press" intensity threshold), the device activates a media navigation function that corresponds to the first media player transport control zone; and the device provides visual feedback to indicate that the first media player transport control zone has been activated (e.g., displaying a shape, such as a white, black, or colored circle within the first media player control zone, proximate to the focus selector in some embodiments) (e.g., as shown in FIGS. 5U and 5W).

Providing visual feedback in response to a user selection of an icon or area of a display provides the user with feedback about a selection detected by the device and indicates that pressing at the icon or area of a display caused the device to perform an operation associated with the user interface element. Providing visual feedback to the user enhances the operability of the device and makes the user-device interface more efficient (e.g., by helping the user to provide proper inputs and reducing user mistakes when operating/interacting with the device).

In some embodiments, while displaying the second media player user interface and presenting a first media content item, the device detects (820), on the touch-sensitive surface, a fifth input by a fifth contact that corresponds to the focus selector at a first media player transport control zone in the second media player user interface (e.g., detect an input by a contact on a touch-sensitive display while the contact is at the first media player transport control zone, or detect an input by a contact on a touch-sensitive surface while a cursor or other location marker is at the first media player transport control zone on the display). In response to detecting the fifth input by the fifth contact, in accordance with a determination that the fifth input meets one or more next-item criteria, wherein the next-item criteria include a criterion that is met when a characteristic intensity of the contact remains below a second intensity threshold (e.g., below a "deep press" intensity threshold), the device transitions from presenting the first media content item to presenting a second media content item (e.g., a next media content item associated with a media playlist) (e.g., as shown in FIGS. 5X-5Y). In response to detecting the fifth input by the fifth contact, in accordance with a determination that the fifth input meets one or more scrubbing criteria, wherein the scrubbing criteria include a criterion that is met when a characteristic intensity of the contact exceeds the second intensity threshold (e.g., above a "deep press" intensity threshold), the device scrubs through the first media content item (e.g., scrubbing at a rate that is greater than a normal playback speed) (e.g., as shown in FIGS. 5Z-5BB). In some embodiments, a scrubber bar (e.g., scrubber bar 524-1 in FIG. 5AA) is temporarily displayed during scrubbing in the second media player user interface. In some embodiments, the scrubbing rate increases as the intensity of the contact increases above the second intensity threshold. In some embodiments, after an initial deep press by a contact, if the contact moves towards an edge of the display, the scrubbing rate increases as the contact moves laterally across the touch sensitive surface, away from the location of the initial deep press by the contact. For example, as shown in FIG. 5CC, the scrubbing speed increases as a contact 536-3 moves laterally across the screen, from initial position 537-1 to position 537-2.

Performing conditional actions based on a single user input enhances the operability of the device and makes the user-device interface more efficient (e.g., by reducing the number of user inputs to perform different actions and thereby reduce user mistakes when operating/interacting with the device) which, additionally, reduces power usage and improves battery life of the device by enabling the user to use the device more quickly and efficiently.

In some embodiments, while displaying the second media player user interface and presenting a first media content item, the device detects (822), on the touch-sensitive surface, a sixth input by a sixth contact that corresponds to the focus selector at a second media player transport control zone in the second media player user interface (e.g., detect an input by a contact on a touch-sensitive display while the contact is at the second media player transport control zone, or detect an input by a contact on a touch-sensitive surface while a cursor or other location marker is at the second media player transport control zone on the display). In response to detecting the sixth input by the sixth contact, in accordance with a determination that the sixth input meets one or more play/pause criteria, wherein the play/pause criteria include a criterion that is met when a characteristic intensity of the contact remains below a second intensity threshold (e.g., below a "deep press" intensity threshold), the device toggles between playing and pausing the first media content item (e.g., as shown in FIGS. 5DD-5GG). In response to detecting the sixth input by the sixth contact, in accordance with a determination that the second input meets one or more scrubbing criteria, wherein the scrubbing criteria include a criterion that is met when a characteristic intensity of the contact exceeds the second intensity threshold (e.g., above a "deep press" intensity threshold), the device scrubs through the first media content item (e.g., scrubbing at a rate that is greater than a normal playback speed) (e.g., as shown in FIGS. 5HH-5II). In some embodiments, a scrubber bar (e.g., scrubber bar 524-2 in FIG. 5II) is temporarily displayed during scrubbing in the second media player user interface. In some embodiments, the scrubbing rate increases as the intensity of the contact increases above the second intensity threshold. In some embodiments, after an initial deep press by a contact, if the contact moves towards an edge of the display, the scrubbing rate increases as the contact moves laterally across the touch sensitive surface, away from the location of the initial deep press by the contact. For example, as shown in as shown in FIG. 5JJ, the scrubbing speed increases as a contact 539 moves laterally across the screen, from initial position 540-1 to position 540-2.

Performing conditional actions based on a single user input enhances the operability of the device and makes the user-device interface more efficient (e.g., by reducing the number of user inputs to perform different actions and thereby reduce user mistakes when operating/interacting with the device) which, additionally, reduces power usage and improves battery life of the device by enabling the user to use the device more quickly and efficiently.

In some embodiments, the device is (824) locked. While the electronic device is locked, the device displays a lock-screen user interface on the display and detects, on the touch-sensitive surface, a seventh input by a seventh contact while displaying the lock-screen user interface (e.g., detecting a rightward swipe gesture of contact 541 from initial position 542-1 to position 542-2, as shown in FIG. 5KK). In response to detecting the seventh input by the seventh contact, the device displays the second media player user interface (e.g., as shown in FIG. 5LL). While displaying the second media player user interface, the device detects an eighth input by an eighth contact that corresponds to the focus selector at a respective media player transport control zone in the second media player user interface (e.g., detect an input by a contact on a touch-sensitive display while the contact is at the respective media player transport control zone, or detect an input by a contact on a touch-sensitive surface while a cursor or other location marker is at the respective media player transport control zone on the display). In response to detecting the eighth input by the eighth contact, and, in accordance with a determination that the eighth input meets one or more zone activation criteria, wherein the zone activation criteria include a criterion that is met when a characteristic intensity of the contact exceeds an intensity threshold (e.g., above a "light press" or "deep press" intensity threshold), activating a media navigation function (e.g., play, pause, skip to next media content item, skip to previous media content item, or scrub media content item) that corresponds to the respective media player transport control zone (and, in some embodiments, providing haptic and/or visual feedback to indicate that the respective media player transport control zone has been activated) (e.g., as similarly shown in FIGS. 5FF-5GG).

Displaying a second media playback mode of operation that operates in a locked state after a user-selection provides the user with improved media playback functionality that enhances the operability of the device. For example, accessing playback functionality from a locked state makes the user-device interface more efficient by helping the user to consume and navigate media content without having to unlock the device and provide access to other applications or potentially compromise personal data on the device.

In some embodiments, the device is (826) locked. While the electronic device is locked: the device displays a lock-screen user interface on the display, the lock-screen user interface including the second media player user interface. While displaying the second media player user interface, the device detects an ninth input by a ninth contact that corresponds to the focus selector at a respective media player transport control zone in the second media player user interface (e.g., detect an input by a contact on a touch-sensitive display while the contact is at the respective media player transport control zone, or detect an input by a contact on a touch-sensitive surface while a cursor or other location marker is at the respective media player transport control zone on the display). In response to detecting the ninth input by the eighth contact, and, in accordance with a determination that the ninth input meets one or more zone activation criteria, wherein the zone activation criteria include a criterion that is met when a characteristic intensity of the contact exceeds an intensity threshold (e.g., above a "light press" or "deep press" intensity threshold), the device activates a media navigation function (e.g., play, pause, skip to next media content item, skip to previous media content item, or scrub media content item) that corresponds to the respective media player transport control zone (and, in some embodiments, providing haptic and/or visual feedback to indicate that the respective media player transport control zone has been activated) (e.g., as shown in FIGS. 5MM-5OO).

Including a second media playback mode of operation that operates in a locked state provides the user with improved media playback functionality that enhances the operability of the device. For example, accessing playback functionality from a locked state makes the user-device interface more efficient by helping the user to consume and navigate media content without having to unlock the device and provide access to other applications or potentially compromise personal data on the device.

It should be understood that the particular order in which the operations in FIG. 8A-8C have been described is merely one example and is not intended to indicate that the described order is the only order in which the operations could be performed. One of ordinary skill in the art would recognize various ways to reorder the operations described herein. In some embodiments, one or more operations of method 800 are combined, supplemented, or replaced with one or more operations of other methods described herein.

Figure 9:
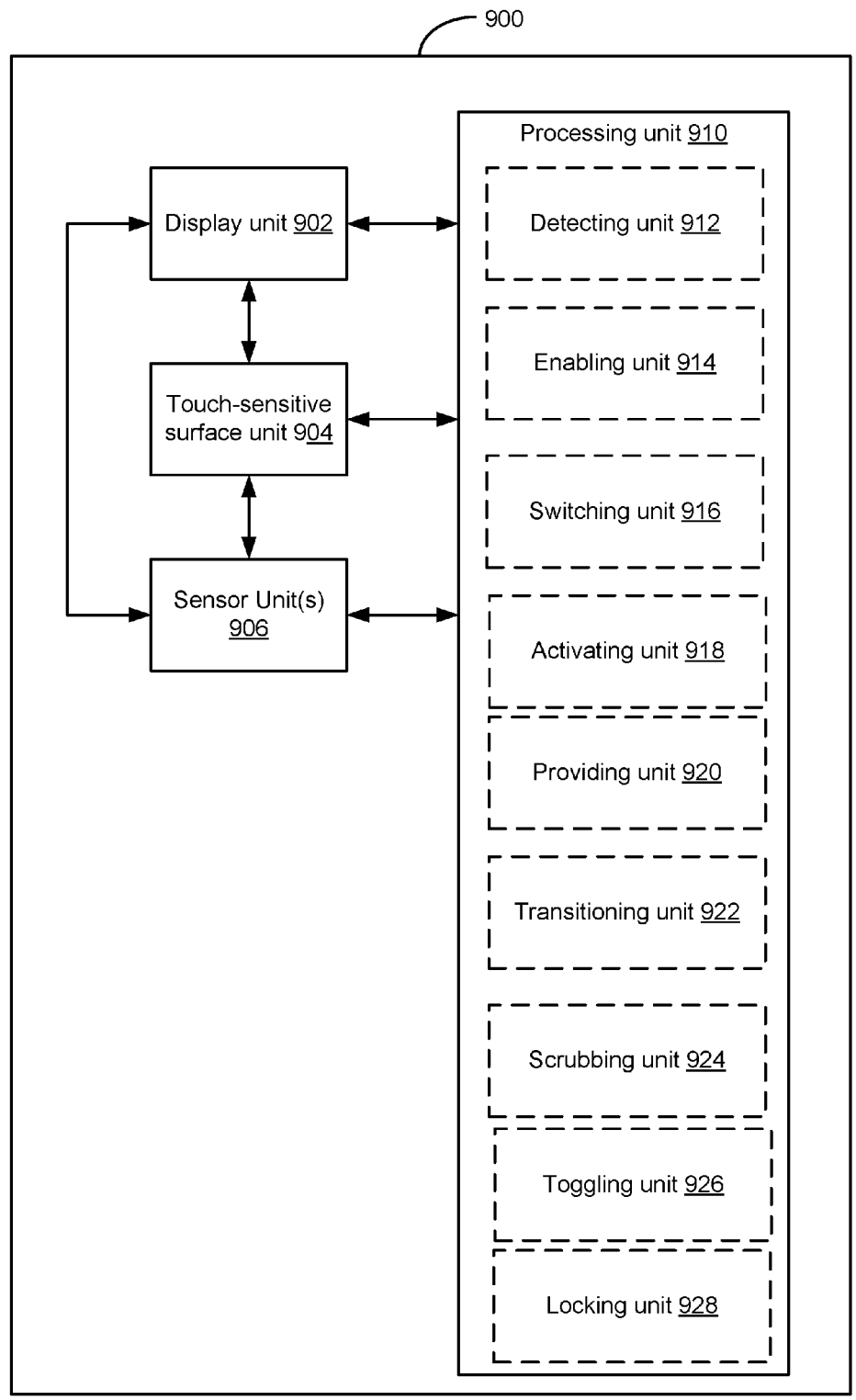
FIG. 9 is a functional block diagram of an electronic device, in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a display unit 902 configured to display one or more user interfaces including at least one of: one or more media player transport control icons and one or more media player affordances; a touch-sensitive surface unit 904 configured to receive user inputs; one or more sensor units 906 configured to detect intensity of contacts with the touch-sensitive surface unit 904; and a processing unit 910 coupled to the display unit 902, the touch-sensitive surface unit 904 and the one or more sensor units 906. The processing unit 910 includes detecting unit 912, enabling unit 914, switching unit 916, activating unit 918, providing unit 920, transitioning unit 922, scrubbing unit 924, toggling unit 926 and locking unit 928.

The processing unit 910 is configured to enable display of a first user interface on the display unit 902, wherein the first user interface includes a media player affordance. The processing unit 910 is configured to detect (e.g., via detecting unit 912), on the touch-sensitive surface unit 904, a first input by a first contact that corresponds to a focus selector at the media player affordance. In response to detecting the first input by the first contact that corresponds to the focus selector at the media player affordance, in accordance with a determination that the first input meets one or more first media player selection criteria, wherein the first media player selection criteria include a criterion that is met when a characteristic intensity of the first contact remains below a first intensity threshold, the processing unit 910 is configured to enable (e.g., via enabling unit 914) display of a first media player user interface on the display unit 902, wherein the first media player user interface includes a plurality of media player transport control icons that, when activated, navigate media presented using the electronic device. In accordance with a determination that the first input meets one or more second media player selection criteria, wherein the second media player selection criteria include a criterion that is met when the characteristic intensity of the first contact exceeds the first intensity threshold, the processing unit 910 is configured to enable (e.g., via enabling unit 914) display of a second media player user interface on the display unit 902, distinct from the first media player user interface, wherein the second media player user interface includes a plurality of media player transport control zones that, when activated, navigate media presented using the electronic device.

In some embodiments, the processing unit 910 is configured to, while presenting one of the first media player user interface and the second media player user interface, detect (e.g., via detecting unit 912), on the touch-sensitive surface unit 904, a second input by a second contact. In some embodiments, in response to detecting the second input by the second contact, and, in accordance with a determination that the second input meets one or more media player switching criteria, the processing unit 910 is configured to switch (e.g., via switching unit 916) to present the other one of the first media player user interface and the second media player user interface.

In some embodiments, the media player switching criteria include a criterion that is met when the second input by the second contact is a swipe gesture.

In some embodiments, the media player switching criteria include a criterion that is met when the second input by the second contact is a tap gesture.

In some embodiments, the processing unit 910 is configured to detect (e.g., via detecting unit 912), on the touch-sensitive surface unit 904, a third input by a third contact that corresponds to the focus selector at a first media player transport control zone in the second media player user interface; and, in response to detecting the third input by the third contact. In some embodiments, in accordance with a determination that the third input meets one or more zone activation criteria, wherein the zone activation criteria include a criterion that is met when a characteristic intensity of the third contact exceeds an intensity threshold: the processing unit 910 is configured to activate (e.g., via activating unit 918) a media navigation function that corresponds to the first media player transport control zone; and provide (e.g., via providing unit 920) haptic feedback to indicate that the first media player transport control zone has been activated.

In some embodiments, the processing unit 910 is configured to detect (e.g., via detecting unit 912), on the touch-sensitive surface unit 904, a fourth input by a fourth contact that corresponds to the focus selector at a first media player transport control zone in the second media player user interface. In some embodiments, in response to detecting the fourth input by the fourth contact, and, in accordance with a determination that the fourth input meets one or more zone activation criteria, wherein the zone activation criteria include a criterion that is met when a characteristic intensity of the fourth contact exceeds an intensity threshold: the processing unit 910 is configured to activate (e.g., via activating unit 918) a media navigation function that corresponds to the first media player transport control zone; and provide (e.g., via providing unit 920) visual feedback to indicate that the first media player transport control zone has been activated.

In some embodiments, the processing unit 910 is configured to, while displaying the second media player user interface and presenting a first media content item, detect (e.g., via detecting unit 912), on the touch-sensitive surface unit 904, a fifth input by a fifth contact that corresponds to the focus selector at a first media player transport control zone in the second media player user interface. In some embodiments, in response to detecting the fifth input by the fifth contact, in accordance with a determination that the fifth input meets one or more next-item criteria, wherein the next-item criteria include a criterion that is met when a characteristic intensity of the contact remains below a second intensity threshold, the processing unit 910 is configured to transition (e.g., via transitioning unit 922) from presenting the first media content item to presenting a second media content item. In some embodiments, in accordance with a determination that the fifth input meets one or more scrubbing criteria, wherein the scrubbing criteria include a criterion that is met when a characteristic intensity of the contact exceeds the second intensity threshold, the processing unit 910 is configured to scrub (e.g., via scrubbing unit 924) through the first media content item.

In some embodiments, the processing unit 910 is configured to, while displaying the second media player user interface and presenting a first media content item, detect (e.g., via detecting unit 912), on the touch-sensitive surface unit 904, a sixth input by a sixth contact that corresponds to the focus selector at a second media player transport control zone in the second media player user interface. In response to detecting the sixth input by the sixth contact, in accordance with a determination that the sixth input meets one or more play/pause criteria, wherein the play/pause criteria include a criterion that is met when a characteristic intensity of the contact remains below a second intensity threshold, the processing unit 910 is configured to toggle (e.g., via toggling unit 926) between playing and pausing the first media content item; and, in accordance with a determination that the second input meets one or more scrubbing criteria, wherein the scrubbing criteria include a criterion that is met when a characteristic intensity of the contact exceeds the second intensity threshold, scrub (e.g., via scrubbing unit 924) through the first media content item.

In some embodiments, the processing unit 910 is configured to lock (e.g., via locking unit 928) the electronic device. While the electronic device is locked, the processing unit 910 is configured enable (e.g., via enabling unit 914) display of a lock-screen user interface on the display unit 902, and detect (e.g., via detecting unit 912), on the touch-sensitive surface unit 904, a seventh input by a seventh contact while displaying the lock-screen user interface. In response to detecting the seventh input by the seventh contact, the processing unit 910 is configured enable (e.g., via enabling unit 914) display of the second media player user interface; while displaying the second media player user interface, and detect (e.g., via detecting unit 912) an eighth input by an eighth contact that corresponds to the focus selector at a respective media player transport control zone in the second media player user interface. In response to detecting the eighth input by the eighth contact, and, in accordance with a determination that the eighth input meets one or more zone activation criteria, wherein the zone activation criteria include a criterion that is met when a characteristic intensity of the contact exceeds an intensity threshold, the processing unit 910 is configured activate (e.g., via activating unit 918) a media navigation function that corresponds to the respective media player transport control zone.

In some embodiments, the processing unit 910 is configured to lock (e.g., via locking unit 928) the electronic device. While the electronic device is locked, the processing unit 910 is configured to enable (e.g., via enabling unit 914) display of a lock-screen user interface on the display unit 902, the lock-screen user interface including the second media player user interface. While displaying the second media player user interface, the processing unit 910 is configured to detect (e.g., via detecting unit 912) an ninth input by a ninth contact that corresponds to the focus selector at a respective media player transport control zone in the second media player user interface. In response to detecting the ninth input by the eighth contact, and, in accordance with a determination that the ninth input meets one or more zone activation criteria, wherein the zone activation criteria include a criterion that is met when a characteristic intensity of the contact exceeds an intensity threshold, the processing unit 910 is configured to activate (e.g., via activating unit 918) a media navigation function that corresponds to the respective media player transport control zone.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6C and 8A-8C are, optionally, implemented by components depicted in FIGS. 1A-1B. For example, operations described herein are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions which, when executed by an electronic device with a display, a touch-sensitive surface, and one or more sensors to detect intensities of contacts with the touch-sensitive surface, cause the electronic device to:
    while media is playing on the electronic device, detect a first input that includes detecting a contact at a first location on the touch-sensitive surface, wherein:
        the first location on the touch-sensitive surface is associated with a first media playback control;
        a second location on the touch-sensitive surface, separate from the first location on the touch-sensitive surface, is associated with a second media playback control that is distinct from the first media playback control;
        a first icon that corresponds to the first media playback control is concurrently displayed on the display with a second icon that corresponds to the second media playback control while the electronic device is operating in a first media playback mode of operation; and
        the first icon that corresponds to the first media playback control and the second icon that corresponds to the second media playback control are not displayed on the display while the electronic device is operating in a second media playback mode of operation that is different from the first media playback mode of operation; and,
    in response to detecting the first input:
        in accordance with a determination that the first input is detected while the electronic device is operating in the first media playback mode of operation, perform a media playback operation associated with the first media playback control when a characteristic intensity of the contact remains below a first intensity threshold;
        in accordance with a determination that the first input is detected while the electronic device is operating in the second media playback mode of operation, distinct from the first media playback mode of operation, and that the first input meets first control-activation criteria that include a criterion that is met when a characteristic intensity of the contact exceeds the first intensity threshold during the first input, perform the media playback operation associated with the first media playback control without displaying the first icon that corresponds to the first media playback control and without displaying the second icon that corresponds to the second media playback control on the display; and,
        in accordance with a determination that the first input is detected while the electronic device is operating in the second media playback mode of operation and that the first input does not meet the first control-activation criteria that include the criterion that is met when the characteristic intensity of the contact exceeds the first intensity threshold during the first input, continue to play the media on the electronic device without performing the media playback operation associated with the first media playback control.

2. The computer readable storage medium of claim 1, wherein the electronic device is in an unlocked state in the first media playback mode of operation, and the electronic device is in a locked state in the second media playback mode of operation.

3. The computer readable storage medium of claim 1, including instructions which, when executed by the electronic device, cause the electronic device to:
    detect a second input that includes detecting a second contact at a second location on the touch-sensitive surface; and
    in response to detecting the second input:
        in accordance with a determination that the second input meets first media playback mode selection criteria that include a criterion that is met when a characteristic intensity of the second contact remains below a second intensity threshold during the second input, operate the device in the first media playback mode of operation; and,
        in accordance with a determination that the second input meets second media playback mode selection criteria that include a criterion that is met when the characteristic intensity of the second contact exceeds the second intensity threshold during the second input, operate the device in the second media playback mode of operation.

4. The computer readable storage medium of claim 1, including instructions which, when executed by the electronic device, cause the electronic device to:
    in response to detecting the first input:
        in accordance with a determination that the first input is detected while the device is operating in the first media playback mode of operation, visually distinguish the first icon that corresponds to the first media playback control to indicate that the first media playback control has been activated; and,
        in accordance with a determination that the first input is detected while the device is operating in the second media playback mode of operation, visually distinguish an area of the display that is proximate to a location on the display that corresponds to the location of the contact on touch-sensitive surface to indicate that the first media playback control has been activated.

5. The computer readable storage medium of claim 1, including instructions which, when executed by the electronic device, cause the electronic device to:
    in response to detecting the first input:
        in accordance with a determination that the first input is detected while the device is operating in the second media playback mode of operation and that the first input meets the first control-activation criteria that include a criterion that is met when the characteristic intensity of the contact does not exceed a second intensity threshold, greater than the first intensity threshold, during the first input, perform a discrete media playback operation associated with the first media playback control; and, in accordance with a determination that the first input is detected while the device is operating in the second media playback mode of operation and that the first input meets second control-activation criteria that include a criterion that is met when the characteristic intensity of the contact exceeds the second intensity threshold during at least part of the first input, perform a continuous media playback operation associated with the first media playback control.

6. The computer readable storage medium of claim 5, including instructions which, when executed by the electronic device, cause the electronic device to display a scrubber bar when the characteristic intensity of the contact exceeds the second intensity threshold.

7. The computer readable storage medium of claim 1, including instructions which, when executed by the electronic device, cause the electronic device to:
 while the electronic device is operating in the first media playback mode of operation, display a first media player user interface on the display, wherein:
  a first media player transport control icon is the first icon that corresponds to the first media playback control, and
  the first media player transport control icon corresponds to a first area of the touch-sensitive surface that, when activated, causes the electronic device to perform the media playback operation associated with the first media playback control; and
 while the electronic device is operating in the second media playback mode of operation, display a second media player user interface on the display, distinct from the first media player user interface, wherein:
  the second media player user interface includes a media player transport control zone associated with the first media playback control, and
  the media player transport control zone corresponds to a second area of the touch-sensitive surface, larger than the first area of the touch-sensitive surface, that, when activated, causes the electronic device to perform the media playback operation associated with the first media playback control.

8. A method, comprising:
 at an electronic device with a touch-sensitive surface, a display, and one or more sensors to detect intensities of contacts on the touch-sensitive surface:
  while media is playing on the electronic device, detecting a first input that includes detecting a contact at a first location on the touch-sensitive surface, wherein:
   the first location on the touch-sensitive surface is associated with a first media playback control;
   a second location on the touch-sensitive surface, separate from the first location on the touch-sensitive surface, is associated with a second media playback control that is distinct from the first media playback control;
   a first icon that corresponds to the first media playback control is concurrently displayed on the display with a second icon that corresponds to the second media playback control while the electronic device is operating in a first media playback mode of operation; and
   the first icon that corresponds to the first media playback control and the second icon that corresponds to the second media playback control are not displayed on the display while the electronic device is operating in a second media playback mode of operation that is different from the first media playback mode of operation; and,
  in response to detecting the first input:
   in accordance with a determination that the first input is detected while the electronic device is operating in the first media playback mode of operation, performing a media playback operation associated with the first media playback control when a characteristic intensity of the contact remains below a first intensity threshold;
   in accordance with a determination that the first input is detected while the electronic device is operating in the second media playback mode of operation, distinct from the first media playback mode of operation, and that the first input meets first control-activation criteria that include a criterion that is met when a characteristic intensity of the contact exceeds the first intensity threshold during the first input, performing the media playback operation associated with the first media playback control without displaying the first icon that corresponds to the first media playback control and without displaying the second icon that corresponds to the second media playback control on the display; and,
   in accordance with a determination that the first input is detected while the electronic device is operating in the second media playback mode of operation and that the first input does not meet the first control-activation criteria that include the criterion that is met when the characteristic intensity of the contact exceeds the first intensity threshold during the first input, continuing to play the media on the electronic device without performing the media playback operation associated with the first media playback control.

9. An electronic device, comprising:
 a display;
 a touch-sensitive surface;
 one or more sensors to detect intensities of contacts with the touch-sensitive surface;
 one or more processors;
 memory; and
 one or more programs, wherein the one or more programs are stored in the memory and configured to be executed by the one or more processors, the one or more programs including instructions for:
  while media is playing on the electronic device, detecting a first input that includes detecting a contact at a first location on the touch-sensitive surface, wherein:
   the first location on the touch-sensitive surface is associated with a first media playback control;
   a second location on the touch-sensitive surface, separate from the first location on the touch-sensitive surface, is associated with a second media playback control that is distinct from the first media playback control;
   a first icon that corresponds to the first media playback control is concurrently displayed on the display with a second icon that corresponds to the second media playback control while the electronic device is operating in a first media playback mode of operation; and
   the first icon that corresponds to the first media playback control and the second icon that corresponds to the second media playback control are not displayed on the display while the electronic device is operating in a second media playback mode of operation that is different from the first media playback mode of operation; and, in response to detecting the first input:

in accordance with a determination that the first input is detected while the electronic device is operating in the first media playback mode of operation, performing a media playback operation associated with the first media playback control when a characteristic intensity of the contact remains below a first intensity threshold;

in accordance with a determination that the first input is detected while the electronic device is operating in the second media playback mode of operation, distinct from the first media playback mode of operation, and that the first input meets first control-activation criteria that include a criterion that is met when a characteristic intensity of the contact exceeds the first intensity threshold during the first input, performing the media playback operation associated with the first media playback control without displaying the first icon that corresponds to the first media playback control and without displaying the second icon that corresponds to the second media playback control on the display; and, in accordance with a determination that the first input is detected while the electronic device is operating in the second media playback mode of operation and that the first input does not meet the first control-activation criteria that include the criterion that is met when the characteristic intensity of the contact exceeds the first intensity threshold during the first input, continuing to play the media on the electronic device without performing the media playback operation associated with the first media playback control.

10. The method of claim 8, wherein the electronic device is in an unlocked state in the first media playback mode of operation, and the electronic device is in a locked state in the second media playback mode of operation.

11. The method of claim 8, including:

detecting a second input that includes detecting a second contact at a second location on the touch-sensitive surface; and in response to detecting the second input:

in accordance with a determination that the second input meets first media playback mode selection criteria that include a criterion that is met when a characteristic intensity of the second contact remains below a second intensity threshold during the second input, operating the device in the first media playback mode of operation; and, in accordance with a determination that the second input meets second media playback mode selection criteria that include a criterion that is met when the characteristic intensity of the second contact exceeds the second intensity threshold during the second input, operating the device in the second media playback mode of operation.

12. The method of claim 8, including:

in response to detecting the first input:

in accordance with a determination that the first input is detected while the device is operating in the first media playback mode of operation, visually distinguishing the first icon that corresponds to the first media playback control to indicate that the first media playback control has been activated; and, in accordance with a determination that the first input is detected while the device is operating in the second media playback mode of operation, visually distinguishing an area of the display that is proximate to a location on the display that corresponds to the location of the contact on touch-sensitive surface to indicate that the first media playback control has been activated.

13. The method of claim 8, including:

in response to detecting the first input:

in accordance with a determination that the first input is detected while the device is operating in the second media playback mode of operation and that the first input meets the first control-activation criteria that include a criterion that is met when the characteristic intensity of the contact does not exceed a second intensity threshold, greater than the first intensity threshold, during the first input, performing a discrete media playback operation associated with the first media playback control; and, in accordance with a determination that the first input is detected while the device is operating in the second media playback mode of operation and that the first input meets second control-activation criteria that include a criterion that is met when the characteristic intensity of the contact exceeds the second intensity threshold during at least part of the first input, performing a continuous media playback operation associated with the first media playback control.

14. The method of claim 13, including displaying a scrubber bar when the characteristic intensity of the contact exceeds the second intensity threshold.

15. The method of claim 8, including:

while the electronic device is operating in the first media playback mode of operation, display a first media player user interface on the display, wherein:

a first media player transport control icon is the first icon that corresponds to the first media playback control, and the first media player transport control icon corresponds to a first area of the touch-sensitive surface that, when activated, causes the electronic device to perform the media playback operation associated with the first media playback control; and while the electronic device is operating in the second media playback mode of operation, display a second media player user interface on the display, distinct from the first media player user interface, wherein:

the second media player user interface includes a media player transport control zone associated with the first media playback control, and the media player transport control zone corresponds to a second area of the touch-sensitive surface, larger than the first area of the touch-sensitive surface, that, when activated, causes the electronic device to perform the media playback operation associated with the first media playback control.

16. The electronic device of claim 9, wherein the electronic device is in an unlocked state in the first media playback mode of operation, and the electronic device is in a locked state in the second media playback mode of operation.

17. The electronic device of claim 9, wherein the one or more programs include instructions for:

detecting a second input that includes detecting a second contact at a second location on the touch-sensitive surface; and in response to detecting the second input:
- in accordance with a determination that the second input meets first media playback mode selection criteria that include a criterion that is met when a characteristic intensity of the second contact remains below a second intensity threshold during the second input, operating the device in the first media playback mode of operation; and,
- in accordance with a determination that the second input meets second media playback mode selection criteria that include a criterion that is met when the characteristic intensity of the second contact exceeds the second intensity threshold during the second input, operating the device in the second media playback mode of operation.

18. The electronic device of claim 9, wherein the one or more programs include instructions for:
in response to detecting the first input:
- in accordance with a determination that the first input is detected while the device is operating in the first media playback mode of operation, visually distinguishing the first icon that corresponds to the first media playback control to indicate that the first media playback control has been activated; and,
- in accordance with a determination that the first input is detected while the device is operating in the second media playback mode of operation, visually distinguishing an area of the display that is proximate to a location on the display that corresponds to the location of the contact on touch-sensitive surface to indicate that the first media playback control has been activated.

19. The electronic device of claim 9, wherein the one or more programs include instructions for:
in response to detecting the first input:
- in accordance with a determination that the first input is detected while the device is operating in the second media playback mode of operation and that the first input meets the first control-activation criteria that include a criterion that is met when the characteristic intensity of the contact does not exceed a second intensity threshold, greater than the first intensity threshold, during the first input, performing a discrete media playback operation associated with the first media playback control; and,
- in accordance with a determination that the first input is detected while the device is operating in the second media playback mode of operation and that the first input meets second control-activation criteria that include a criterion that is met when the characteristic intensity of the contact exceeds the second intensity threshold during at least part of the first input, performing a continuous media playback operation associated with the first media playback control.

20. The electronic device of claim 19, wherein the one or more programs include instructions for displaying a scrubber bar when the characteristic intensity of the contact exceeds the second intensity threshold.

21. The electronic device of claim 9, wherein the one or more programs include instructions for:
while the electronic device is operating in the first media playback mode of operation, display a first media player user interface on the display, wherein:
- a first media player transport control icon is the first icon that corresponds to the first media playback control, and
- the first media player transport control icon corresponds to a first area of the touch-sensitive surface that, when activated, causes the electronic device to perform the media playback operation associated with the first media playback control; and while the electronic device is operating in the second media playback mode of operation, display a second media player user interface on the display, distinct from the first media player user interface, wherein:
- the second media player user interface includes a media player transport control zone associated with the first media playback control, and
- the media player transport control zone corresponds to a second area of the touch-sensitive surface, larger than the first area of the touch-sensitive surface, that, when activated, causes the electronic device to perform the media playback operation associated with the first media playback control.

* * * * *

UNITED STATES PATENT AND TRADEMARK OFFICE
CERTIFICATE OF CORRECTION

PATENT NO. : 10,133,543 B2
APPLICATION NO. : 15/441073
DATED : November 20, 2018
INVENTOR(S) : Olson Page 1 of 1

It is certified that error appears in the above-identified patent and that said Letters Patent is hereby corrected as shown below:

In the Claims

Claim 15, Column 56, Line 36, please delete "display a first" and insert --displaying a first--;

Claim 15, Column 56, Line 47, please delete "display a second" and insert --displaying a second--;

Claim 21, Column 58, Line 21, please delete "display a first" and insert --displaying a first--;

Claim 21, Column 58, Line 32, please delete "display a second" and insert --displaying a second--.

Signed and Sealed this
Twelfth Day of February, 2019

Andrei Iancu
*Director of the United States Patent and Trademark Office*